(12) United States Patent
Liu et al.

(10) Patent No.: US 11,936,290 B2
(45) Date of Patent: Mar. 19, 2024

(54) SWITCHED CAPACITOR CONVERTER AND CONTROL METHOD

(71) Applicant: Halo Microelectronics International, Campbell, CA (US)

(72) Inventors: Rui Liu, Fremont, CA (US); Songnan Yang, Frisco, TX (US)

(73) Assignee: Halo Microelectronics International, Campbell, CA (US)

( * ) Notice: Subject to any disclaimer, the term of this patent is extended or adjusted under 35 U.S.C. 154(b) by 294 days.

(21) Appl. No.: 17/455,860

(22) Filed: Nov. 19, 2021

(65) Prior Publication Data

US 2023/0134427 A1    May 4, 2023

Related U.S. Application Data

(60) Provisional application No. 63/274,150, filed on Nov. 1, 2021.

(51) Int. Cl.
*H02M 3/07*    (2006.01)

(52) U.S. Cl.
CPC .................................. *H02M 3/07* (2013.01)

(58) Field of Classification Search
CPC .......... H02M 3/07; H02M 3/073; H02M 7/10; H02M 7/103; H02M 7/106; H02M 1/088; H02M 2003/071; H02M 2003/072; H02M 2003/075; H02M 2003/076; H02M 2003/077; H02M 2003/078; H02M 2001/007; H02M 2001/0048
See application file for complete search history.

(56) References Cited

U.S. PATENT DOCUMENTS

| | | | |
|---|---|---|---|
| 10,615,697 B1 * | 4/2020 | Ferrari | H02M 3/1584 |
| 11,770,070 B2 * | 9/2023 | Song | H02M 3/07 324/658 |
| 2019/0348913 A1 * | 11/2019 | Zhang | H02M 1/08 |
| 2021/0194364 A1 * | 6/2021 | Jung | H02J 7/007 |

* cited by examiner

*Primary Examiner* — Jeffrey A Gblende
(74) *Attorney, Agent, or Firm* — AP3 Law Firm PLLC

(57) ABSTRACT

A switched capacitor converter includes a first leg between ground and a first voltage node, a second leg between ground and a second voltage node, a first flying capacitor connected between a first switch common node and a third switch common node of the first leg, a second flying capacitor connected between a first switch common node and a third switch common node of the second leg, a third flying capacitor connected between the first voltage node and the second voltage node, a first upper switch connected between the first voltage node and ground, and a second upper switch connected between the second voltage node and an input terminal.

29 Claims, 35 Drawing Sheets

| Providing a switched capacitor converter comprising a first leg comprising a plurality of first leg switches and a second leg comprising a plurality of second leg switches, a first flying capacitor connected to the first leg, a second flying capacitor connected to the second leg, and a third flying capacitor connected between the first leg and the second leg, and a first upper switch and a second upper switch connected to two terminals of the third flying capacitor respectively | 3002 |

| In a first half cycle, configuring the plurality of first leg switches, the plurality of second leg switches, the first upper switch and the second upper switch such that the third flying capacitor, the first flying capacitor and an output capacitor are connected in series, and the second flying capacitor and the output capacitor are connected in parallel | 3004 |

| In a second half cycle, configuring the plurality of first leg switches, the plurality of second leg switches, the first upper switch and the second upper switch such that the first flying capacitor and the output capacitor are connected in parallel, and the third flying capacitor, the second flying capacitor and the output capacitor are connected in series | 3006 |

SWITCHED CAPACITOR CONVERTER AND CONTROL METHOD

PRIORITY CLAIM

This application claims the benefit of U.S. Provisional Application No. 63/274,150, filed on Nov. 1, 2021, entitled "Switched Capacitor Converter and Control Method," which application is hereby incorporated herein by reference.

TECHNICAL FIELD

The present invention relates to a switched capacitor converter, and, in particular embodiments, to a high efficiency switched capacitor converter.

BACKGROUND

With the popularization of fast charging of mobile phones, charge pump voltage conversion circuits are gradually being used more and more widely due to their high power conversion efficiency. The fast charging power of a single battery has also been increased from the initial low power (e.g., 25 W) to today's high power (e.g., 65 W). The output voltage of the corresponding USB adapter has also been increased from the initial lower voltage (e.g., 10 V) to today's high voltage (e.g., 20V). The most basic 2:1 charge pump can no longer meet the needs of a single battery with a 20V USB adapter input voltage. The 2:1 charge pump has been gradually replaced by the 4:1 charge pump. The functions of the 4:1 charge pump are compatible with the functions of the 2:1 charge pump. The 4:1 charge pump is used in applications having a high voltage conversion ratios (e.g., from 20V to 5V). There are several 4:1 charge pump circuits. The commonly used 4:1 charge pump is the Dickson charge pump as shown in FIG. 1. The Dickson charge pump has the highest efficiency among 4:1 charge pumps.

FIG. 1 illustrates a schematic diagram of a 4:1 Dickson dual-phase switched capacitor converter. The 4:1 Dickson dual-phase switched capacitor converter 100 comprises a first phase 110 and a second phase 130. The first phase 110 comprises eight switches 111, 112, 113, 114, 115, 116, 117, 118. Switches 111-116 are connected in series between an input power source VIN and the ground GND. Switches 117 and 118 are connected in series, and further in parallel with the series connected switches 115, 116. A flying capacitor 121 is connected between a common node of switches 111, 112, and a common node of switches 115, 116. A flying capacitor 120 is connected between a common node of switches 112, 113, and a common node of switches 117, 118. A flying capacitor 119 is connected between a common node of switches 113, 114, and a common node of switches 115, 116.

The second phase 130 comprises eight switches 131, 132, 133, 134, 135, 136, 137, 138. Switches 131-136 are connected in series between the input power source VIN and the ground GND. Switches 137 and 138 are connected in series, and further in parallel with the series connected switches 135, 136. A flying capacitor 141 is connected between a common node of switches 131, 132, and a common node of switches 135, 136. A flying capacitor 140 is connected between a common node of switches 132, 133, and a common node of switches 137, 138. A flying capacitor 139 is connected between a common node of switches 133, 134, and a common node of switches 135, 136.

An input capacitor 101 is connected between VIN and ground to filter the input voltage. An output capacitor 102 is connected between VOUT and ground to filter the output voltage.

In operation, all switches alternately switch at a specific operating frequency with a 50% duty cycle. In a first half cycle, the switches 111, 113, 115 and 117 are turned on, and the switches 112, 114, 116, and 118 are turned off. The flying capacitor 121 and the output capacitor 102 are connected in series. VIN charges the series connected capacitor 121 and 102. In addition, VIN supplies power to the output terminal VOUT. The flying capacitor 120 charges the flying capacitor 119 and the output capacitor 102 through the turned on switches 113, 115 and 117. In addition, the flying capacitor 120 supplies power to the output terminal VOUT.

In a second half cycle, the switches 112, 114, 116, and 118 are turned on and the switches 111, 113, 115, and 117 are turned off. The flying capacitor 120 and the output capacitor 102 are connected in series. The flying capacitor 121 charges the flying capacitor 120 and the output capacitor 102 through the switches 112, 116 and 118. In addition, the flying capacitor 121 supplies power to the output terminal VOUT. At the same time, the flying capacitor 119 charges the output capacitor 102 through switches 114 and 116. In addition, the flying capacitor 119 supplies power to the output terminal VOUT.

Also, in the first half cycle, the switches 132, 134, 136, and 138 are turned on and the switches 131, 133, 135, and 137 are turned off. The flying capacitor 140 and the output capacitor 102 are connected in series. The flying capacitor 141 charges the flying capacitor 140 and the output capacitor 102 through the switches 132, 136 and 138. In addition, the flying capacitor 141 supplies power to the output terminal VOUT. At the same time, the flying capacitor 139 charges the output capacitor 102 through switches 134 and 136. In addition, the flying capacitor 139 supplies power to the output terminal VOUT.

Also, in the second half cycle, the switches 131, 133, 135 and 137 are turned on, and the switches 132, 134, 136, and 138 are turned off. The flying capacitor 141 and the output capacitor 102 are connected in series. VIN charges the series connected capacitor 141 and 102 through switches 131 and 135. In addition, VIN supplies power to the output terminal VOUT. The flying capacitor 140 charges the flying capacitor 139 and the output capacitor 102 through the turned on switches 133, 135 and 137. In addition, the flying capacitor 139 supplies power to the output terminal VOUT.

In operation, when the switching frequency is fast enough, the voltage on the flying capacitors 119, 120, 121, 139, 140, 141 and VOUT on the output capacitor 102 fluctuate around a constant value (DC bias voltage) with each switching state. The DC bias voltage of the voltages on the flying capacitors 119, 139, and the output capacitor 102 is equal to one quarter of the input voltage VIN (VIN/4). The DC bias voltage of the voltages on the flying capacitors 120 and 140 is equal to one half of the input voltage VIN (VIN/2). The DC bias voltage of the voltages on the flying capacitors 121 and 141 is equal to three-quarters of the input voltage VIN (3×VIN/4). The power conversion ratio of the Dickson dual-phase switched capacitor converter shown in FIG. 1 is equal to 4:1.

According to the foregoing description, the Dickson dual-phase switched capacitor converter is highly efficient. When the flying capacitors 121 and 141 are charged, only two switches are connected in series. When the flying capacitors 121 and 141 are discharged, only three switches are connected in series. When the flying capacitors 120 and 140 are charged and discharged, only three switches are connected in series. When the flying capacitors 119 and 139 are charged, three switches are connected in series. When the flying capacitors 119 and 139 are discharged, only two switches are connected in series. Moreover, the effective current flowing through all flying capacitors in the Dickson dual-phase switched capacitor converter are the same. At the same time, in order to improve the efficiency of the Dickson dual-phase switched capacitor converter, the on-resistance of the switches 115, 116, 135 and 136 is half of the other switches. This is because the current of these switches is twice the current flowing through the flying capacitors.

The Dickson dual-phase switched capacitor converter shown in FIG. 1 may be of a 2:1 power conversion ratio. In operation, the switches 112, 113, 132, and 133 may be configured to operate in an always-on state during normal operation. The remaining switches alternately switch at a specific operating frequency with a 50% duty cycle. In a first half cycle, the switches 111, 115, and 118 of the first phase 110 are turned on, and the switches 114, 116, and 117 of the first phase 110 are turned off. The flying capacitors 121, 120, 119 are connected in parallel, and further connected in series with the output capacitor 102. VIN charges the flying capacitors 121, 120, 119 and the output capacitor 102 through the switches 111, 112, 113, 115 and 118. In addition, VIN supplies power to the output terminal VOUT.

In a second half cycle, the switches 114, 116, and 117 are turned on, and the switches 111, 115, and 118 are turned off. The flying capacitors 121, 120, and 119 charge the output capacitor 102 and supply power to VOUT through the switches 112, 113, 114, 116 and 117.

Also, in the first half cycle, the switches 134, 136, and 137 of the second phase 130 are turned on, and the switches 131, 135, and 138 of the second phase 130 are turned off. The flying capacitors 141, 140 and 139 charge the output capacitor 102 through switches 132, 133, 134, 136 and 137. In addition, and the flying capacitors 141, 140, 139 supply power to the output VOUT.

Also, in the second half cycle, the switches 131, 135, and 138 are turned on, and the switches 134, 136, and 137 are turned off. The flying capacitors 141, 140 and 139 are connected in parallel, and further connected in series with the output capacitor 102. VIN charges the flying capacitors 141, 140, and 139 and the output capacitor 102 through switches 131, 132, 133, 135 and 138. In addition, VIN supplies power to the output terminal VOUT.

In operation, when the switching frequency is fast enough, the voltages on the flying capacitors 119, 120, 121, 139, 140, 141, and VOUT on the output capacitor 102 fluctuate around a constant value with each switching state. Among them, the voltages on the flying capacitors 119, 120, 121, 139, 140, 141, and output capacitor 102 are equal to one half of the input voltage VIN (VIN/2). The power conversion ratio of the Dickson dual-phase switched capacitor converter shown in FIG. 1 is equal to 2:1.

The Dickson dual-phase switched capacitor converter shown in FIG. 1 can achieve high efficiency. However, the circuit is complicated. There are sixteen switches and six flying capacitors. The largest DC voltage on the flying capacitor is three-quarters of VIN. Due to the DC piezoelectric effect of ceramic capacitors (the capacitance value decreases exponentially with the increase of DC piezoelectricity) FIG. 2 shows the capacitance value variation in response to different DC bias voltages. In order to achieve the required capacitance value, a larger capacitor is needed. Such a larger capacitor increases the cost and area of the Printed Circuit Board (PCB) on which the Dickson dual-phase switched capacitor converter is mounted.

As power consumption has become more important, there may be a need for further improving the performance of the Dickson dual-phase switched capacitor converter shown in FIG. 1. It is desirable to have a simplified structure so as to achieve a cost-effective power solution.

SUMMARY

These and other problems are generally solved or circumvented, and technical advantages are generally achieved, by preferred embodiments of the present disclosure which provide a high efficiency switched capacitor converter.

In accordance with an embodiment, a switched capacitor converter comprises a first leg comprising a plurality of first leg switches connected in series between ground and a first voltage node, a second leg comprising a plurality of second leg switches connected in series between ground and a second voltage node, a first flying capacitor connected between a first switch common node and a third switch common node of the first leg, wherein the first switch common node is a common node of a first switch and a second switch of the first leg, and the third switch common node is a common node of a third switch and a fourth switch of the first leg, a second flying capacitor connected between a first switch common node and a third switch common node of the second leg, wherein the first switch common node is a common node of a first switch and a second switch of the second leg, and the third switch common node is a common node of a third switch and a fourth switch of the second leg, a third flying capacitor connected between the first voltage node and the second voltage node, a first upper switch connected between the first voltage node and ground, a second upper switch coupled between the second voltage node and an input terminal, and an output terminal coupled to a second switch common node of the first leg and a second switch common node of the second leg, and wherein the second switch common node of the first leg is a common node of the second switch and the third switch of the first leg, and the second switch common node of the second leg is a common node of the second switch and the third switch of the second leg.

The switched capacitor converter further comprises a fourth flying capacitor connected between a third voltage node and a fourth voltage node, a third upper switch connected between the third voltage node and ground, a fourth upper switch connected between the fourth voltage node and the input terminal, a fifth upper switch connected between an uppermost switch common node of the first leg and the fourth voltage node, and a sixth upper switch connected between an uppermost switch common node of the second leg and the third voltage node.

In accordance with yet another embodiment, a method comprises providing a switched capacitor converter comprising a first leg comprising a plurality of first leg switches and a second leg comprising a plurality of second leg switches, a first flying capacitor connected to the first leg, a second flying capacitor connected to the second leg, and a third flying capacitor connected between the first leg and the second leg, and a first upper switch and a second upper switch connected to two terminals of the third flying capacitor respectively, in a first half cycle, configuring the plurality of first leg switches, the plurality of second leg switches, the first upper switch and the second upper switch such that the third flying capacitor, the first flying capacitor and an output capacitor are connected in series, and the second flying capacitor and the output capacitor are connected in parallel, and in a second half cycle, configuring the plurality of first leg switches, the plurality of second leg switches, the first upper switch and the second upper switch such that the first flying capacitor and the output capacitor are connected in parallel, and the third flying capacitor, the second flying capacitor and the output capacitor are connected in series.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims.

BRIEF DESCRIPTION OF THE DRAWINGS

For a more complete understanding of the present disclosure, and the advantages thereof, reference is now made to the following descriptions taken in conjunction with the accompanying drawings, in which:

FIG. 30 illustrates a flow chart of a method for controlling the switched capacitor converter shown in FIGS. 3 and 13 in accordance with various embodiments of the present disclosure.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present disclosure provides many applicable inventive concepts that can be embodied in a wide variety of specific contexts. The specific embodiments discussed are merely illustrative of specific ways to make and use the disclosure, and do not limit the scope of the disclosure.

The present disclosure will be described with respect to preferred embodiments in a specific context, namely to a high efficiency switched capacitor converter. The invention may also be applied, however, to a variety of power systems. Hereinafter, various embodiments will be explained in detail with reference to the accompanying drawings.

Figure 3:
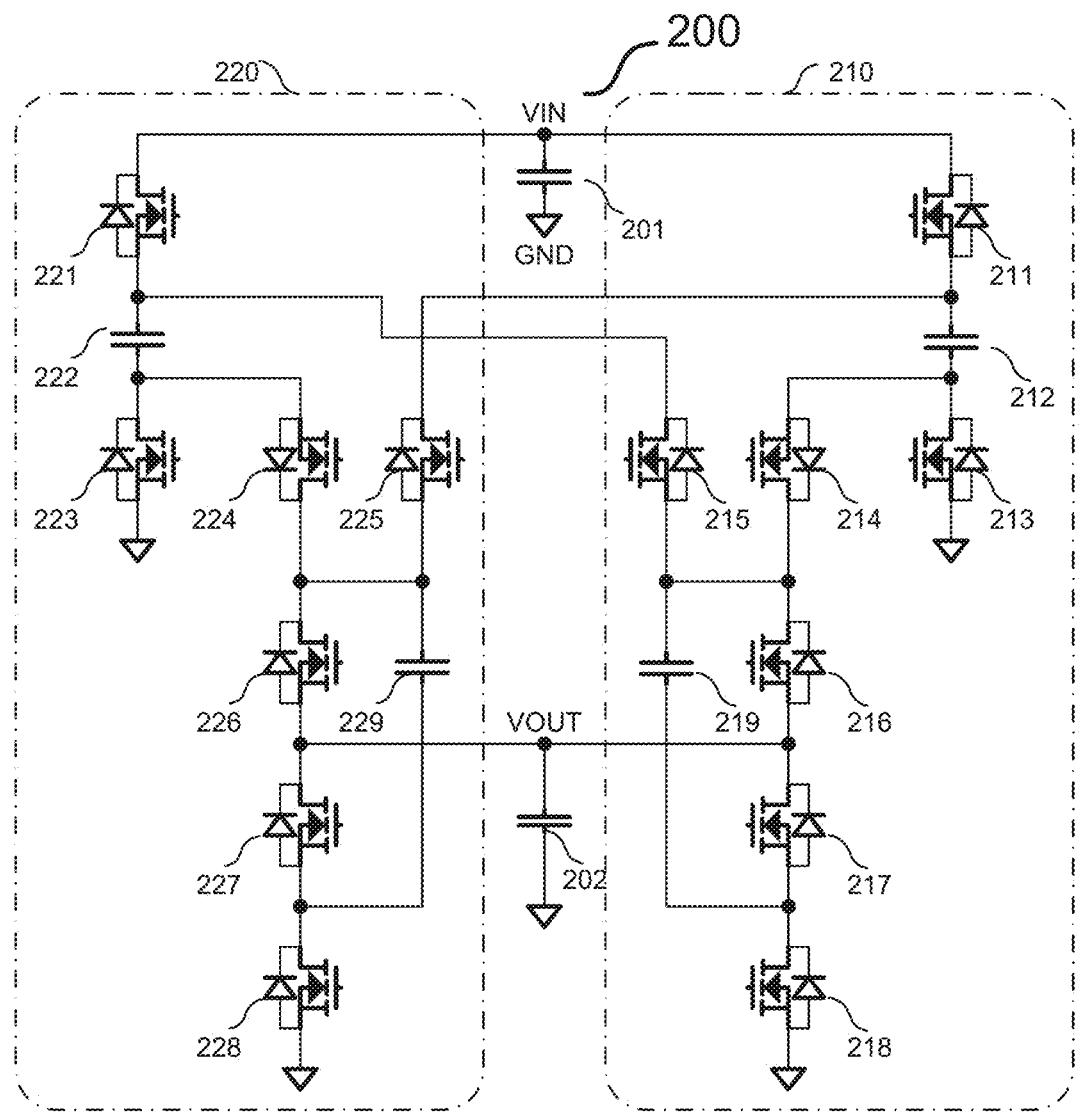
FIG. 3 illustrates a schematic diagram of a 4:1 dual-phase switched capacitor converter in accordance with various embodiments of the present disclosure.

FIG. 3 illustrates a schematic diagram of a 4:1 dual-phase switched capacitor converter in accordance with various embodiments of the present disclosure. The 4:1 dual-phase switched capacitor converter 200 comprises fourteen switches, four flying capacitors, one input capacitor and one output capacitor. A first phase 210 of the 4:1 dual-phase switched capacitor converter includes seven switches 211, 213, 214, 215, 216, 217, and 218 coupled between a power source VIN and the ground GND. A flying capacitor 212 is connected in series with switches 211 and 213 between VIN and ground. A flying capacitor 219 is connected between a common node of switches 214, 216 and a common node of switches 217, 218.

A second phase 220 of the 4:1 dual-phase switched capacitor converter includes seven switches 221, 223, 224, 225, 226, 227, and 228 coupled between the power source VIN and the ground GND. A flying capacitor 222 is connected in series with switches 221 and 223 between VIN and ground. A flying capacitor 229 is connected between a common node of switches 224, 226 and a common node of switches 227, 228. An input capacitor 201 is connected between VIN and ground to filter the input voltage. An output capacitor 202 is connected between VOUT and ground to filter the output voltage. Throughout the description, a first leg of the 4:1 dual-phase switched capacitor converter is a switch leg comprising switches 224, 226, 227 and 228. A second leg of the 4:1 dual-phase switched capacitor converter is a switch leg comprising switches 215, 216, 217 and 218. Switch 223 may be referred to as a first upper switch. Switch 221 may be referred to as a second upper switch. Switch 213 may be referred to as a third upper switch. Switch 211 may be referred to as a fourth upper switch. Switch 225 may be referred to as a fifth upper switch. Switch 214 may be referred to as a sixth upper switch.

In operation, the 4:1 dual-phase switched capacitor converter 200 functions as a 4:1 step-down charge pump. All switches switch alternately with a 50% duty cycle at a specific operating frequency.

Figure 4:
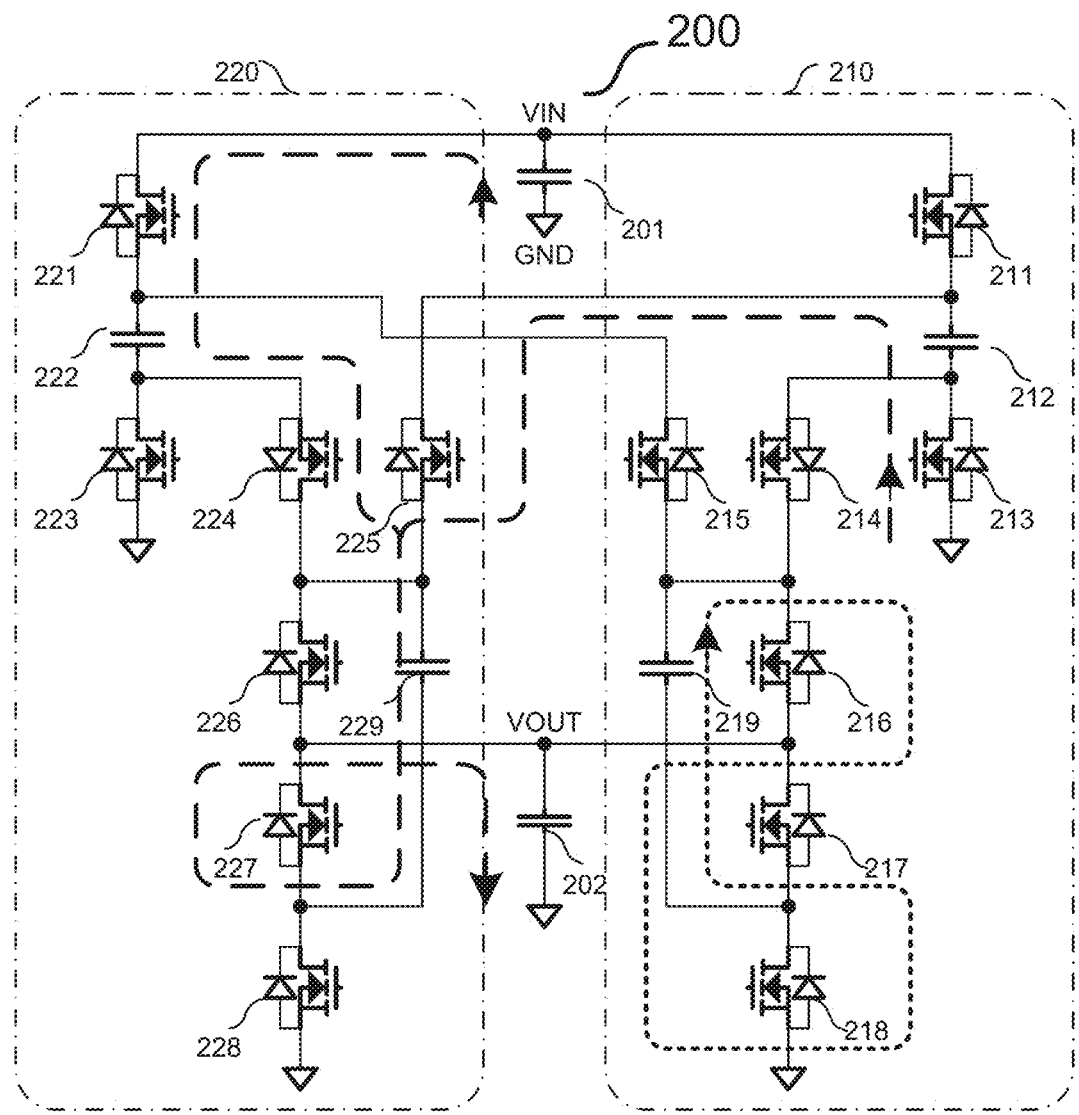
FIG. 4 illustrates the 4:1 dual-phase switched capacitor converter configured to operate in a first half cycle in accordance with various embodiments of the present disclosure.

FIG. 4 illustrates the 4:1 dual-phase switched capacitor converter configured to operate in a first half cycle in accordance with various embodiments of the present disclosure. The switches 213, 216, and 218 are turned on, and the switches 211, 214, 215, and 217 are turned off. The flying capacitor 219 charges the output capacitor 202 through switches 216 and 218. In addition, the flying capacitor 219 supplies power to the output terminal VOUT (the current path is indicated by the dotted line in FIG. 4). Since the flying capacitor 219 and the output capacitor 202 are connected in parallel, the average voltage on the flying capacitor 219 is equal to the output voltage VOUT.

In the first half cycle, the switches 221, 224, 225, and 227 are also turned on, and the switches 223, 226, and 228 are turned off. The flying capacitors 222, 229 and the output capacitor 202 are connected in series. VIN charges the flying capacitors 222, 229 and the output capacitor 202 through switches 221, 224 and 227. In addition, VIN supplies power to the output terminal VOUT (the current path is indicated by the dashed line in FIG. 4). The flying capacitors 222 and 229 and the output capacitor 202 are connected in series. The sum of the average voltages on the three capacitors is equal to the input voltage VIN. At the same time, the flying capacitor 229 and the output capacitor 202 are connected in series. The flying capacitor 212 charges the flying capacitor 229 and the output capacitor 202 through switches 213, 225 and 227 (the current path is indicated by the dashed line in FIG. 4). In addition, the flying capacitor 212 supplies power to the output terminal VOUT. The flying capacitor 229 and the output capacitor 202 are connected in series. The flying capacitor 212 is connected in parallel with the series-connected capacitors 229 and 202. Therefore, the average voltage on the flying capacitor 212 is equal to the sum of the average voltages on the flying capacitor 229 and the output capacitor 202.

Figure 5:
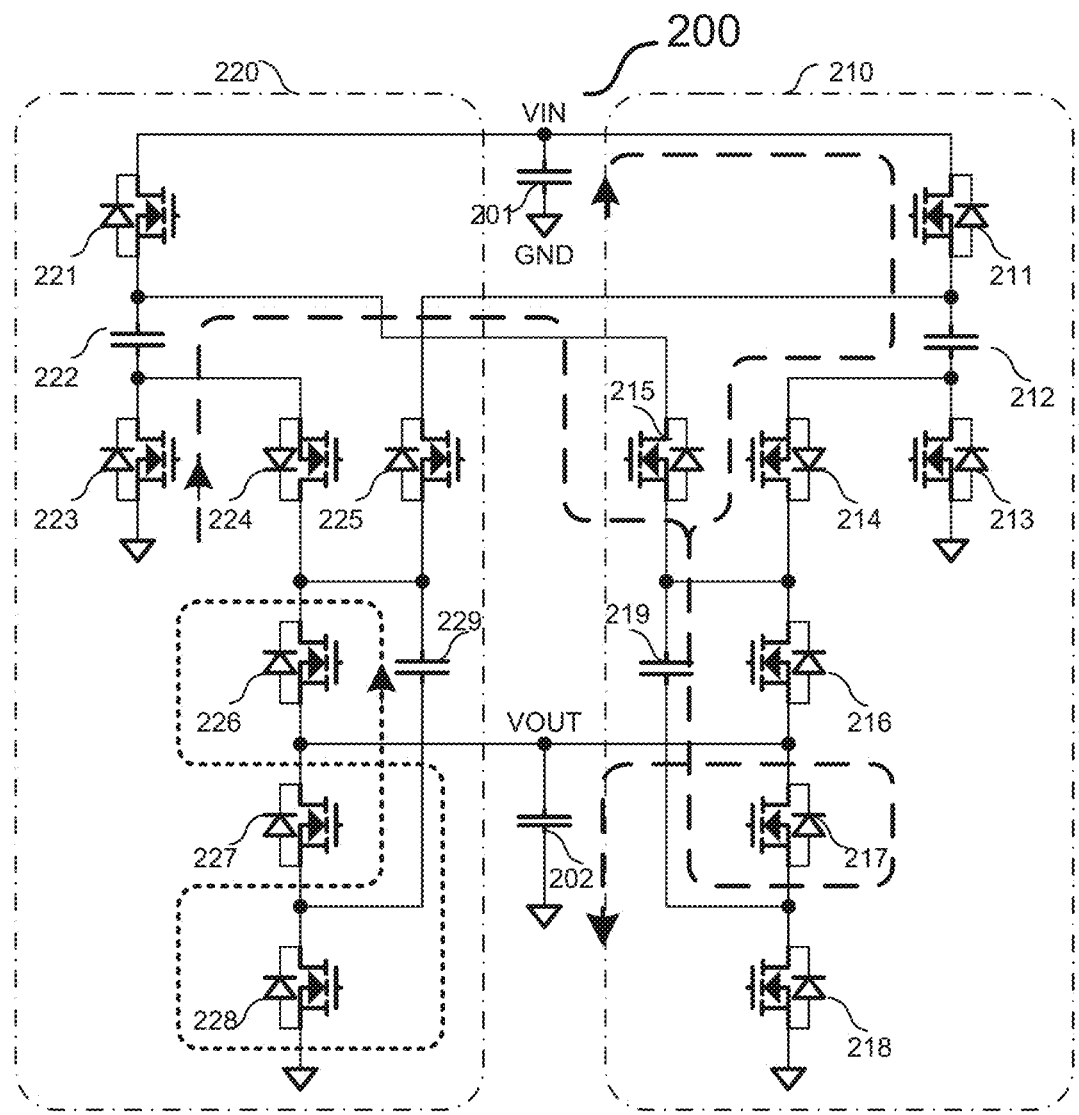
FIG. 5 illustrates the 4:1 dual-phase switched capacitor converter configured to operate in a second half cycle in accordance with various embodiments of the present disclosure.

FIG. 5 illustrates the 4:1 dual-phase switched capacitor converter configured to operate in a second half cycle in accordance with various embodiments of the present disclosure. The switches 211, 214, 215, and 217 are turned on, and the switches 213, 216, and 218 are turned off. The flying capacitors 212, 219 and the output capacitor 202 are connected in series. VIN charges the flying capacitors 212, 219 and the output capacitor 202 through switches 211, 214, and 217 (the current path is indicated by the dashed line in FIG. 5). In addition, VIN supplies power to the output terminal VOUT. The flying capacitors 212, 219 and the output capacitor 202 are connected in series. The sum of the average voltages on the three capacitors is equal to the input voltage VIN. As described in the first half cycle, the average voltage across the flying capacitor 219 is equal to the output voltage VOUT. Therefore, the average voltage on the flying capacitor 212 is equal to twice the output voltage VOUT. The sum of the voltages on the flying capacitors 212, 219 and the output capacitor 202 is equal to the input voltage VIN. Therefore, the voltage on the flying capacitor 212 is equal to one half of the input voltage VIN.

Also, in the second half cycle, the switches 223, 226, and 228 are turned on, and the switches 221, 224, 225, and 227 are turned off. The flying capacitor 229 charges the output capacitor 202 through the switches 226 and 228 (the current path is indicated by the dotted line in FIG. 5). In addition, the flying capacitor 229 supplies power to the output terminal VOUT. At this time, the flying capacitor 229 and the output capacitor 202 are connected in parallel. Therefore, the average voltage on the flying capacitor 229 is equal to the output voltage VOUT. At the same time, the flying capacitor 219 and the output capacitor 202 are connected in series. The flying capacitor 222 charges the flying capacitor 219 and the output capacitor 202 through switches 223, 215, and 217 (the current path is indicated by the dashed line in FIG. 5). In addition, the flying capacitor 222 supplies power to the output terminal VOUT.

The flying capacitor 219 and the output capacitor 202 are connected in series and further connected in parallel with the flying capacitor 222. Therefore, the average voltage on the flying capacitor 222 is equal to the sum of the average voltage on the flying capacitor 219 and the output capacitor 202. As mentioned above, the average voltage on the flying capacitor 219 is equal to the output voltage VOUT. As such, the average voltage on the flying capacitor 212 is equal to twice the output voltage VOUT. In other words, the average voltage on the flying capacitor 212 is equal to one half of the input voltage VIN.

In operation, when the switching frequency is fast enough, the voltages on the flying capacitors 212 and 222 fluctuate around one half (VIN/2) of the input voltage VIN with the change of each switching state. The voltage on the flying capacitors 219 and 229 and the output capacitor 202 fluctuates around a quarter (VIN/4) of the input voltage VIN with each change of the switching state. The constant value of the output capacitor 202 is one-fourth (VIN/4) of the input voltage VIN. The power conversion ratio of the dual-phase switched capacitor converter shown in FIGS. 4-5 is equal to 4:1.

Referring back to FIG. 3, if the switches 211, 213, 221, and 223 are configured to operate in an always-on mode during normal operation, and the switches 214, 224 are configured to operate in an always-off mode, the remaining switches configured to operate at a specific operating frequency with a 50% duty cycle is switched alternately. In this configuration, flying capacitors 212 and 222 are connected between VIN and GND. The voltages across the flying capacitors 212 and 222 are equal to the input voltage VIN.

In a first half cycle, the switches 216 and 218 are turned on, and the switches 215 and 217 are turned off. The switches 225 and 227 are turned on, and the switches 226 and 228 are turned off. The flying capacitor 229 and the output capacitor 202 connected in series. VIN charges the flying capacitor 229 and the output capacitor 202 through switches 211, 225 and 227. In addition, VIN supplies power to the output terminal VOUT. At this time, the flying capacitor 229 and the output capacitor 202 are connected in series. The sum of the average voltages on the flying capacitor 229 and the output capacitor 202 is equal to the input voltage VIN.

Also, in the first half cycle, the flying capacitor 219 charges the output capacitor 202 through switches 216 and 218. In addition, the flying capacitor 219 supplies power to the output terminal VOUT. Because the flying capacitor 219 is connected in parallel with the output capacitor 202, the average voltage on the flying capacitor 219 is equal to the output voltage VOUT.

In a second half cycle, the switches 215 and 217 are turned on and the switches 216 and 218 are turned off. The switches 226 and 228 are turned on, and the switches 225 and 227 are turned off. The flying capacitor 219 and the output capacitor 202 connected in series. VIN charges the flying capacitor 219 and the output capacitor 202 through switches 221, 215 and 217. In addition, VIN supplies power to the output terminal VOUT. At this time, the flying capacitor 219 and the output capacitor 202 are connected in series. The sum of the average voltages on the flying capacitor 219 and the output capacitor 202 is equal to the input voltage VIN. As mentioned above, the average voltage of the flying capacitor 219 is equal to the output voltage VOUT. Therefore, the average voltages on the flying capacitor 219 and the output capacitor 202 are equal to one half of the input voltage (VIN/2).

Also, in the second half cycle, the flying capacitor 229 charges the output capacitor 202 through switches 226 and 228. In addition, the flying capacitor 229 supplies power to the output terminal VOUT. Because the flying capacitor 229 is connected in parallel with the output capacitor 202, the average voltage on the flying capacitor 229 is equal to the output voltage VOUT. The output voltage is equal to one half of the input voltage (VIN/2).

In operation, when the switching frequency is fast enough, the voltages on the flying capacitors 219, 229, and the output capacitor 202 fluctuate around a constant value (VIN/2) with each switching state. The power conversion ratio of the dual-phase switched capacitor converter is equal to 2:1.

From the previous analysis, the following conclusions can be drawn: the power converter in the present disclosure only needs fourteen switches, four flying capacitors, one input capacitor and one output capacitor. At the same time, the maximum voltage on the flying capacitors is one half of the input voltage (VIN/2) instead of three-quarters of the input voltage (3×VIN/4).

Through the foregoing description, various embodiments of the present disclosure shows that during the charging and discharging processes of the flying capacitors 212 and 222, three switches are connected in series to establish the charging and discharging paths. It is the same as the flying capacitors 120 and 140 in the Dickson dual-phase switched capacitor converter. The effective value of the current flowing through the flying capacitors in the present disclosure is the same as that in the Dickson dual-phase switched capacitor converter. As such, the power consumption of the present disclosure is the same as that in the Dickson dual-phase switched capacitor converter.

Figure 1:
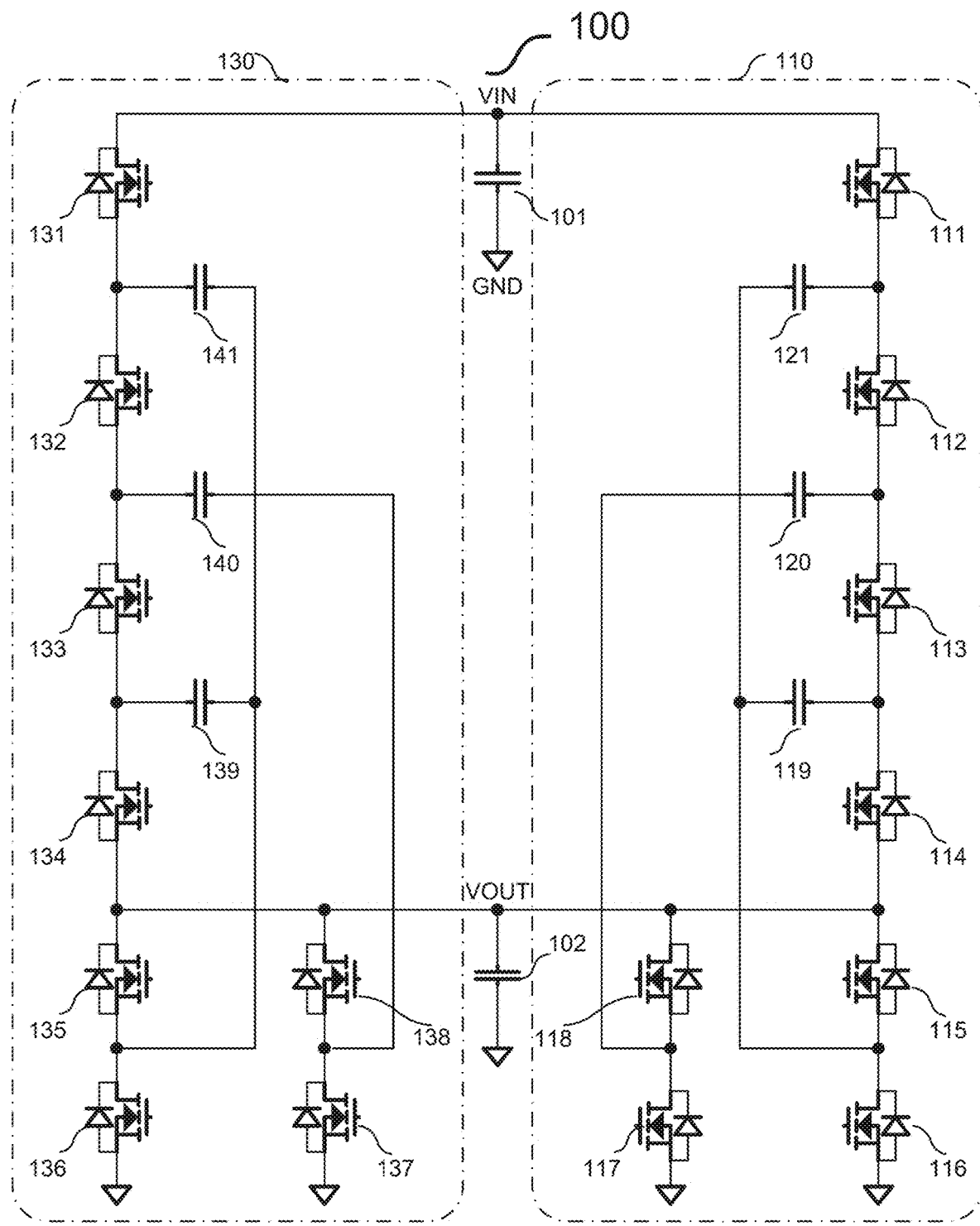
FIG. 1 illustrates a schematic diagram of a 4:1 Dickson dual-phase switched capacitor converter.
Figure 2:
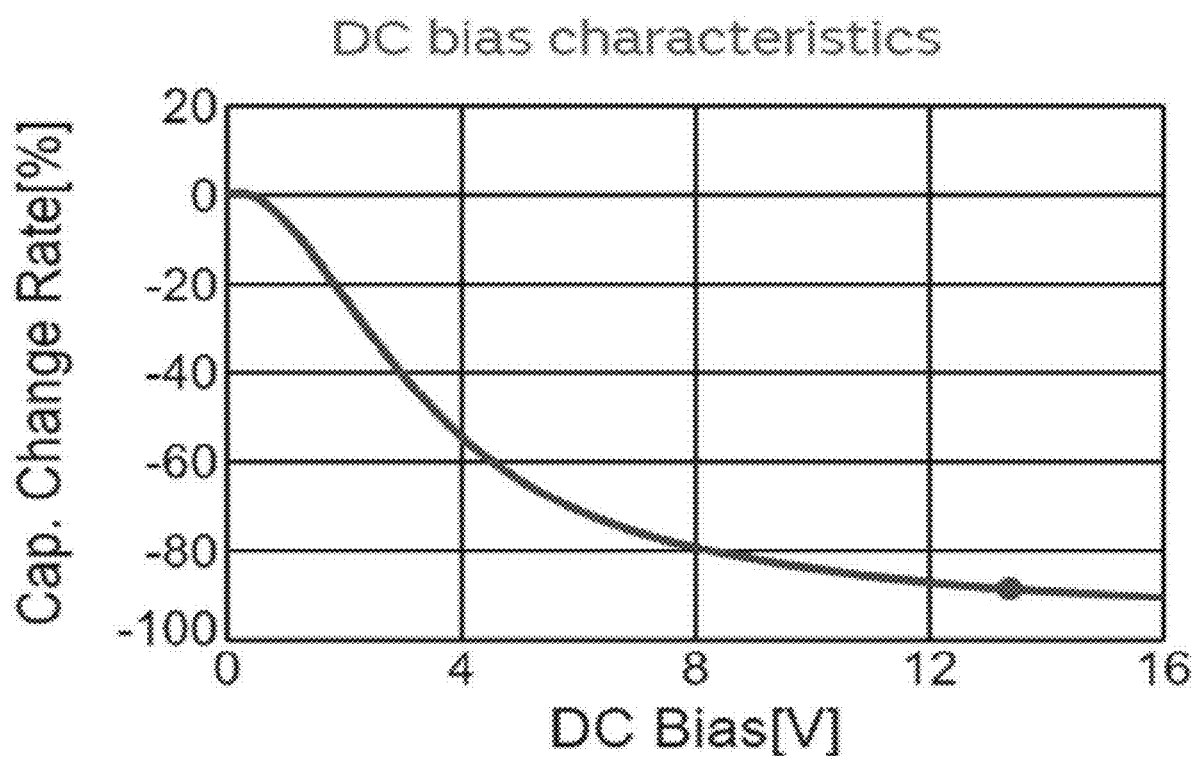
FIG. 2 shows the capacitance value variation in response to different DC bias voltages.

Through the foregoing description, various embodiments of the present disclosure shows that during the charging process of the flying capacitors 219 and 229, three switches are connected in series to establish the charging paths. During the discharging process of the flying capacitors 219 and 229, two switches are connected in series to establish the discharging paths. It is the same as the flying capacitors 119 and 139 of the Dickson dual-phase switched capacitor converter. The effective value of the current flowing through the flying capacitors in the present disclosure is twice that in the Dickson dual-phase switched capacitor converter. This requires the on-resistance of the switches 216, 217, 218, 226, 227, and 228 to be the same as the switches 115, 116, 135, and 136 of the Dickson dual-phase switched capacitor converter. Since the present disclosure uses two less switches than the Dickson dual-phase switched capacitor converter, the four switches 117, 118, 137, and 138 in the Dickson dual-phase switched capacitor converter can be made into two switches under the same chip area. These two switches have the same on-resistance as switches 115, 116, 135, 136 so as to meet the on-resistance requirements of the six switches 216, 217, 218, 226, 227, and 228 in the present disclosure. Under this on-resistance arrangement, the dual-phase switched capacitor converter shown in FIG. 3 has the same efficiency as the Dickson dual-phase switched capacitor converter shown in FIG. 1. Because the present disclosure uses less two flying capacitors, and these two flying capacitors are the capacitors with the highest DC voltage bias in the Dickson dual-phase switched capacitor converter shown in FIG. 1, the dual-phase switched capacitor converter shown in FIG. 3 greatly reduces the requirements on the electrical characteristics and quantity of the flying capacitors, thereby reducing the circuit cost and PCB area.

Figure 6:
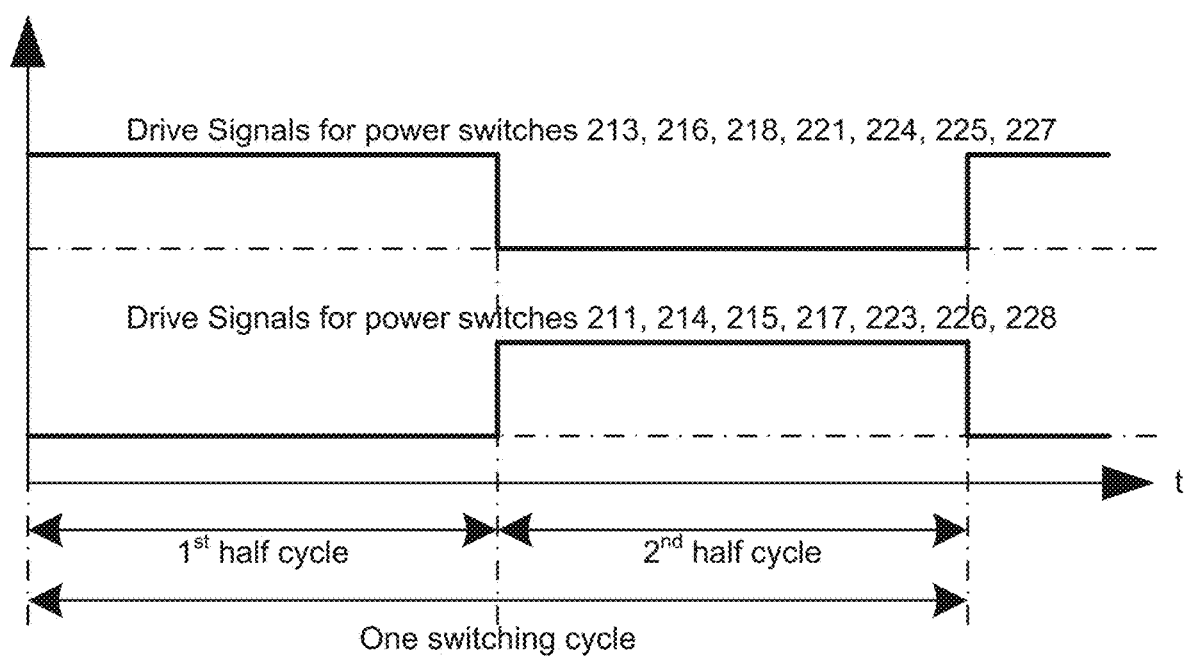
FIG. 6 illustrates the gate drive signals of the 4:1 dual-phase switched capacitor converter shown in FIG. 3 in accordance with various embodiments of the present disclosure.

FIG. 6 illustrates the gate drive signals of the 4:1 dual-phase switched capacitor converter shown in FIG. 3 in accordance with various embodiments of the present disclosure. As shown in FIG. 6, in a first half cycle, the switches 213, 216, 218, 221, 224, 225 and 227 are turned on, and the switches 211, 214, 215, 217, 223, 226 and 228 are turned off. In a second half cycle, the switches 213, 216, 218, 221, 224, 225 and 227 are turned off, and the switches 211, 214, 215, 217, 223, 226 and 228 are turned on.

Figure 7:
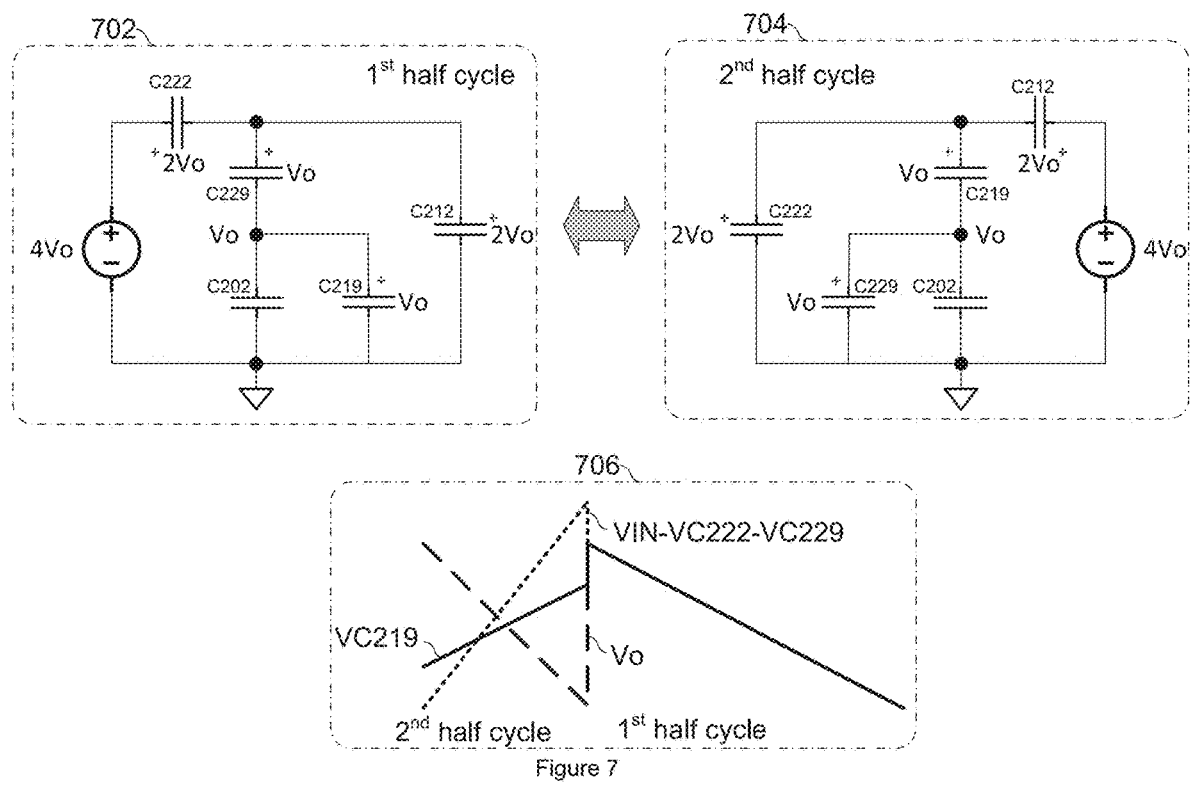
FIG. 7 illustrates two equivalent circuit diagrams for operating in two different half cycles in accordance with various embodiments of the present disclosure.

FIG. 7 illustrates two equivalent circuit diagrams for operating in two different half cycles in accordance with various embodiments of the present disclosure. Circuit 702 is the equivalent circuit of the dual-phase switched capacitor converter shown in FIG. 3 configured to operate in the first half cycle. Circuit 704 is the equivalent circuit of the dual-phase switched capacitor converter shown in FIG. 3 configured to operate in the second half cycle.

In the first half cycle, as indicated by circuit 702, VIN (4×Vo) charges C202 through a conductive path formed by C222 and C229. Through this conductive path, VIN also provides power to a load coupled to Vo. The flying capacitor C212 charges C202 through C229. C212 also provides power to the load coupled to Vo. The flying capacitor C219 and C202 are connected in parallel. The flying capacitor C219 charges C202 and provides power to the load coupled to Vo.

In the second half cycle, as indicated by circuit 704, VIN (4×Vo) charges C202 through a conductive path formed by C212 and C219. Through this conductive path, VIN also provides power to a load coupled to Vo. The flying capacitor C222 charges C202 through C219. C222 also provides power to the load coupled to Vo. The flying capacitor C229 and C202 are connected in parallel. The flying capacitor C229 charges C202 and provides power to the load coupled to Vo.

As indicated by the two equivalent circuits, the charging and discharging paths of the flying capacitor in the two half cycles are not symmetrical. This leads to the fact that when the input power supply Vin charges C202 through the flying capacitors C222 and C229, C202 is in parallel with the flying capacitor C219. At the same time, VIN and C219 provide power for the load. Due to the voltage difference between these two current supplying paths, charge transferring may occur between the flying capacitors on the two current supplying paths, thereby causing unnecessary charge sharing losses.

As shown in the voltage waveforms in the dashed rectangle 706, in the most part of the first half cycle, the voltage across C219 (VC219) and the voltage on Vo (Vin-VC222-VC229) are equal. In the second half cycle, due to the asymmetrical charging and discharging paths, the total voltage change rates of the two paths are not the same. As shown in the dashed rectangle 706, at the moment of entering the first half cycle, the voltage of the path connecting the power supply Vin (that is, Vin charges Vo through C222 and C229) is significantly higher than that of the path connecting C219 and Vo. This voltage difference causes Vin to supply power to the output capacitor and load through C222, C229. However, part of the current is used to charge C219 so as to reach the same voltage as the output capacitor C202. This charge transfer between flying capacitors (increasing the voltage of C219 to a higher level) is unnecessary, and causes significant power losses. The power losses can be avoided through using control mechanisms described below with respect to FIGS. 8-10.

Figure 8:
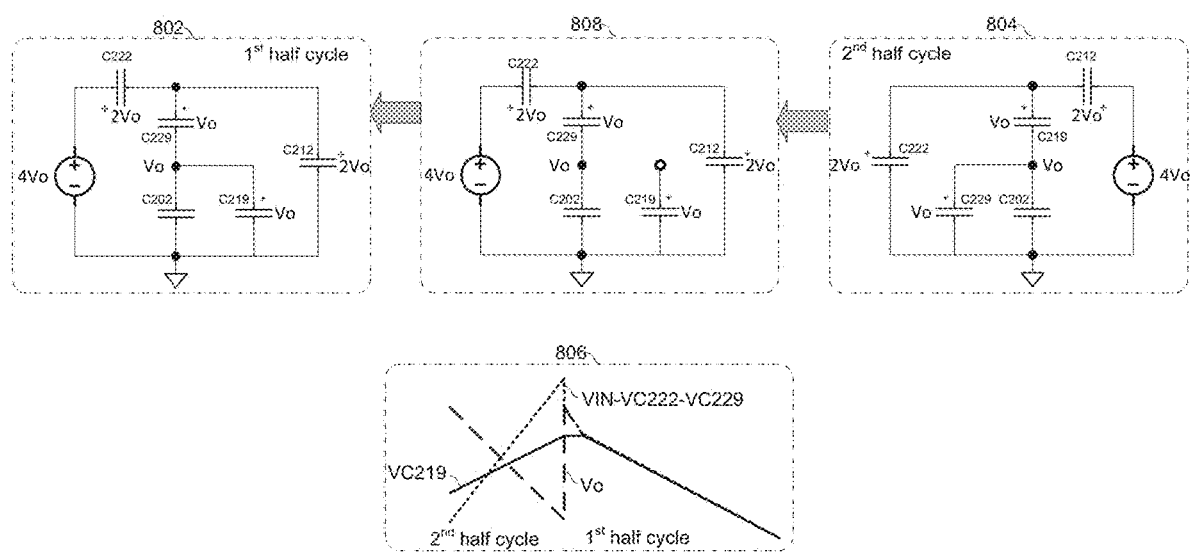
FIG. 8 illustrates three equivalent circuit diagrams for operating in two different half cycles in accordance with various embodiments of the present disclosure.

FIG. 8 illustrates three equivalent circuit diagrams for operating in two different half cycles in accordance with various embodiments of the present disclosure. The operating principle shown in FIG. 8 is similar to that shown in FIG. 7 except that a third equivalent circuit 808 is added to avoid the power loss caused by charge transferring between flying capacitors. As shown in FIG. 8, a transition period can be added between the first half cycle and the second half cycle. In the transition period, C219 is disconnected from C202. The voltage across C219 is maintained until the voltage of the path (Vin-VC222-VC229) is equal to the voltage on C219. Once the voltage (Vin-VC222-VC229) is equal to that on C219, C219 is connected in parallel with C202 to supply power to the output capacitor C202 and the load. The delayed connection of C219 can effectively reduce or eliminate the charge transferring, thereby reducing the power loss between the flying capacitors.

Figure 9:
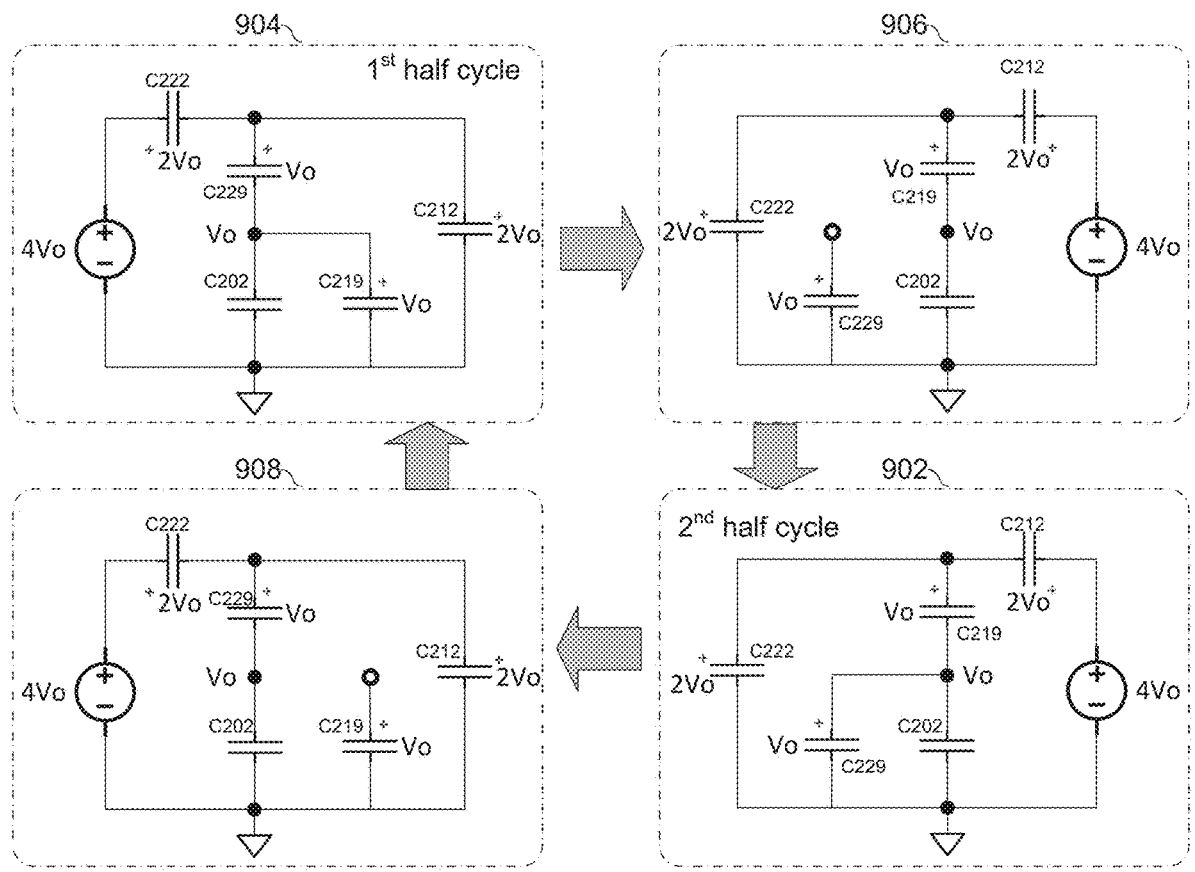
FIG. 9 illustrates four equivalent circuit diagrams for operating in two different operating modes in accordance with various embodiments of the present disclosure.

FIG. 9 illustrates four equivalent circuit diagrams for operating in two different operating modes in accordance with various embodiments of the present disclosure. The operating principle shown in FIG. 9 is similar to that shown in FIG. 8 except that a fourth equivalent circuit 906 is added to avoid the power loss caused by charge transferring. A first transition period shown in the dashed rectangle 908 is added during the transition from the second half cycle to the first half cycle. A second transition period shown in the dashed rectangle 906 is added during the transition from the first half cycle to the second half cycle.

Figure 10:
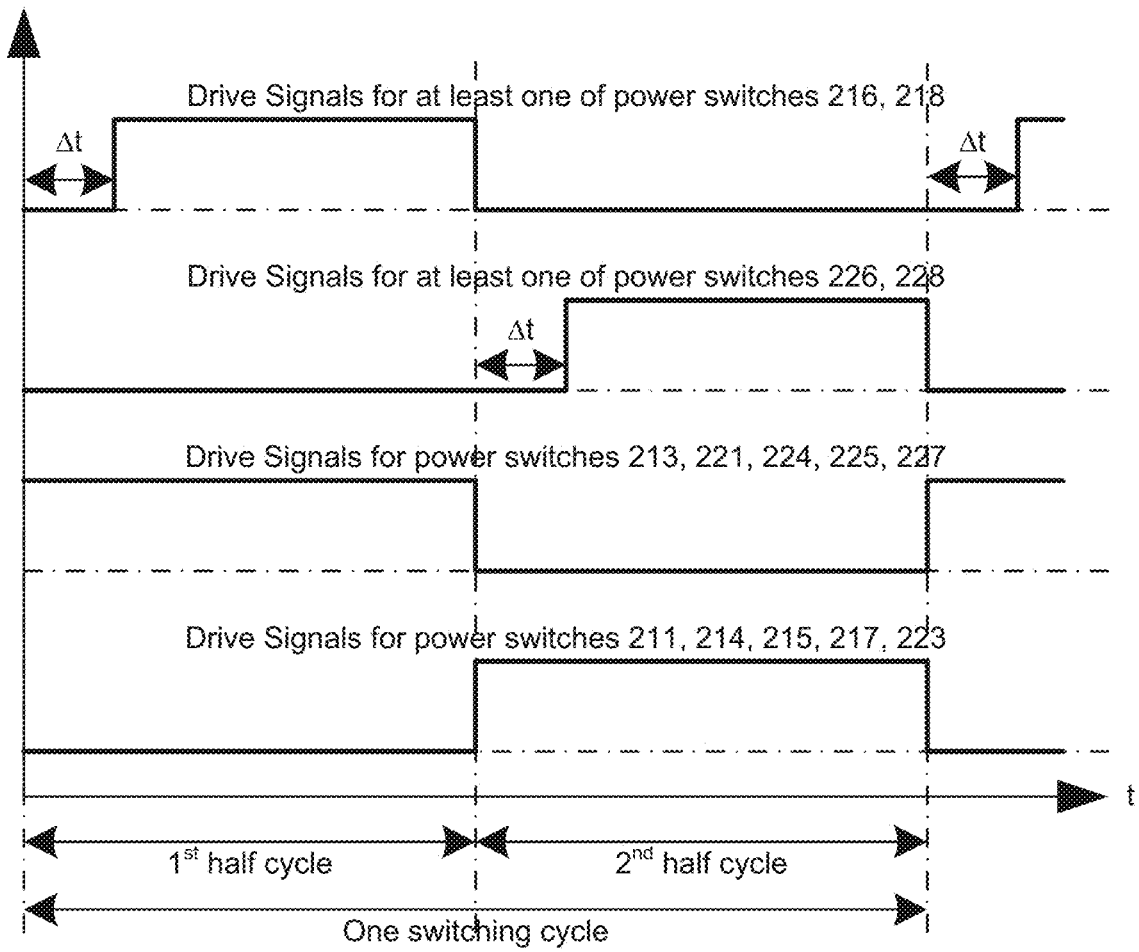
FIG. 10 illustrates the gate drive signals of the 4:1 dual-phase switched capacitor converter shown in FIG. 3 in accordance with various embodiments of the present disclosure.

FIG. 10 illustrates the gate drive signals of the 4:1 dual-phase switched capacitor converter shown in FIG. 3 in accordance with various embodiments of the present disclosure. As shown in FIG. 10, in a first half cycle, the switches 213, 221, 224, 225 and 227 are turned on, and the switches 211, 214, 215, 217, 223, 226 and 228 are turned off. The switches 216 and 218 are turned on after a first delay. The first delay is added according to the operating principle shown in the dashed rectangle 908 in FIG. 9. In a second half cycle, the switches 213, 216, 218, 221, 224, 225 and 227 are turned off, and the switches 211, 214, 215, 217 and 223 are turned on. The switches 226 and 228 are turned on after a second delay. The second delay is added according to the operating principle shown in the dashed rectangle 906 in FIG. 9.

It should be noted that the control mechanisms shown in FIGS. 8-10 is also applicable to the implementation of the higher step-down ratio power converters. For example, the control mechanisms are applicable to a 2×N:1 dual-phase switched capacitor converter described below with respect to FIG. 19.

According to the operating principle shown in FIG. 7, a large charge transfer current occurs between the capacitors at the moment of the transition between two different half cycles. After adding the first delay time and the second delay time shown in FIG. 10, the peak current can be effectively eliminated and the charge transfer loss can be reduced.

It should be noted the control mechanism described above with respect to FIG. 10 is applied to the 4:1 dual-phase switched capacitor converter, but it is understood that the control mechanism may be implemented using other types of switched capacitor converters described in the present disclosure.

Figure 11:
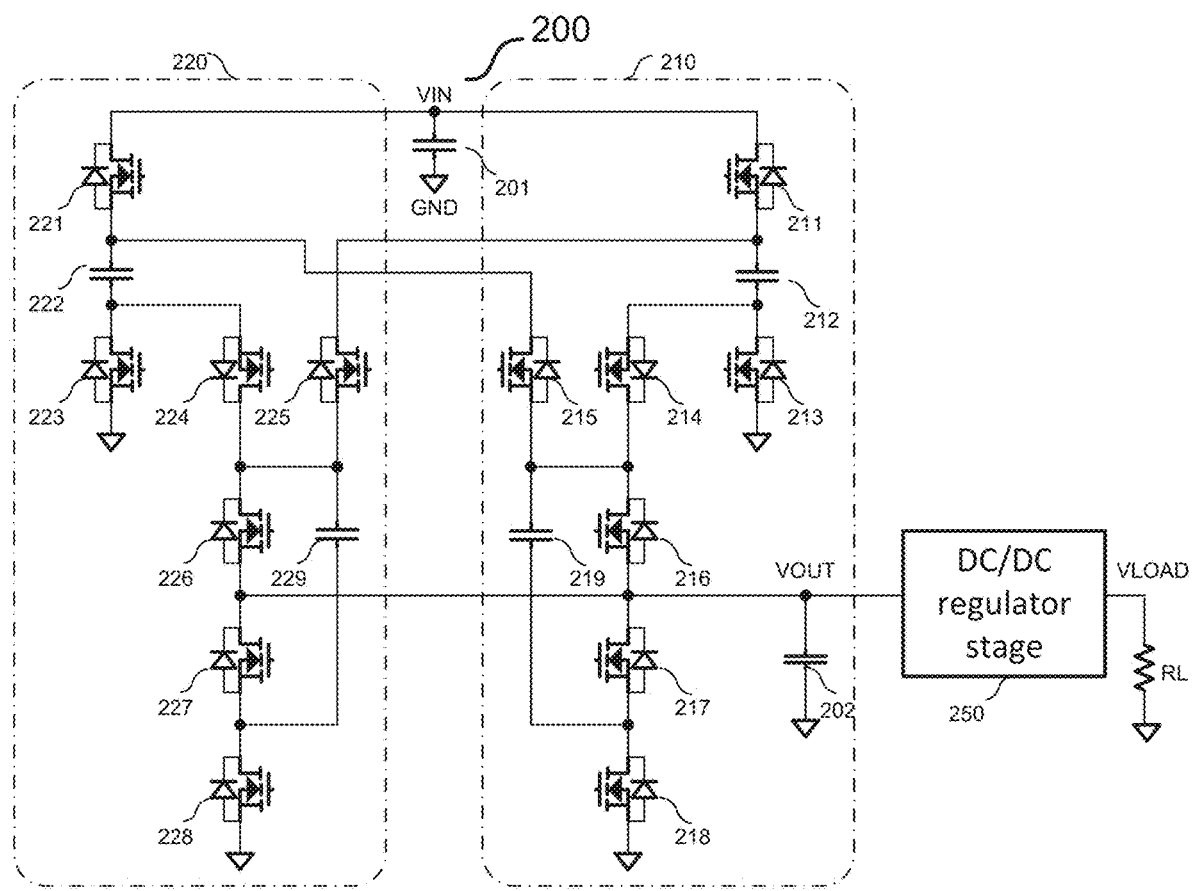
FIG. 11 illustrates a power conversion system including the 4:1 dual-phase switched capacitor converter and a DC/DC regulator stage connected in cascade in accordance with various embodiments of the present disclosure.

FIG. 11 illustrates a power conversion system including the 4:1 dual-phase switched capacitor converter and a DC/DC regulator stage connected in cascade in accordance with various embodiments of the present disclosure. Depending on different applications and design needs, the 4:1 dual-phase switched capacitor converter (e.g., converter 200) can be used as a front stage in a multi-level DC/DC conversion system to achieve a high-efficiency fixed-ratio voltage conversion. The 4:1 dual-phase switched capacitor converter and a DC/DC regulator stage 250 are connected in cascade between VIN and VLOAD. The DC/DC regulator stage 250 is employed to achieve dynamic voltage regulation. In this system, the output capacitor for the 4:1 dual-phase switched capacitor converter 200 can be very small, or the output capacitor can be removed. The small output capacitor is used only to filter out very high frequency components of VOUT, while allowing VOUT to vary in a frequency approximately equal to twice the switching frequency. The variations of VOUT allow soft charging and discharging of flying capacitors, which reduces the charge sharing loss caused by current spikes when charge transferring occurs between capacitors.

Figure 12:
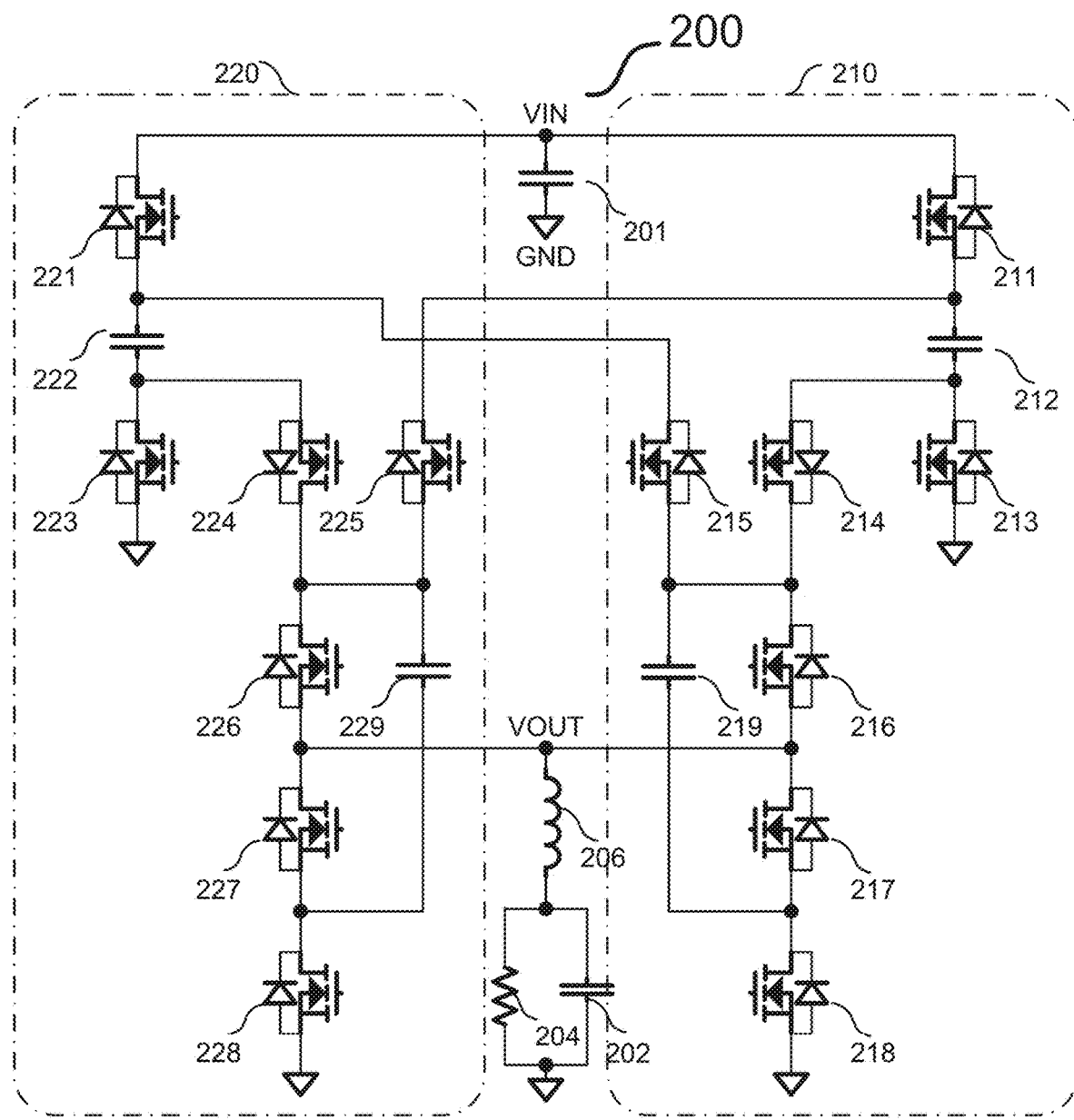
FIG. 12 illustrates a power conversion system including the 4:1 dual-phase switched capacitor converter and an output filter in accordance with various embodiments of the present disclosure.

FIG. 12 illustrates a power conversion system including the 4:1 dual-phase switched capacitor converter and an output filter in accordance with various embodiments of the present disclosure. The 4:1 dual-phase switched capacitor converter shown in FIG. 12 similar to that shown in FIG. 3 except that an LC filter is connected to VOUT. The LC filter comprises an inductor 206 and a capacitor 202. The capacitor 202 is connected in parallel with a load resistor 204. Similar to the circuit configuration illustrated in FIG. 11, the inductor at the output of the 4:1 dual-phase switched capacitor converter allows the voltage at VOUT to vary and limits the current spike when the output capacitor 202 is charged, which in turn allows soft charging and discharging of flying capacitors, which reduces the charge sharing loss caused by current spikes when charge transferring occurs between capacitors.

In some applications, the output current may be small. In order to further reduce the cost of chips and circuits and PCB area, the circuit in FIG. 3 can be simplified from a dual-phase converter to a single-phase converter shown in FIG. 13.

Figure 13:
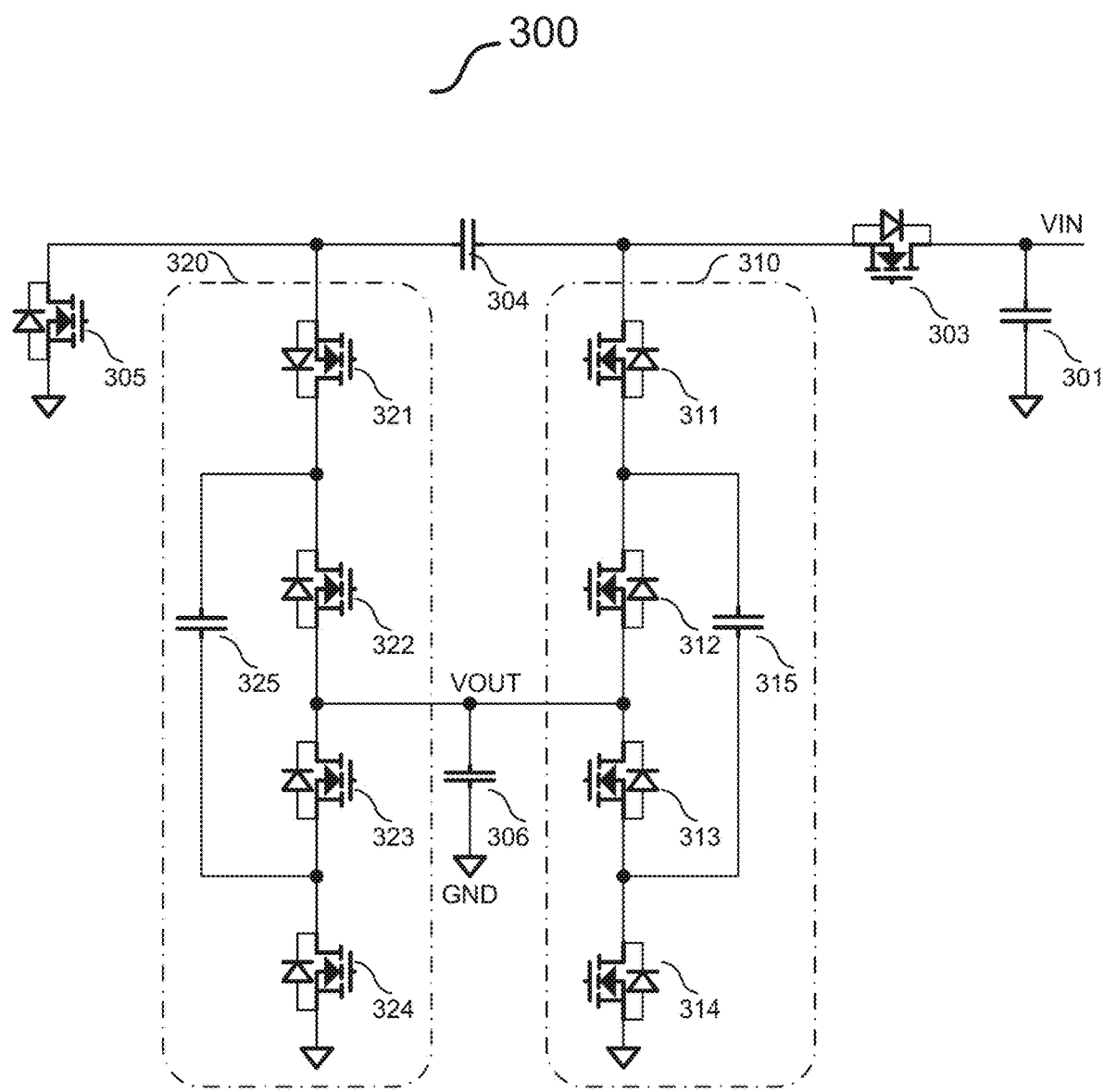
FIG. 13 illustrates a schematic diagram of a 4:1 single-phase switched capacitor converter in accordance with various embodiments of the present disclosure.

FIG. 13 illustrates a schematic diagram of a 4:1 single-phase switched capacitor converter in accordance with various embodiments of the present disclosure. The 4:1 single-phase switched capacitor converter 300 comprises switches 303, 305, a flying capacitor 304, a first phase 310, a second phase 320, an input capacitor 304, and an output capacitor 306.

The flying capacitor 304 is connected between the switches 303 and 305. The switch 303 is connected between the input terminal VIN and the flying capacitor 304. The switch 305 is connected between the flying capacitor 304 and the ground GND. The first phase 310 comprises four switches 311, 312, 313, 314 connected in series between a common node of the switch 303 and the flying capacitor 304, and the ground GND. A flying capacitor 315 is connected between a common node of switches 311 and 312, and a common node of switches 313 and 314.

The second phase 320 comprises four switches 321, 322, 323, 324 connected in series between a common node of the switch 305 and the flying capacitor 304, and the ground GND. A flying capacitor 325 is connected between a common node of switches 321 and 322, and a common node of switches 323 and 324. Throughout the description, a first leg of the 4:1 single-phase switched capacitor converter is a switch leg comprising switches 321, 322, 323 and 324. A second leg of the 4:1 single-phase switched capacitor converter is a switch leg comprising switches 311, 312, 313 and 314. Switch 305 may be referred to as a first upper switch. Switch 303 may be referred to as a second upper switch.

In operation, when the 4:1 single-phase switched capacitor converter 300 is configured as a 4:1 step-down converter, all the switches are switched on and off alternately at a specific operating frequency with a 50% duty cycle.

In operation, in a first half cycle, the switch 303 is turned on, and the switch 305 is turned off. The switches 312 and 314 of the first phase 310 are turned on, and the switches 311 and 313 are turned off. The switches 321 and 323 of the second phase 320 are turned on, and the switches 322 and 324 are turned off. The flying capacitors 304, 325 and the output capacitor 306 are connected in series. VIN charges the flying capacitors 304, 325 and the output capacitor 306 through switches 303, 321, and 323. In addition, VIN supplies power to the output terminal VOUT. At this time, the flying capacitors 304 and 325 are connected in series with the output capacitor 306. The sum of the average voltages on the flying capacitors 304, 325 and the output capacitor 306 is equal to the input voltage VIN.

Also, in the first half cycle, the flying capacitor 315 charges the output capacitor 306 through switches 312 and 314. In addition, the flying capacitor 315 supplies power to the output VOUT. Because the flying capacitor 315 is connected in parallel with the output capacitor 306, the average voltage on the flying capacitor 315 is equal to the output voltage VOUT.

In a second half period, the switch 305 is turned on. The switch 303 is turned off. The switches 311 and 313 of the first phase 310 are turned on, and the switches 312 and 314 are turned off. The switches 322 and 324 of the second phase 320 are turned on, and the switches 321 and 323 are turned off. The flying capacitor 315 and the output capacitor 306 are connected in series. The flying capacitor 304 charges the flying capacitor 315 and the output capacitor 306 through the switches 305, 311, and 313. In addition, the flying capacitor 304 supplies power to the output terminal VOUT. At this time, the flying capacitor 315 and the output capacitor 306 are connected in series, and further connected in parallel with the flying capacitor 304. Therefore, the average voltage on the flying capacitor 304 is equal to the sum of the average voltages on the flying capacitor 315 and the output capacitor 306. In other words, the average voltage on the flying capacitor 304 is twice the output voltage VOUT.

Also, in the second half period, the flying capacitor 325 charges the output capacitor 306 through the switches 322 and 324. In addition, the flying capacitor 325 supplies power to the output VOUT. Because the flying capacitor 325 is connected in parallel with the output capacitor 306, the average voltage on the flying capacitor 325 is equal to the output voltage VOUT.

As mentioned above, the sum of the average voltages on the flying capacitors 304, 325 and the output capacitor 306 is equal to the input voltage VIN, and the average voltage on the flying capacitor 304 is equal to one half of the input voltage (VIN/2). In this way, when the switching frequency is fast enough, the voltages of the flying capacitors 304, 315, 325 and the output capacitor 306 fluctuate around an average value with each switching state. The average voltage on the flying capacitor 304 is equal to one half of the input voltage (VIN/2). The average voltages on the flying capacitors 315, 325 and the output capacitor 306 are equal to the output voltage VOUT. The power conversion ratio of the single-phase switched capacitor converter shown in FIG. 13 is equal to 4:1.

Figure 14:
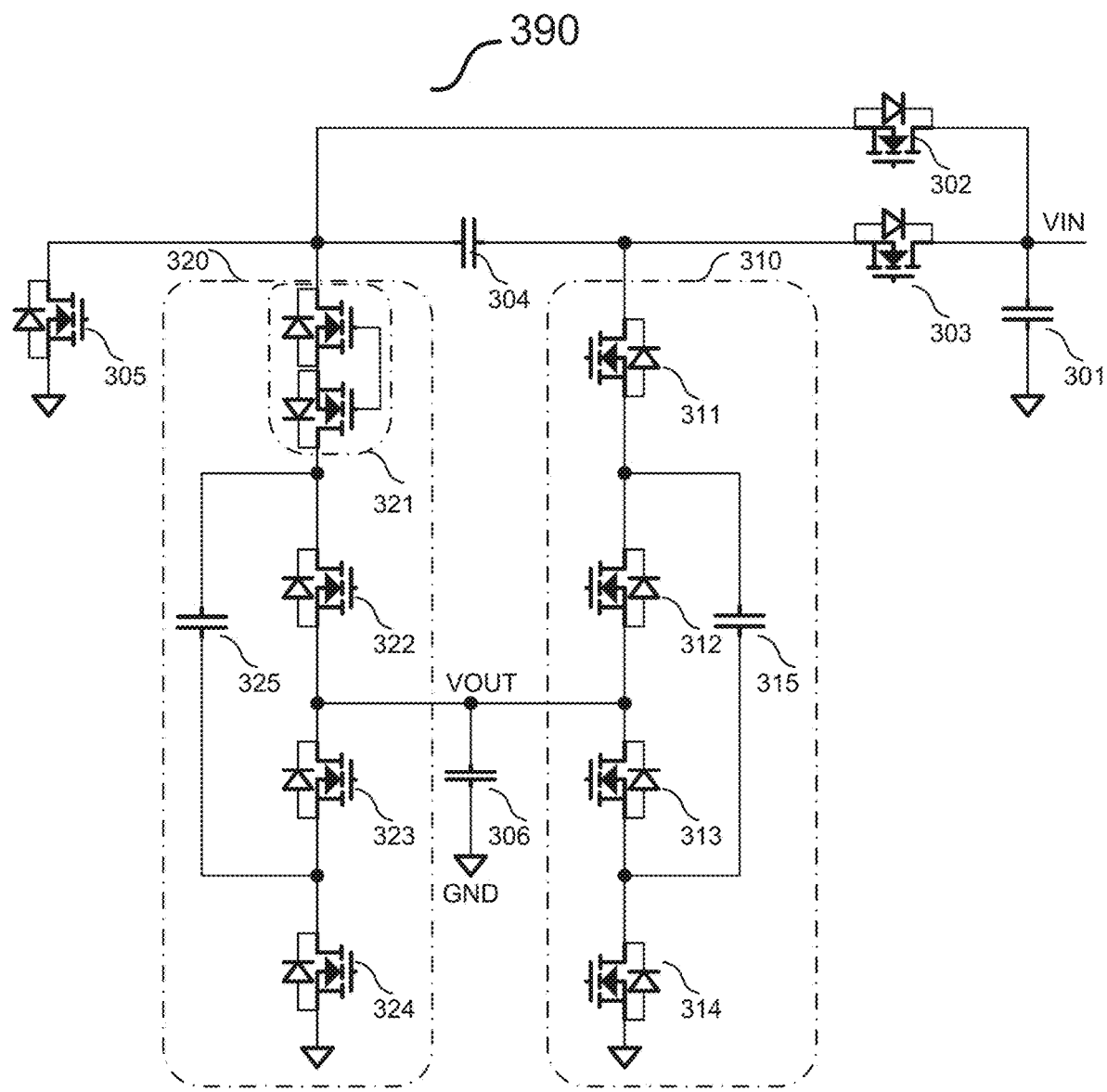
FIG. 14 illustrates a schematic diagram of a 2:1 or a 4:1 single-phase switched capacitor converter in accordance with various embodiments of the present disclosure.

FIG. 14 illustrates a schematic diagram of a 2:1 single-phase switched capacitor converter in accordance with various embodiments of the present disclosure. The structure of the single-phase switched capacitor converter shown in FIG.

14 is similar to that shown in FIG. 13 except that a switch 302 added to achieve a 2:1 conversion ratio.

In operation, the switches 302 and 303 are always in the on state, and the switch 305 is always in the off state. In addition, switch 321 comprises two back-to-back connected MOSFET switches as shown in FIG. 14. The remaining switches alternately switch at a specific operating frequency with a 50% duty cycle. In this configuration, the flying capacitor 304 is short-circuited by the switches 302 and 303. The voltage across the flying capacitor 304 is equal to zero.

In a first half cycle, the switches 311 and 313 of the first phase 310 are turned on, and the switches 312 and 315 are turned off. The switches 322 and 324 of the second phase 320 are turned on, and the switches 321 and 323 are turned off. The flying capacitor 315 and the output capacitor 306 are connected in series. VIN charges the flying capacitor 315 and the output capacitor 306 through switches 311 and 313. In addition, VIN supplies power to the output terminal VOUT. The sum of the average voltage on the flying capacitor 315 and the output capacitor 306 is equal to the input voltage VIN.

Also, in the first half cycle, the flying capacitor 325 charges the output capacitor 306 through the switches 322 and 324. In addition, the flying capacitor 325 supplies power to the output VOUT. Because the flying capacitor 325 is connected in parallel with the output capacitor 306, the average voltage on the flying capacitor 325 is equal to the output voltage VOUT.

In a second half cycle, the switches 312 and 314 of the first phase 310 are turned on, and the switches 311 and 313 are turned off. The switches 321 and 323 of the second phase 320 are turned on, and the switches 322 and 324 are turned off. The flying capacitor 325 and the output capacitor 306 are connected in series. VIN charges the flying capacitor 325 and the output capacitor 306 through switches 302, 321 and 323. In addition, VIN supplies power to the output terminal VOUT.

Also, in the second half cycle, the flying capacitor 325 and the output capacitor 306 are connected in series. The sum of the average voltage on the flying capacitor 325 and the output capacitor 306 is equal to the input voltage VIN. As mentioned earlier, the average voltage of the flying capacitor 325 is equal to the output voltage VOUT. Therefore, the average voltage on the flying capacitor 325 and the output capacitor 306 is equal to one half of the input voltage (VIN/2). At the same time, the flying capacitor 315 charges the output capacitor 306 through the switches 312 and 314 and supplies power to the output VOUT. Because the flying capacitor 315 is connected in parallel with the output capacitor 306, the average voltage on the flying capacitor 315 is equal to the output voltage VOUT. VOUT is equal to one half of the input voltage (VIN/2).

In this configuration, when the switching frequency is fast enough, the voltages on the flying capacitors 315, 325, and the output capacitor 306 fluctuate around a constant value (VIN/2) with each switching state. The power conversion ratio of the single-phase switched capacitor converter shown in FIG. 14 is equal to 2:1.

In some embodiments, the dual-phase switched capacitor converter shown in FIG. 3 and the single-phase switched capacitor converter shown in FIG. 13 can also be extended to a 2N:1 step-down ratio, where N is an integer. When N is equal to three, the switched capacitor converter is a 6:1 dual-phase switched capacitor converter or a 6:1 single-phase switched capacitor converter, which are discussed below with respect to FIGS. 17 and 18, respectively. When N is equal to four, the switched capacitor converter is an 8:1 dual-phase switched capacitor converter or an 8:1 single-phase switched capacitor converter, which are discussed below with respect to FIGS. 15 and 16, respectively. Moreover, a 2×N:1 dual-phase switched capacitor converter or a 2×N:1 single-phase switched capacitor converter, which are discussed below with respect to FIGS. 19 and 20.

Figure 15:
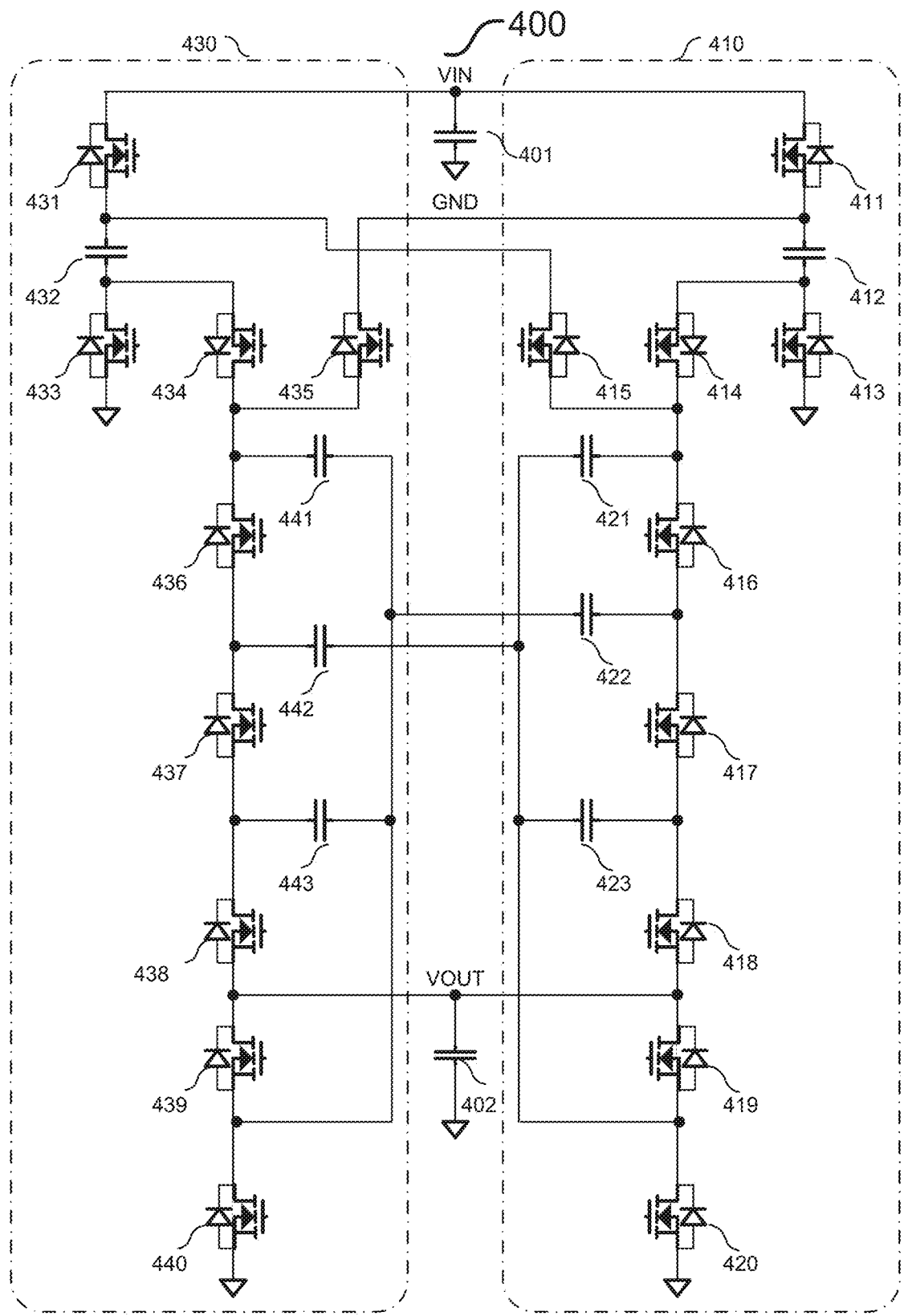
FIG. 15 illustrates a schematic diagram of an 8:1 dual-phase switched capacitor converter in accordance with various embodiments of the present disclosure.

FIG. 15 illustrates a schematic diagram of an 8:1 dual-phase switched capacitor converter in accordance with various embodiments of the present disclosure. The 8:1 dual-phase switched capacitor converter 400 comprises eighteen switches, eight flying capacitors, one input capacitor and one output capacitor. A first phase 410 includes switches 411, 413, 414, 415, 416, 417, 418, 419, and 420, and flying capacitors 412, 421, 422, and 423. A second phase 430 includes switches 431, 433, 434, 435, 436, 437, 438, 439, and 440, and flying capacitors 432, 441, 442, and 443. The two phases share the input capacitor 401, which is connected between the input terminal VIN and the ground GND. The two phases share the output capacitor 402, which is connected between the input and output terminals VOUT and the ground GND. Throughout the description, a first leg of the 8:1 dual-phase switched capacitor converter is a switch leg comprising switches 434, 436, 437, 438, 439, and 440. A second leg of the 8:1 dual-phase switched capacitor converter is a switch leg comprising switches 415, 416, 417, 418, 419, and 420. Switch 433 may be referred to as a first upper switch. Switch 431 may be referred to as a second upper switch. Switch 413 may be referred to as a third upper switch. Switch 411 may be referred to as a fourth upper switch. Switch 435 may be referred to as a fifth upper switch. Switch 414 may be referred to as a sixth upper switch.

In operation, all the switches switch alternately with a 50% duty cycle at a specific operating frequency. Among them, the working principle of the circuit formed by the switches 411, 413, 414, 415, 431, 433, 434, 435, flying capacitors 412, 432 and the input capacitor 401 is the same as that of the corresponding parts in FIG. 3. Therefore, the average voltages across the flying capacitors 412 and 432 are equal to one half of the input voltage (VIN/2). The operating principle of the circuit formed by the switches 418, 419, 420, 438, 439, 440, flying capacitors 423, 443, and output capacitor 402 is the same as the corresponding parts in FIG. 3. Therefore, the average voltages across the flying capacitors 423 and 443 are equal to the output voltage VOUT.

In a first half cycle, the switches 411, 414, 415, 417, and 419 of the first phase 410 are turned on, and the switches 413, 416, 418, and 420 are turned off. The switches 433, 436, 438, and 440 of the second phase 430 are turned on, and the switches 431, 434, 435, 437, and 439 are turned off. The flying capacitors 412, 421 and the output capacitor 402 are connected in series. VIN charges the flying capacitors 412, 421 and the output capacitor 402 through the switches 411, 414, and 419. In addition, VIN supplies power to the output terminal VOUT. At this time, the flying capacitors 412 and 421 are connected in series with the output capacitor 402. The sum of the average voltages on the flying capacitors 412, 421 and the output capacitor 402 is equal to the input voltage VIN. Because the voltage on the flying capacitor 412 is equal to one half of the input voltage, the sum of the voltage on the flying capacitor 421 and the output capacitor 402 is equal to one half of the input voltage VIN.

Also, in the first half cycle, the flying capacitor 423 and the output capacitor 402 are connected in series. The flying capacitor 422 charges the flying capacitor 423 and the output capacitor 402 through the switches 417, 419, and 440. In addition, the flying capacitor 422 supplies power to the output terminal VOUT. Because the voltage on the flying capacitor 423 is equal to the output voltage VOUT, the average voltage on the flying capacitor 422 is equal to twice the output voltage (2×VOUT).

Also, in the first half cycle, the flying capacitor 421 and the output capacitor 402 are connected in series. The flying capacitor 432 charges the flying capacitor 421 and the output capacitor 402 through the switches 433, 415, and 419. In addition, the flying capacitor 432 supplies power to the output terminal VOUT. The flying capacitor 442 and the output capacitor 402 are connected in series. The flying capacitor 441 charges the flying capacitor 442 and the output capacitor 402 through the switches 436, 419, and 440. In addition, the flying capacitor 441 supplies power to the output terminal VOUT. The voltage on the flying capacitor 441 is equal to the sum of the average voltages on the flying capacitor 442 and the output capacitor 402. The flying capacitor 443 charges the output capacitor 402 through the switches 438 and 440, and supplies power to the output terminal VOUT.

In a second half cycle, the switches 413, 416, 418, and 420 of the first phase 410 are turned on, and the switches 411, 414, 415, 417, and 419 are turned off. The switches 431, 434, 435, 437, and 439 of the second phase 430 are turned on, and the switches 433, 436, 438, and 440 are turned off. The flying capacitors 432, 441 and the output capacitor 402 are connected in series. VIN charges the flying capacitors 432, 441 and the output capacitor 402 through the switches 431, 434, and 440, and supplies power to the output terminal VOUT. Because the voltage on the flying capacitor 432 is equal to one half of the input voltage VIN, the sum of the average voltages on the flying capacitor 441 and the output capacitor 402 is equal to one half of the input voltage (VIN/2).

Also, in the second half cycle, the flying capacitor 443 and the output capacitor 402 are connected in series. The flying capacitor 442 charges the flying capacitor 443 and the output capacitor 402 through the switches 437, 439, and 420. In addition, the flying capacitor 442 supplies power to the output terminal VOUT. Because the voltage on the flying capacitor 443 is equal to the output voltage VOUT, the average voltage on the flying capacitor 442 is equal to twice the output voltage (2×VOUT).

Also, in the second half cycle, the flying capacitor 441 and the output capacitor 402 are connected in series. The flying capacitor 412 charges the flying capacitor 441 and the output capacitor 402 through the switches 413, 435, and 439 and supplies power to the output terminal VOUT. Also, in the second half cycle, the flying capacitor 443 and the output capacitor 402 are connected in series. The flying capacitor 442 charges the flying capacitor 443 and the output capacitor 402 through the switches 437, 439, and 420, and supplies power to the output terminal VOUT. The average voltage on the flying capacitor 442 is equal to the sum of the average voltages on the flying capacitor 443 and the output capacitor 402. Therefore, the average voltage on the flying capacitor 442 is equal to twice the output voltage (2×VOUT).

As mentioned above, the voltage on the flying capacitor 441 is equal to the sum of the average voltages on the flying capacitor 442 and the output capacitor 402. Therefore, the voltage on the flying capacitor 441 is equal to three times the output voltage (3×VOUT). Similarly, it can be concluded that the voltage on the flying capacitor 421 is three times the output voltage (3×VOUT). Because the sum of the average voltages on the flying capacitors 421, 441 and the output capacitor 402 is equal to the voltages on the flying capacitors 412 and 432, and the voltages on the flying capacitors 412 and 432 are equal to one half of the input voltage, the output voltage VOUT is equal to one-eighth of the voltage (VIN/8).

In this configuration, when the switching frequency is fast enough, the voltages on the flying capacitors 412, 432, 421, 441, 422, 442, 423, 443 and the output capacitor 402 fluctuate around a constant value with each switching state. The power conversion ratio of the dual-phase switched capacitor converter shown in FIG. 15 is equal to 8:1.

In some embodiments, the voltages on the flying capacitors 412 and 432 are equal to one half of the input voltage or four times the output voltage (VIN/2 or 4×VOUT). The voltages on the flying capacitors 421 and 441 are equal to three times the output voltage (3×VOUT). The voltages on the flying capacitors 422 and 442 are equal to twice the output voltage (2×VOUT). The voltages on the flying capacitors 423 and 443 are equal to the output voltage (VOUT). Switches 416, 417, 418, 419, 420, 436, 437, 438, 439, and 440, as well as capacitors 421, 422, 423, 441, 442, 443, and output capacitor 402 forms a cross-coupled two-phase switched capacitor converter.

Figure 16:
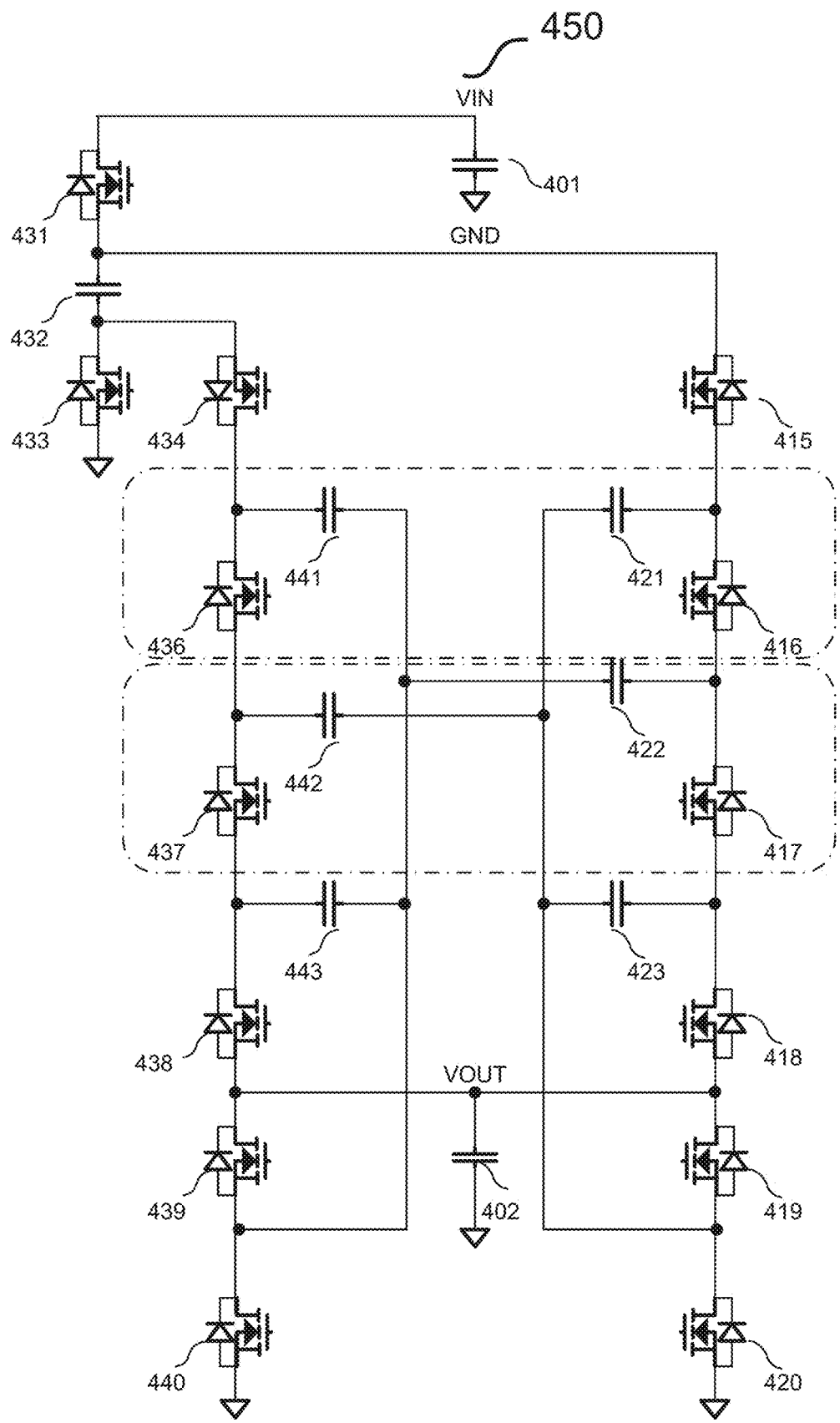
FIG. 16 illustrates a schematic diagram of an 8:1 single-phase switched capacitor converter in accordance with various embodiments of the present disclosure.

FIG. 16 illustrates a schematic diagram of an 8:1 single-phase switched capacitor converter in accordance with various embodiments of the present disclosure. The operating principle of the single-phase switched capacitor converter has been described above with respect to FIG. 13, and hence is not discussed again herein.

As shown in FIG. 16, a first switch 440, a second switch 439, a third switch 438, a fourth switch 437, a fifth switch 436 and a sixth switch 434 of the first leg are connected in series between ground and a first voltage node (a common node of 433 and 432). A first switch 420, a second switch 419, a third switch 418, a fourth switch 417, a fifth switch 416 and a sixth switch 415 of the second leg are connected in series between ground and a second voltage node (a common node of 432 and 431).

The first flying capacitor 443 is connected between the common node of the first switch 440 and the second switch 439 of the first leg, and the common node of the third switch 438 and the fourth switch 437 of the first leg. The second flying capacitor 423 is connected between the common node of the first switch 420 and the second switch 419 of the second leg, and the common node of the third switch 418 and the fourth switch 417 of the second leg.

The third flying capacitor 432 is connected between the first voltage node and the second voltage node. The fourth flying capacitor 442 is connected between a common node of the fourth switch 437 and the fifth switch 436 of the first leg, and the common node of the first switch 440 and the second switch 439 of the second leg. The fifth flying capacitor 422 is connected between a common node of the fourth switch 417 and the fifth switch 416 of the second leg, and the common node of the first switch 420 and the second switch 419 of the first leg.

The sixth flying capacitor 441 is connected between a common node of the fifth switch 436 and the sixth switch 434 of the first leg, and the common node of the first switch 440 and the second switch 439 of the first leg. The seventh flying capacitor 421 is connected between a common node of the fifth switch 416 and the sixth switch 415 of the second leg, and the common node of the first switch 420 and the second switch 419 of the second leg. The first upper switch 433 is connected between the first voltage node and ground. The second upper switch 431 connected between the second voltage node and the input terminal.

Referring back to FIG. 15, the 8:1 dual-phase switched capacitor converter further comprises an eighth flying capacitor 412 connected between a third voltage node (a common node of 413 and 412) and a fourth voltage node (a common node of 412 and 411), a third upper switch 413 connected between the third voltage node and ground, a fourth upper switch 411 connected between the fourth voltage node and the input terminal, a fifth upper switch 435 connected between the common node of the fifth switch 436 and the sixth switch 434 of the first leg, and the fourth voltage node, and a sixth upper switch 414 connected between the common node of the fifth switch 416 and the sixth switch 415 of the second leg, and the third voltage node.

Figure 17:
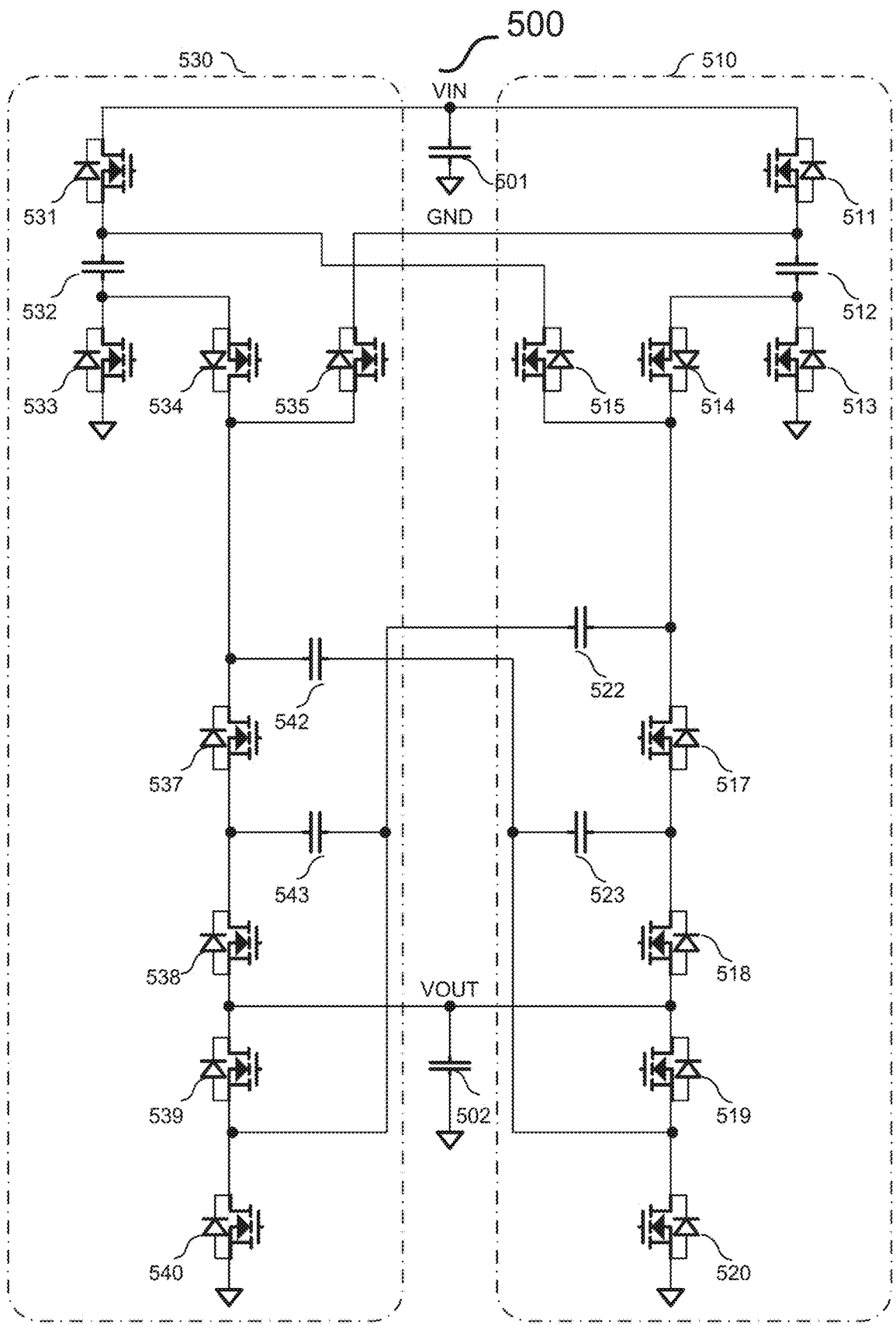
FIG. 17 illustrates a schematic diagram of a 6:1 dual-phase switched capacitor converter in accordance with various embodiments of the present disclosure.

FIG. 17 illustrates a schematic diagram of a 6:1 dual-phase switched capacitor converter in accordance with various embodiments of the present disclosure. The 6:1 dual-phase switched capacitor converter 500 comprises sixteen switches, six flying capacitors, one input capacitor and one output capacitor. A first phase 510 includes switches 511, 513, 514, 515, 517, 518, 519, and 520, and flying capacitors 512, 522, and 523. A second phase 530 includes switches 531, 533, 534, 535, 537, 538, 539, and 540, and flying capacitors 532, 542, and 543. The two phases share the input capacitor 501, which is connected between the input terminal VIN and the ground GND. The two phases share the output capacitor 502, which is connected between the input and output terminals VOUT and the ground GND. Throughout the description, a first leg of the 6:1 dual-phase switched capacitor converter is a switch leg comprising switches 534, 537, 538, 539, and 540. A second leg of the 6:1 dual-phase switched capacitor converter is a switch leg comprising switches 515, 517, 518, 519, and 520. Switch 533 may be referred to as a first upper switch. Switch 531 may be referred to as a second upper switch. Switch 513 may be referred to as a third upper switch. Switch 511 may be referred to as a fourth upper switch. Switch 535 may be referred to as a fifth upper switch. Switch 514 may be referred to as a sixth upper switch.

The operating principle of the 6:1 dual-phase switched capacitor converter is similar to that of the 8:1 dual-phase switched capacitor converter FIG. 15, and hence is not discussed again herein.

Figure 18:
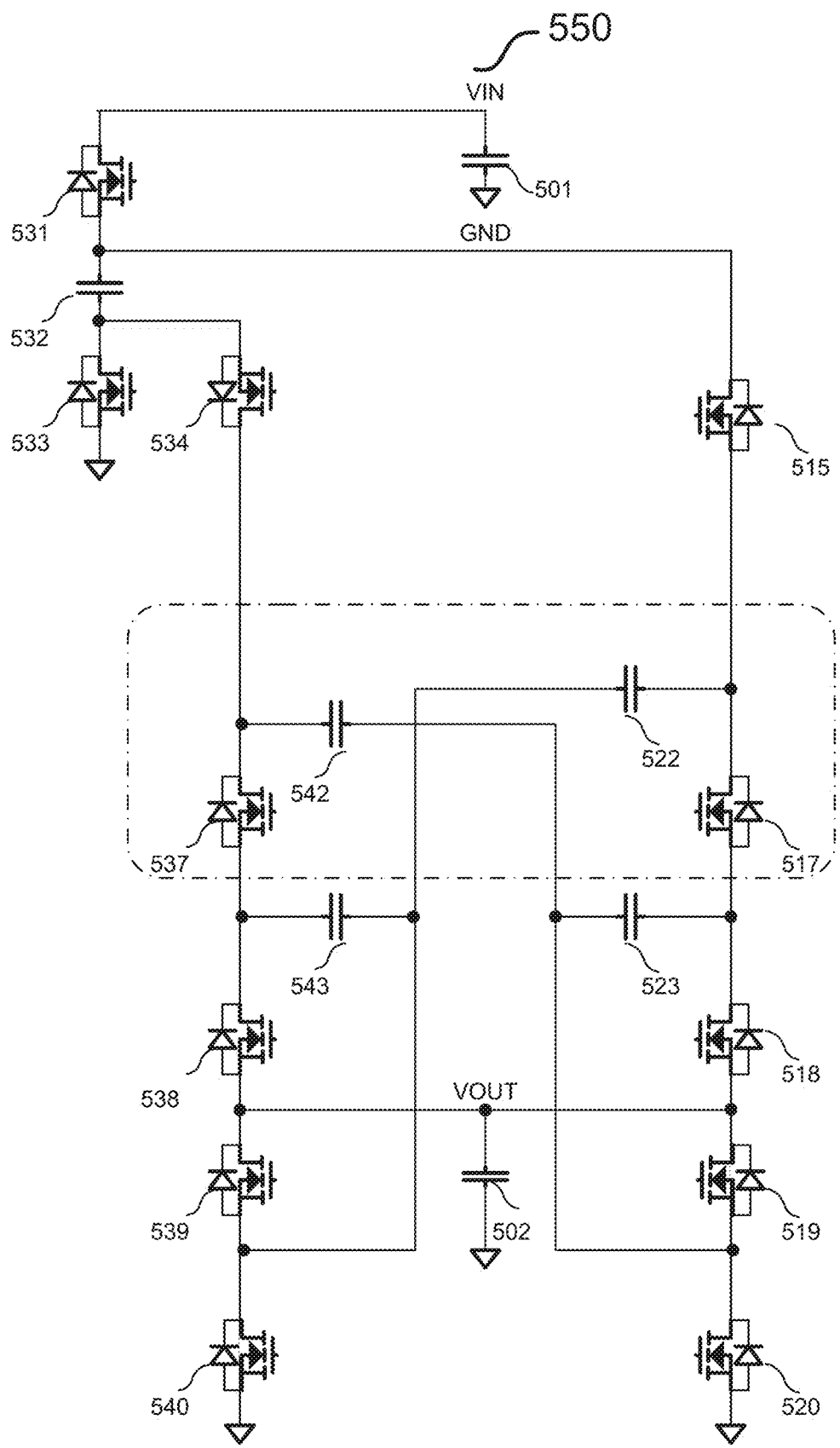
FIG. 18 illustrates a schematic diagram of a 6:1 single-phase switched capacitor converter in accordance with various embodiments of the present disclosure.

FIG. 18 illustrates a schematic diagram of a 6:1 single-phase switched capacitor converter in accordance with various embodiments of the present disclosure. The operating principle of the single-phase switched capacitor converter has been described above with respect to FIG. 13, and hence is not discussed again herein.

As shown in FIG. 18, a first switch 540, a second switch 539, a third switch 538, a fourth switch 537 and a fifth switch 534 of the first leg are connected in series between ground and a first voltage node (a common node of 533 and 532). A first switch 520, a second switch 519, a third switch 518, a fourth switch 517 and a fifth switch 515 of the second leg are connected in series between ground and a second voltage node (a common node of 531 and 532).

The first flying capacitor 543 is connected between the common node of the first switch 540 and the second switch 539 of the first leg, and the common node of the third switch 538 and the fourth switch 537 of the first leg. The second flying capacitor 523 is connected between the common node of the first switch 520 and the second switch 519 of the second leg, and the common node of the third switch 518 and the fourth switch 517 of the second leg.

The third flying capacitor 532 is connected between the first voltage node and the second voltage node. The fourth flying capacitor 542 is connected between a common node of the fourth switch 537 and the fifth switch 534 of the first leg, and the common node of the first switch 520 and the second switch 519 of the second leg. The fifth flying capacitor 522 is connected between a common node of the fourth switch 517 and the fifth switch 515 of the second leg, and the common node of the first switch 540 and the second switch 539 of the first leg. The first upper switch 533 is connected between the first voltage node and ground. The second upper switch 531 connected between the second voltage node and the input terminal.

Referring back to FIG. 17, the 6:1 dual-phase switched capacitor converter 500 further comprises a sixth flying capacitor 512 connected between a third voltage node (a common node of 512 and 513) and a fourth voltage node (a common node of 512 and 511), a third upper switch 513 connected between the third voltage node and ground, a fourth upper switch 511 connected between the fourth voltage node and the input terminal, a fifth upper switch 535 connected between the common node of the fourth switch 537 and the fifth switch 534 of the first leg, and the fourth voltage node, and a sixth upper switch 514 connected between the common node of the fourth switch 517 and the fifth switch 515 of the second leg, and the third voltage node.

Figure 19:
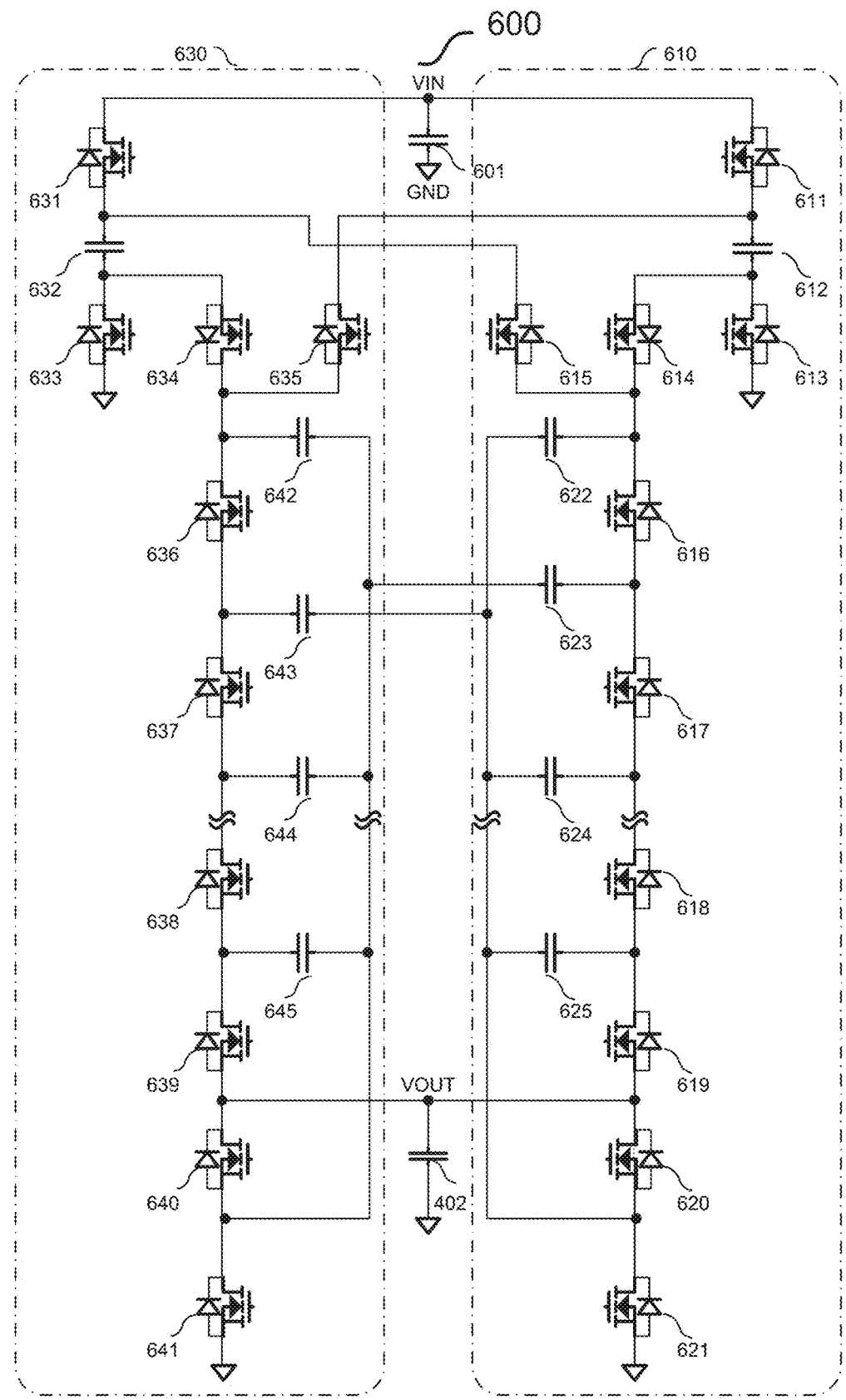
FIG. 19 illustrates a schematic diagram of a 2×N:1 dual-phase switched capacitor converter in accordance with various embodiments of the present disclosure.

FIG. 19 illustrates a schematic diagram of a 2×N:1 dual-phase switched capacitor converter in accordance with various embodiments of the present disclosure. After a given integer N, the number of switches and flying capacitors required by the circuit of the present invention is determined. In the 2×N:1 dual-phase switched capacitor converter 600, the number of switches is equal to 2×N+10. The number of flying capacitors is equal to 2×N.

Throughout the description, a first leg of the 2×N:1 dual-phase switched capacitor converter is a switch leg comprising switches 634, 636, 637, 638, 639, 640 and 641. A second leg of the 2×N:1 dual-phase switched capacitor converter is a switch leg comprising switches 615, 616, 617, 618, 619, 620 and 621. Switch 633 may be referred to as a first upper switch. Switch 631 may be referred to as a second upper switch. Switch 613 may be referred to as a third upper switch. Switch 611 may be referred to as a fourth upper switch. Switch 635 may be referred to as a fifth upper switch. Switch 614 may be referred to as a sixth upper switch.

Figure 20:
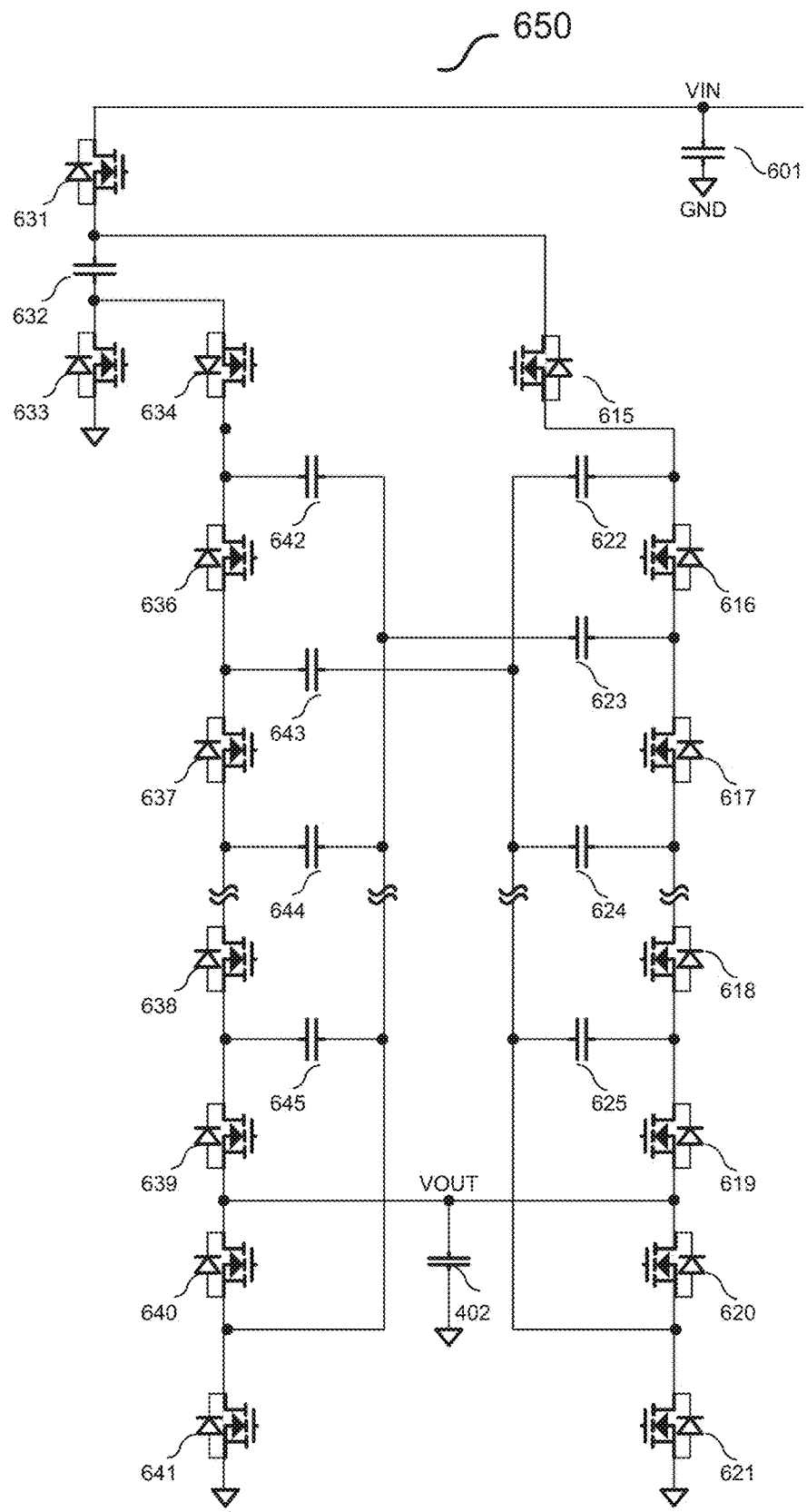
FIG. 20 illustrates a schematic diagram of a 2×N:1 single-phase switched capacitor converter in accordance with various embodiments of the present disclosure.

FIG. 20 illustrates a schematic diagram of a 2×N:1 single-phase switched capacitor converter in accordance with various embodiments of the present disclosure. The operating principle of the single-phase switched capacitor converter has been described above with respect to FIG. 13, and hence is not discussed again herein.

As shown in FIG. 20, (N+2) switches of the first leg are connected in series between ground and a first voltage node (a common node of 632 and 633). (N+2) switches of the second leg are connected in series between ground and a second voltage node (a common node of 632 and 631).

A first flying capacitor 645 of the (2×N−1) flying capacitors is connected between the common node of the first switch 641 and the second switch 640 of the first leg, and the common node of the third switch 639 and the fourth switch 638 of the first leg. A second flying capacitor 625 of the (2×N−1) flying capacitors is connected between the common node of the first switch 621 and the second switch 620 of the second leg, and the common node of the third switch 619 and the fourth switch 618 of the second leg.

A third flying capacitor 632 is connected between the first voltage node and the second voltage node. Let M represent an integer between 2 and N−1. One terminal of a (2×M)th flying capacitor is connected to a common node of an (M+2)th switch and an (M+3)th switch of the first leg, and the other terminal of the (2×M)th flying capacitor is connected to the common node of the first switch and the second switch of either the second leg when M is an even number, or the first leg when M is an odd number.

One terminal of a (2×M+1)th flying capacitor is connected between a common node of an (M+2)th switch and an (M+3)th switch of the second leg, and the other terminal of the (2×M)th flying capacitor is connected to the common node of the first switch and the second switch of either the first leg when M is an even number, or the second leg when M is an odd number.

As a result of this arrangement, when M is 2, a fourth flying capacitor is connected between a common node of the fourth switch and the fifth switch of the first leg, and the common node of the first switch and the second switch of the second leg. A fifth flying capacitor is connected between a common node of the fourth switch and the fifth switch of the second leg, and the common node of the first switch and the second switch of the first leg.

Similarly, when M is equal to N−2, and N is an even number, a (2×N−4)th flying capacitor 643 is connected between a common node of an Nth switch 637 and an (N+1)th switch 636 of the first leg, and the common node of the first switch 621 and the second switch 620 of the second leg. A (2×N−3)th flying capacitor 623 is connected between a common node of an Nth switch 617 and an (N+1)th switch 616 of the second leg, and the common node of the first switch 641 and the second switch 640 of the first leg.

When M is equal to N−1, and N is an even number, N−1 is an odd number. A (2×N−2)th flying capacitor 642 is connected between a common node of the (N+1)th switch 636 and an (N+2)th switch 634 of the first leg, and the common node of the first switch 641 and the second switch 640 of the first leg. A (2×N−1)th flying capacitor 622 is connected between a common node of the (N+1)th switch 616 and an (N+2)th switch 615 of the second leg, and the common node of the first switch 621 and the second switch 620 of the second leg. The first upper switch 633 is connected between the first voltage node and ground. The second upper switch 631 is connected between the second voltage node and the input terminal.

Referring back to FIG. 19, the 2×N:1 dual-phase switched capacitor converter 600 further comprises a (2×N)th flying capacitor 612 connected between a third voltage node (a common node of 612 and 613) and a fourth voltage node (a common node of 612 and 611), a third upper switch 613 connected between the third voltage node and ground, a fourth upper switch 611 connected between the fourth voltage node and the input terminal, a fifth upper switch 635 connected between the common node of the (N+1)th switch 636 and the (N+2)th switch 634 of the first leg, and the fourth voltage node, and a sixth upper switch 614 connected between the common node of the (N+1)th switch 616 and the (N+2)th switch 615 of the second leg, and the third voltage node.

The switched capacitor converter shown in FIG. 19 is able to achieve a voltage conversion ratio of equal to 2×N:1 as described above with respect to FIG. 19. In some embodiments, 2×N is equal to the number of flying capacitors of the switched capacitor converter. In some embodiments, the switched capacitor converter shown in FIG. 19 is able to achieve a N:1 conversion ratio through configuring the first upper switch (e.g., switch 633), the second upper switch (e.g., switch 631), the third upper switch (e.g., switch 613), the fourth upper switch (e.g., switch 611) as always-on switches and configuring the fifth upper switch (e.g., switch 635) and the sixth upper switch (e.g., switch 614) as always-off switches.

In some embodiments, the dual-phase switched capacitor converter shown in FIG. 3 and the single-phase switched capacitor converter shown in FIG. 13 can also be extended to a $2^N$:1 step-down ratio, where N is an integer. When N is equal to three, the switched capacitor converter is an 8:1 dual-phase switched capacitor converter or an 8:1 single-phase switched capacitor converter, which are discussed below with respect to FIGS. 21 and 22, respectively.

Figure 21:
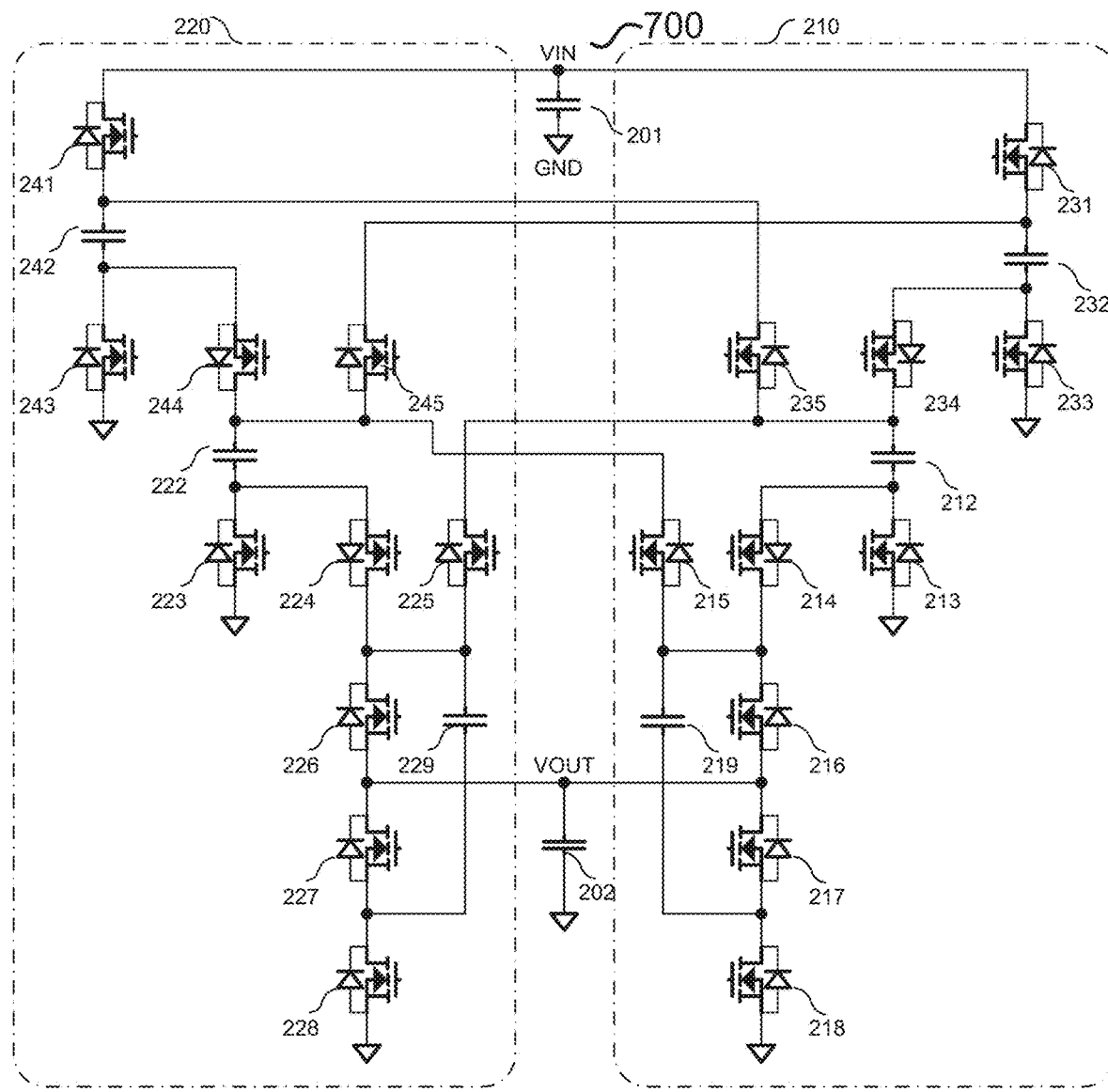
FIG. 21 illustrates an alternative schematic diagram of an 8:1 dual-phase switched capacitor converter in accordance with various embodiments of the present disclosure.

FIG. 21 illustrates an alternative schematic diagram of an 8:1 dual-phase switched capacitor converter in accordance with various embodiments of the present disclosure. The 8:1 dual-phase switched capacitor converter 700 comprises twenty switches, six flying capacitors, one input capacitor and one output capacitor. A first phase 210 includes switches 231, 233, 234, 235, 213, 214, 215, 216, 217 and 218, and flying capacitors 232, 212 and 219. A second phase 220 includes switches 241, 243, 244, 245, 223, 224, 225, 226, 227 and 228, and flying capacitors 242, 222, and 229. The two phases share the input capacitor 201, which is connected between the input terminal VIN and the ground GND. The two phases share the output capacitor 202, which is connected between the output terminals VOUT and the ground GND.

Throughout the description, a first leg of the 8:1 dual-phase switched capacitor converter is a switch leg comprising switches 228, 227, 226 and 224. A second leg of the 8:1 dual-phase switched capacitor converter is a switch leg comprising switches 218, 217, 216, and 214. Switch 223 may be referred to as a first upper switch. Switch 244 may be referred to as a second upper switch. Switch 213 may be referred to as a third upper switch. Switch 234 may be referred to as a fourth upper switch. Switch 225 may be referred to as a fifth upper switch. Switch 214 may be referred to as a sixth upper switch. Switch 243 may be referred to as a seventh upper switch. Switch 241 may be referred to as an eighth upper switch. Switch 235 may be referred to as a ninth upper switch. Switch 233 may be referred to as a tenth upper switch. Switch 231 may be referred to as an eleventh upper switch. Switch 245 may be referred to as a twelfth upper switch.

As shown in FIG. 21, a first switch 228, a second switch 227, a third switch 226, and a fourth switch 224 of the first leg are connected in series between ground and a first voltage node (a common node of 223 and 224). A first switch 218, a second switch 217, a third switch 216 and a fourth switch 215 of the second leg are connected in series between ground and a second voltage node (a common node of 214 and 213).

The first flying capacitor 229 is connected between the common node of the first switch 228 and the second switch 227 of the first leg, and the common node of the third switch 226 and the fourth switch 224 of the first leg. The second flying capacitor 219 is connected between the common node of the first switch 218 and the second switch 217 of the second leg, and the common node of the third switch 216 and the fourth switch 215 of the second leg.

The third flying capacitor 222 is connected between the first voltage node and the second voltage node. The fourth flying capacitor 212 is connected between a third voltage node (a common node of 213 and 214) and a fourth voltage node (a common node of 212 and 234). The first upper switch 223 is connected between the first voltage node and ground. The second upper switch 244 is connected between the second voltage node and a fifth voltage node. The third upper switch 213 is connected between the third voltage node and ground. The fourth upper switch 234 is connected between the fourth voltage node and a sixth voltage node. The fifth upper switch 225 is connected between the common node of the third switch 226 and the fourth switch 224 of the first leg, and the fourth voltage node. The sixth upper switch 214 is connected between the common node of the third switch 216 and the fourth switch 215 of the second leg, and the third voltage node.

The seventh upper switch 243 is connected between the fifth voltage node and ground. A fifth flying capacitor 242 is connected between the fifth voltage node and a seventh voltage node. The eighth upper switch 241 is connected between the seventh voltage node and the input terminal (VIN). The ninth upper switch 235 is connected between the seventh voltage node and the fourth voltage node. A sixth flying capacitor 232 is connected between the sixth voltage node and an eighth voltage node. The tenth upper switch 233 is connected between the sixth voltage node and ground. The eleventh upper switch 231 is connected between the eighth voltage node and the input terminal VIN. The twelfth upper switch 245 is connected between the second voltage node and the eighth voltage node.

In operation, all the switches switch alternately with a 50% duty cycle at a specific operating frequency. Among them, the working principle of the circuit formed by the switches 231, 233, 234, 235, 241, 243, 244, 245, the flying capacitors 232, 242 and the input capacitor 201 is the same as that of the corresponding parts in FIG. 3. Therefore, the average voltages across the flying capacitors 232 and 242 are equal to one half of the input voltage (VIN/2). The operating principle of the circuit formed by the switches 216, 217, 218, 226, 227, 228, the flying capacitors 229, 219, and output capacitor 202 is the same as the corresponding parts in FIG. 3. Therefore, the average voltages across the flying capacitors 219 and 229 are equal to the output voltage VOUT.

In a first half cycle, the switches 231, 234, 235, 214, 215 and 217 of the first phase 210 are turned on, and the switches 233, 213, 216, and 218 are turned off. The switches 243, 223, 226 and 228 of the second phase 220 are turned on, and the switches 241, 244, 245, 224, 225 and 227 are turned off. The flying capacitors 232, 212, 219 and the output capacitor 202 are connected in series. VIN charges the flying capacitors 232, 212, 219 and the output capacitor 202 through the switches 231, 234, 214 and 217. In addition, VIN supplies power to the output terminal VOUT. At this time, the flying capacitors 232, 212 and 219 are connected in series with the output capacitor 202. The sum of the average voltages on the flying capacitors 232, 212, 219 and the output capacitor 202 is equal to the input voltage VIN. Because the voltage on the flying capacitor 232 is equal to one half of the input voltage, the sum of the voltages on the flying capacitors 212, 219 and the output capacitor 202 is equal to one half of the input voltage VIN.

Also, in the first half cycle, the flying capacitor 219 and the output capacitor 202 are connected in series. The flying capacitor 222 charges the flying capacitor 219 and the output capacitor 202 through the switches 223, 215, and 217. In addition, the flying capacitor 222 supplies power to the output terminal VOUT. Because the voltage on the flying capacitor 219 is equal to the output voltage VOUT, the average voltage on the flying capacitor 222 is equal to twice the output voltage (2×VOUT).

Also, in the first half cycle, the flying capacitor 242, 212, 219 and the output capacitor 202 are connected in series. The flying capacitor 242 charges the flying capacitor 212, 219 and the output capacitor 202 through the switches 243, 235, 214 and 217. In addition, the flying capacitor 242 supplies power to the output terminal VOUT. The voltage on the flying capacitor 242 is equal to the sum of the average voltages on the flying capacitor 212, 219 and the output capacitor 202. Since the voltage on the flying capacitor 219 is equal to the output voltage VOUT, the average voltage on the flying capacitor 242 is equal to four times the output voltage (4×VOUT). Also, since the average voltage on flying capacitor 242 is also equal to VIN/2, the ratio of VIN to VOUT is 8:1. The flying capacitor 229 also charges the output capacitor 202 through the switches 226 and 228, and supplies power to the output terminal VOUT.

In a second half cycle, the switches 233, 213, 216, and 218 of the first phase 210 are turned on, and the switches 231, 234, 235, 214, 215 and 217 are turned off. The switches 241, 244, 245, 224, 225 and 227 of the second phase 220 are turned on, and the switches 223, 243, 226, and 228 are turned off. The flying capacitors 242, 222, 229 and the output capacitor 202 are connected in series. VIN charges the flying capacitors 242, 222, 229 and the output capacitor 202 through the switches 241, 244, 224 and 227, and supplies power to the output terminal VOUT. Because the voltage on the flying capacitor 242 is equal to one half of the input voltage VIN, the sum of the average voltages on the flying capacitor 222, 229 and the output capacitor 202 is equal to one half of the input voltage (VIN/2).

Also, in the second half cycle, the flying capacitor 229 and the output capacitor 202 are connected in series. The flying capacitor 212 charges the flying capacitor 229 and the output capacitor 202 through the switches 213, 225, and 227. In addition, the flying capacitor 212 supplies power to the output terminal VOUT. Because the voltage on the flying capacitor 229 is equal to the output voltage VOUT, the average voltage on the flying capacitor 212 is equal to twice the output voltage (2×VOUT).

Also, in the second half cycle, the flying capacitor 232, 222, 229 and the output capacitor 202 are connected in series. The flying capacitor 232 charges the flying capacitor 222, 229 and the output capacitor 202 through the switches 233, 245, 224 and 227. In addition, the flying capacitor 232 supplies power to the output terminal VOUT. The voltage on the flying capacitor 232 is equal to the sum of the average voltages on the flying capacitor 222, 229 and the output capacitor 202. Since the voltage on the flying capacitor 229 is equal to the output voltage VOUT, the average voltage on the flying capacitor 232 is equal to four times the output voltage (4×VOUT). Also, since the average voltage on flying capacitor 232 is also equal to VIN/2, the ratio of VIN to VOUT is 8:1. The flying capacitor 219 also charges the output capacitor 202 through the switches 216 and 218, and supplies power to the output terminal VOUT.

In this configuration, when the switching frequency is fast enough, the voltages on the flying capacitors 232, 242, 212, 222, 219, 229 and the output capacitor 402 fluctuate around a constant value with each switching state. The power conversion ratio of the dual-phase switched capacitor converter shown in FIG. 21 is equal to 8:1.

In some embodiments, the voltages on the flying capacitors 242 and 232 are equal to one half of the input voltage or four times the output voltage (VIN/2 or 4×VOUT). The voltages on the flying capacitors 212 and 222 are equal to twice the output voltage (2×VOUT). The voltages on the flying capacitors 219 and 229 are equal to the output voltage (VOUT).

Figure 22:
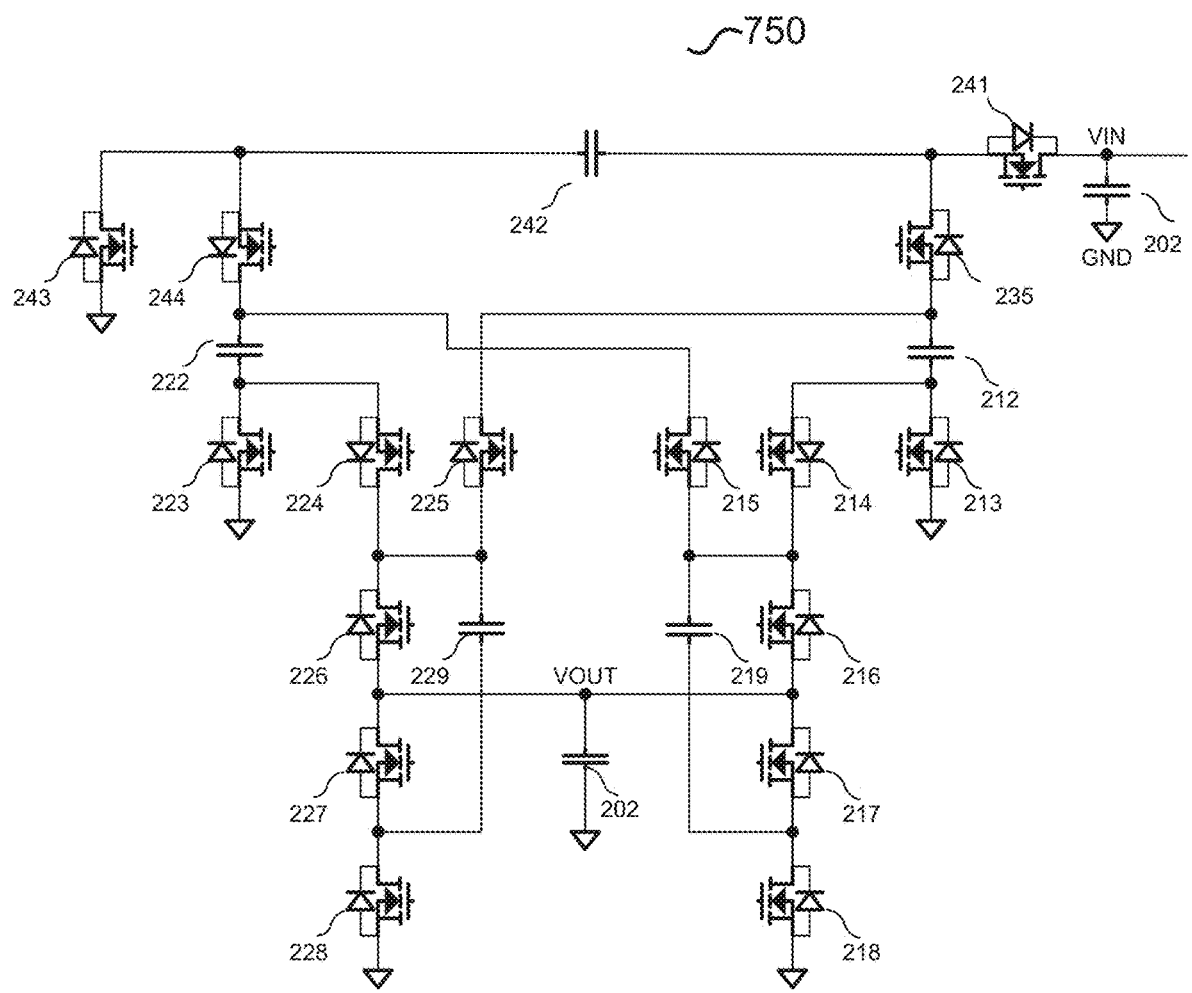
FIG. 22 illustrates a schematic diagram of an 8:1 single-phase switched capacitor converter in accordance with various embodiments of the present disclosure.

FIG. 22 illustrates a schematic diagram of an 8:1 single-phase switched capacitor converter in accordance with various embodiments of the present disclosure. The operating principle of the single-phase switched capacitor converter has been described above with respect to FIG. 13, and hence is not discussed again herein.

As shown in FIG. 22, a first switch 228, a second switch 227, a third switch 226, and a fourth switch 224 of the first leg are connected in series between ground and a first voltage node (a common node of 223 and 224). A first switch 218, a second switch 217, a third switch 216 and a fourth switch 215 of the second leg are connected in series between ground and a second voltage node (a common node of 214 and 213).

The first flying capacitor 229 is connected between the common node of the first switch 228 and the second switch 227 of the first leg, and the common node of the third switch 226 and the fourth switch 224 of the first leg. The second flying capacitor 219 is connected between the common node of the first switch 218 and the second switch 217 of the second leg, and the common node of the third switch 216 and the fourth switch 215 of the second leg.

The third flying capacitor 222 is connected between the first voltage node and the second voltage node. The fourth flying capacitor 212 is connected between a third voltage node (a common node of 213 and 214) and a fourth voltage node (a common node of 212 and 234). The first upper switch 223 is connected between the first voltage node and ground. The second upper switch 244 is connected between the second voltage node and a fifth voltage node. The third upper switch 213 is connected between the third voltage node and ground. The fourth upper switch 235 is connected between the fourth voltage node and a sixth voltage node. The fifth upper switch 225 is connected between the common node of the third switch 226 and the fourth switch 224 of the first leg, and the fourth voltage node. The sixth upper switch 214 is connected between the common node of the third switch 216 and the fourth switch 215 of the second leg, and the third voltage node. The seventh upper switch 243 is connected between the fifth voltage node and ground. A fifth flying capacitor 242 is connected between the fifth voltage node and the sixth voltage node. The eighth upper switch 241 is connected between the sixth voltage node and the input terminal (VIN).

The major advantage of the 8:1 switched capacitor converters illustrated in FIGS. 21 and 22 is that the 8:1 switched capacitor converters only require six and five flying capacitors to reach an 8:1 conversion ratio. In comparison with the switched capacitor converters shown in FIGS. 15 and 16, the switched capacitor converters illustrated in FIGS. 21 and 22 save two flying capacitors. It is more advantageous for some applications where it is critical to use less passive components.

Similar to the cascading converter configuration shown in FIG. 11, the 8:1 voltage converters shown in FIGS. 21 and 22 also can be used as a front stage in a multi-stage DC/DC conversion system to achieve a high-efficiency fixed-ratio voltage conversion.

Figure 23:
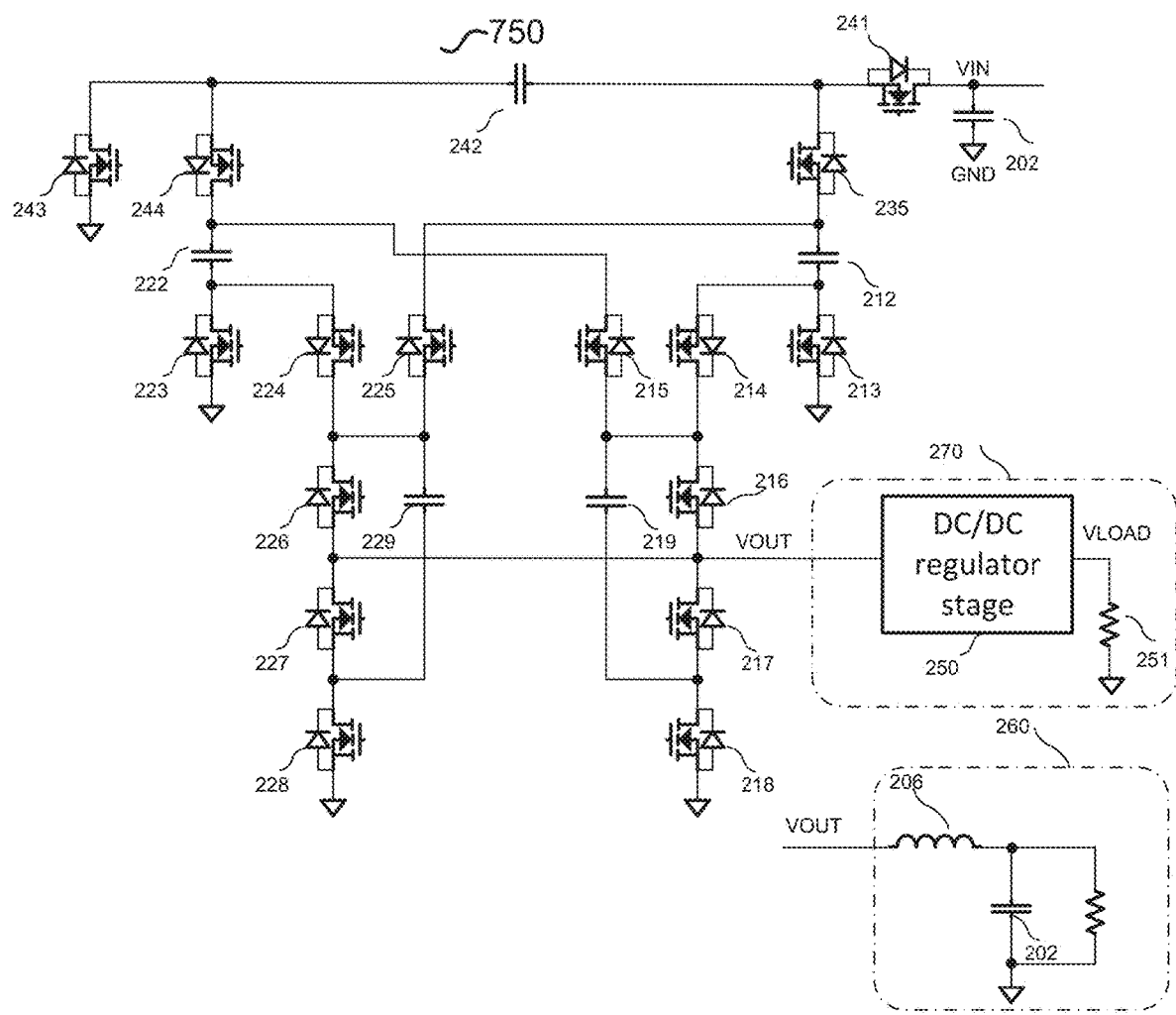
FIG. 23 illustrates a power conversion system including the 8:1 single-phase switched capacitor converter as a front stage and a DC/DC regulator stage or an LC liter as a second stage in accordance with various embodiments of the present disclosure.

FIG. 23 illustrates a power conversion system including the 8:1 single-phase switched capacitor converter as a front stage and a DC/DC regulator stage or an LC liter as a second stage in accordance with various embodiments of the present disclosure. Using the 8:1 single-phase switched capacitor converter shown in FIG. 22 as an example, as shown in FIG. 23, the power conversion system 750 comprises the 8:1 single-phase switched capacitor converter shown in FIG. 22 and a DC/DC regulator stage 250. The 8:1 single-phase switched capacitor converter and the DC/DC regulator stage 250 are connected in cascade between VIN and VLOAD.

The DC/DC regulator stage 250 is employed to achieve dynamic voltage regulation. In this system, the output capacitor for the 8:1 single-phase switched capacitor converter can be very small, or the output capacitor can be removed. The small output capacitor is used only to filter out very high frequency components of VOUT, while allowing VOUT to vary in a frequency approximately equal to twice the switching frequency. The variations of VOUT allow soft charging and discharging of flying capacitors, which reduces the charge sharing loss caused by current spikes when charge transferring occurs between capacitors.

Similar to FIG. 12, an LC filter can be connected to VOUT. As shown in FIG. 23, the LC filter comprises an inductor 206 and a capacitor 202. The capacitor 202 is connected in parallel with a load resistor 204. Similar to the configuration of connecting switched capacitor converter and the DC/DC regulator 250 in cascade, the inductor at the output of the 8:1 single-phase switched capacitor converter allows the voltage at VOUT to vary and limits the current spike when the output capacitor 202 is charged, which in turn allows soft charging and discharging of flying capacitors, which reduces the charge sharing loss caused by current spikes when charge transferring occurs between capacitors.

Along the same line of inserting inductive elements to reduce current spikes during charge sharing between flying capacitors, inductors can also be added in series with the third flying capacitor of the single phase 4:1 switched capacitor converter shown in FIG. 13.

Figure 24:
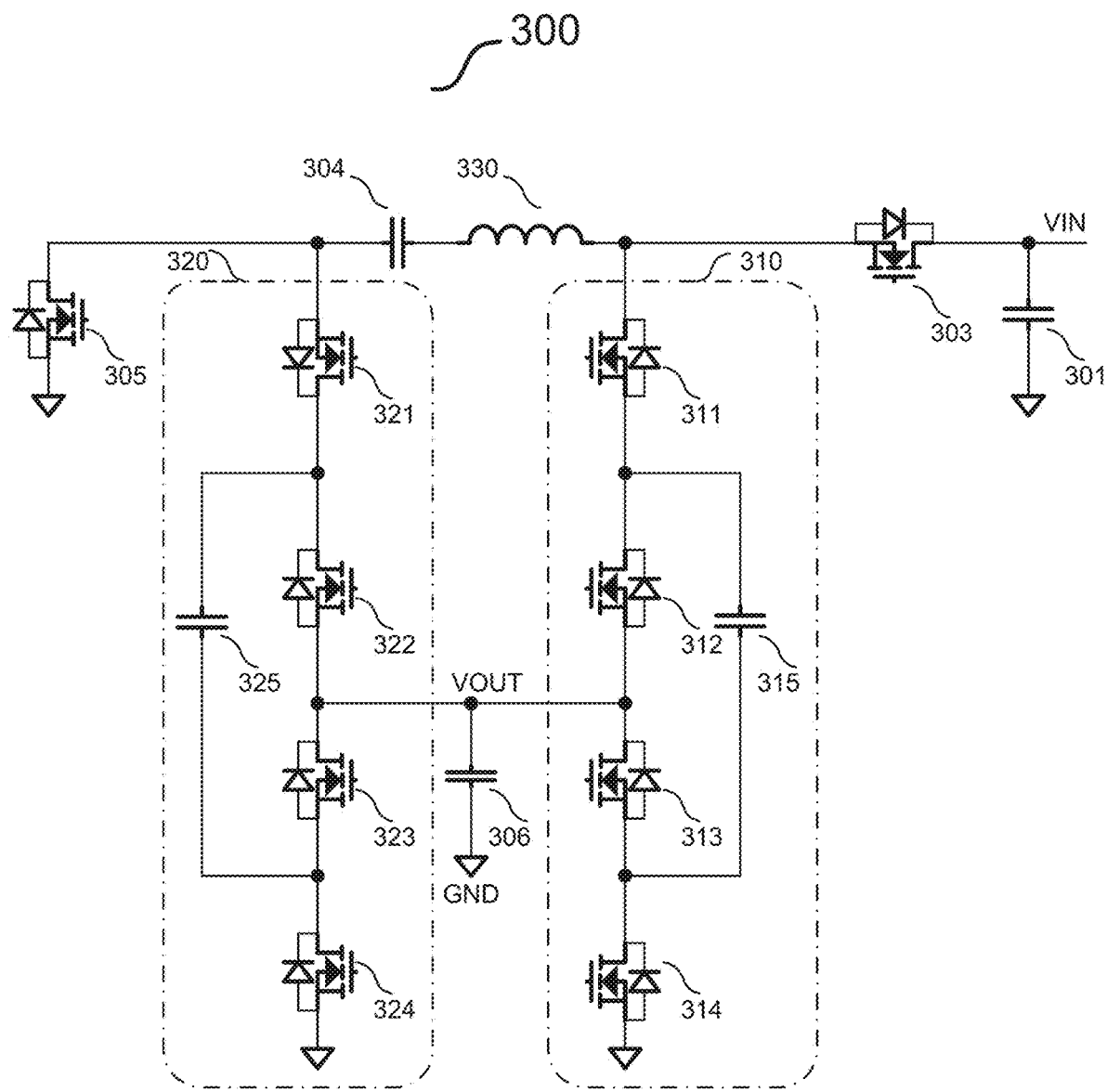
FIG. 24 illustrates a schematic diagram of a 4:1 single-phase switched capacitor converter with one inductive element in accordance with various embodiments of the present disclosure.

FIG. 24 illustrates a schematic diagram of a 4:1 single-phase switched capacitor converter with one inductive element in accordance with various embodiments of the present disclosure. As shown in FIG. 24, an inductor 330 is added in series with the third flying capacitor 304 between the first voltage node and the second voltage node of the 4:1 single-phase switched capacitor converter shown in FIG. 13.

In operation, the inductor 330 is able to limit the current spike along the charging and discharging path of the third flying capacitor 304, which reduces the charge sharing loss between the flying capacitors. In some embodiments the value of the inductor 330 can be selected to resonate with the series capacitance of the charging and discharging path of the third flying capacitor 304 at the switching frequency of the switches. Such an arrangement helps to achieve zero-voltage-switching and zero-current switching of some of the switches in the circuit, thereby further reducing the switching losses of the switched capacitor converter.

Figure 25:
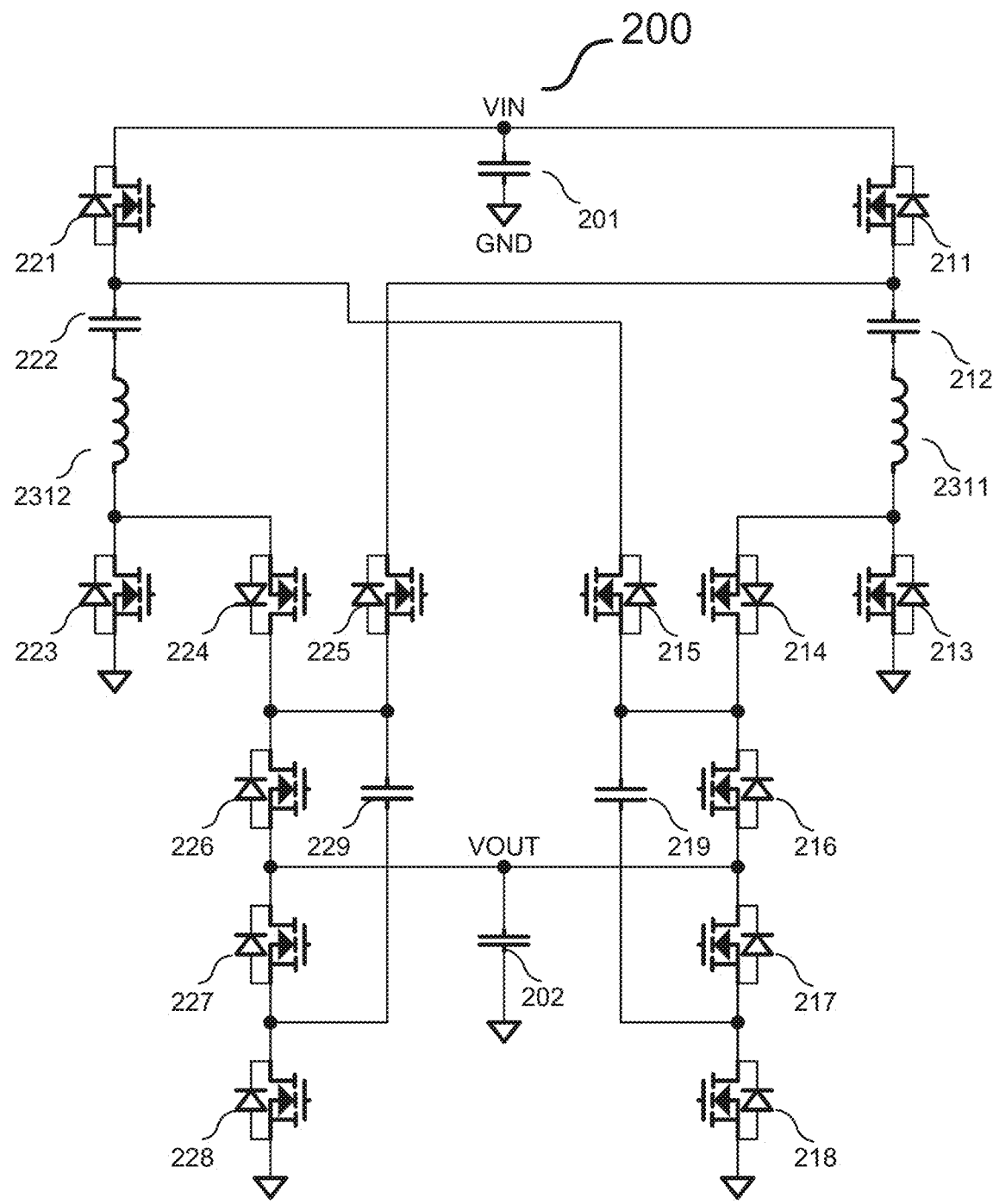
FIG. 25 illustrates a schematic diagram of a 4:1 dual-phase switched capacitor converter with two inductive elements in accordance with various embodiments of the present disclosure.

FIG. 25 illustrates a schematic diagram of a 4:1 dual-phase switched capacitor converter with two inductive elements in accordance with various embodiments of the present disclosure. Similarly, inductors can also be added in series with both the third flying capacitor and the fourth flying capacitor of the 4:1 dual-phase switched capacitor converter shown in FIG. 3.

As shown in FIG. 25, inductors 2312 and 2311 are added in series with the third flying capacitor 222 and the fourth flying capacitor 212 respectively. In operation, both inductors 2311 and 2312 are able to limit the current spikes along the charging and discharging path of the flying capacitors 212 and 222, thereby reducing the charge sharing loss between the flying capacitors.

In some embodiments, the value of the inductor 2312 and 2311 can be selected to resonate with the series capacitance of the charging and discharging path of the third flying capacitor 222 and fourth flying capacitor 212 respectively at the switching frequency of the switches. Such an arrangement helps to achieve zero-voltage-switching and zero-current switching of some of the switches in the circuit, thereby further reducing the switching losses of the switched capacitor converter.

Figure 26:
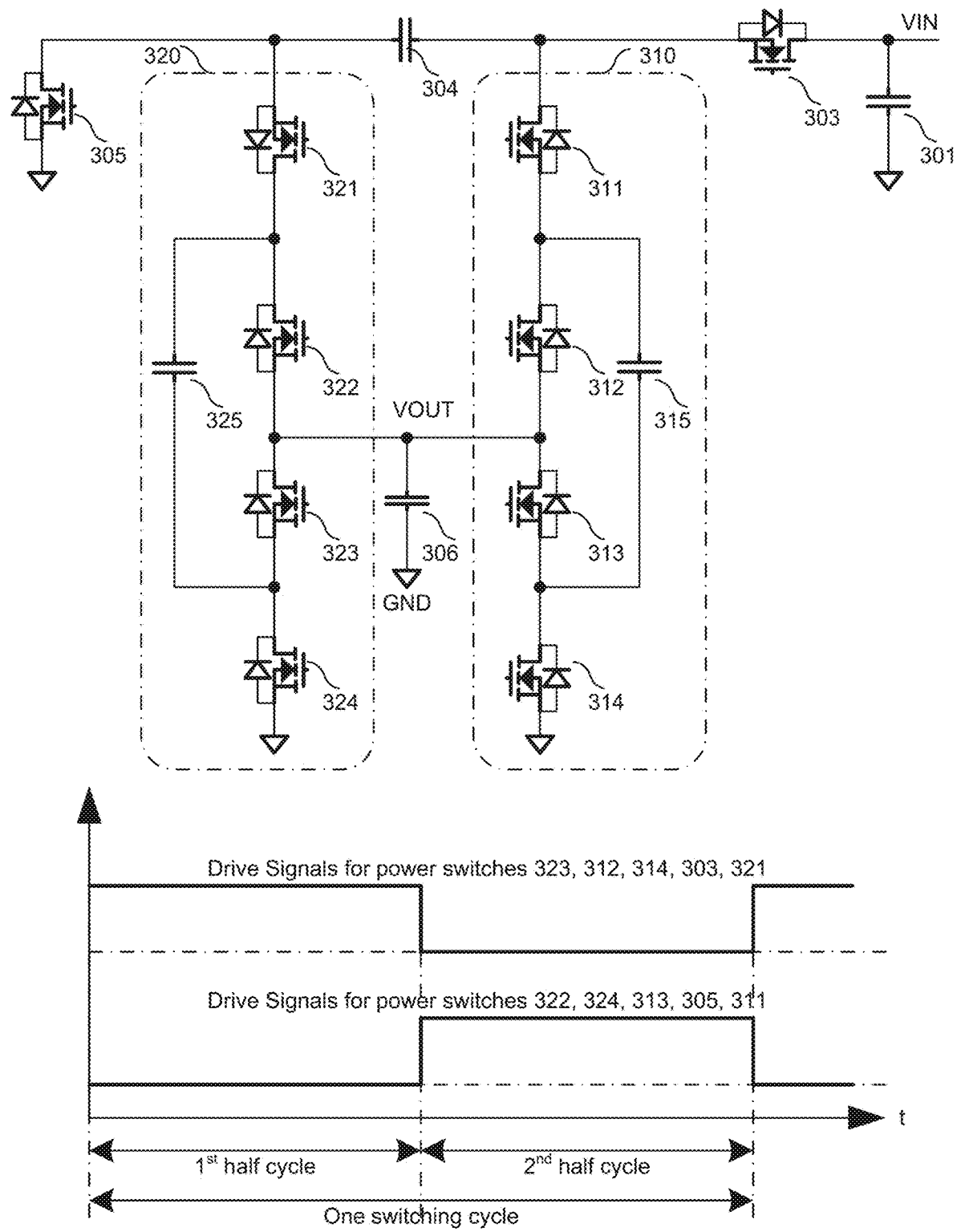
FIG. 26 illustrates the gate drive signals of the 4:1 single-phase switched capacitor converter shown in FIG. 13 in accordance with various embodiments of the present disclosure.

FIG. 26 illustrates the gate drive signals of the 4:1 single-phase switched capacitor converter shown in FIG. 13 in accordance with various embodiments of the present disclosure. As shown in FIG. 26, in a first half cycle, the switches 323, 312, 314, 303 and 321 are turned on, and the switches 322, 324, 313, 305 and 311 are turned off. In a second half cycle, the switches 323, 312, 314, 303 and 321 are turned off, and the switches 322, 324, 313, 305 and 311 are turned on.

Figure 27:
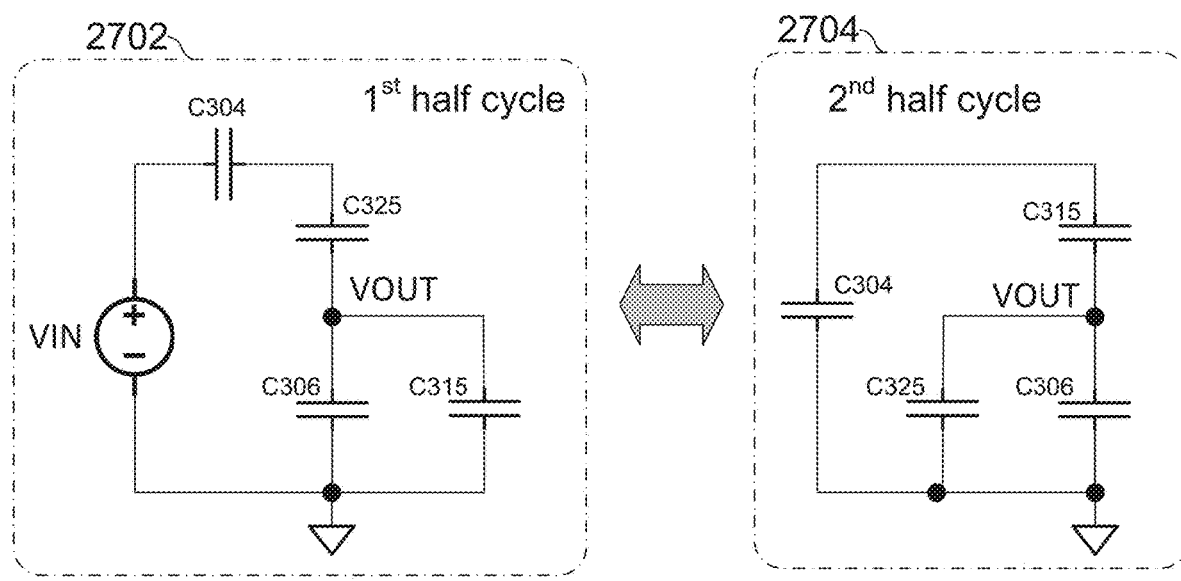
FIG. 27 illustrates two equivalent circuit diagrams for operating in two different half cycles in accordance with various embodiments of the present disclosure.

FIG. 27 illustrates two equivalent circuit diagrams for operating in two different half cycles in accordance with various embodiments of the present disclosure. Circuit 2702 is the equivalent circuit of the single-phase switched capacitor converter shown in FIG. 13 configured to operate in the first half cycle. Circuit 2704 is the equivalent circuit of the single-phase switched capacitor converter shown in FIG. 13 configured to operate in the second half cycle.

In the first half cycle, as indicated by the equivalent circuit 2702, VIN charges C306 through a conductive path formed by C304 and C325. Through this conductive path, VIN also provides power to a load coupled to VOUT. The flying capacitor C315 and C306 are connected in parallel. The flying capacitor C315 charges C306 and provides power to the load coupled to VOUT.

In the second half cycle, as indicated by the equivalent circuit 2704, the flying capacitor C304 charges C306 through C315. C304 also provides power to the load coupled to VOUT. The flying capacitor C325 and C306 are connected in parallel. The flying capacitor C325 charges C306 and provides power to the load coupled to VOUT.

As indicated by the two equivalent circuits 2702 and 2704, the charging and discharging paths of the flying capacitors in the two half cycles are not symmetrical. Due to the voltage difference between these two current supplying paths, charge transferring may occur between the capacitors on the two current supplying paths, thereby causing corresponding losses. The power losses can be avoided through using similar control mechanisms described below with respect to FIGS. 9-10.

Figure 28:
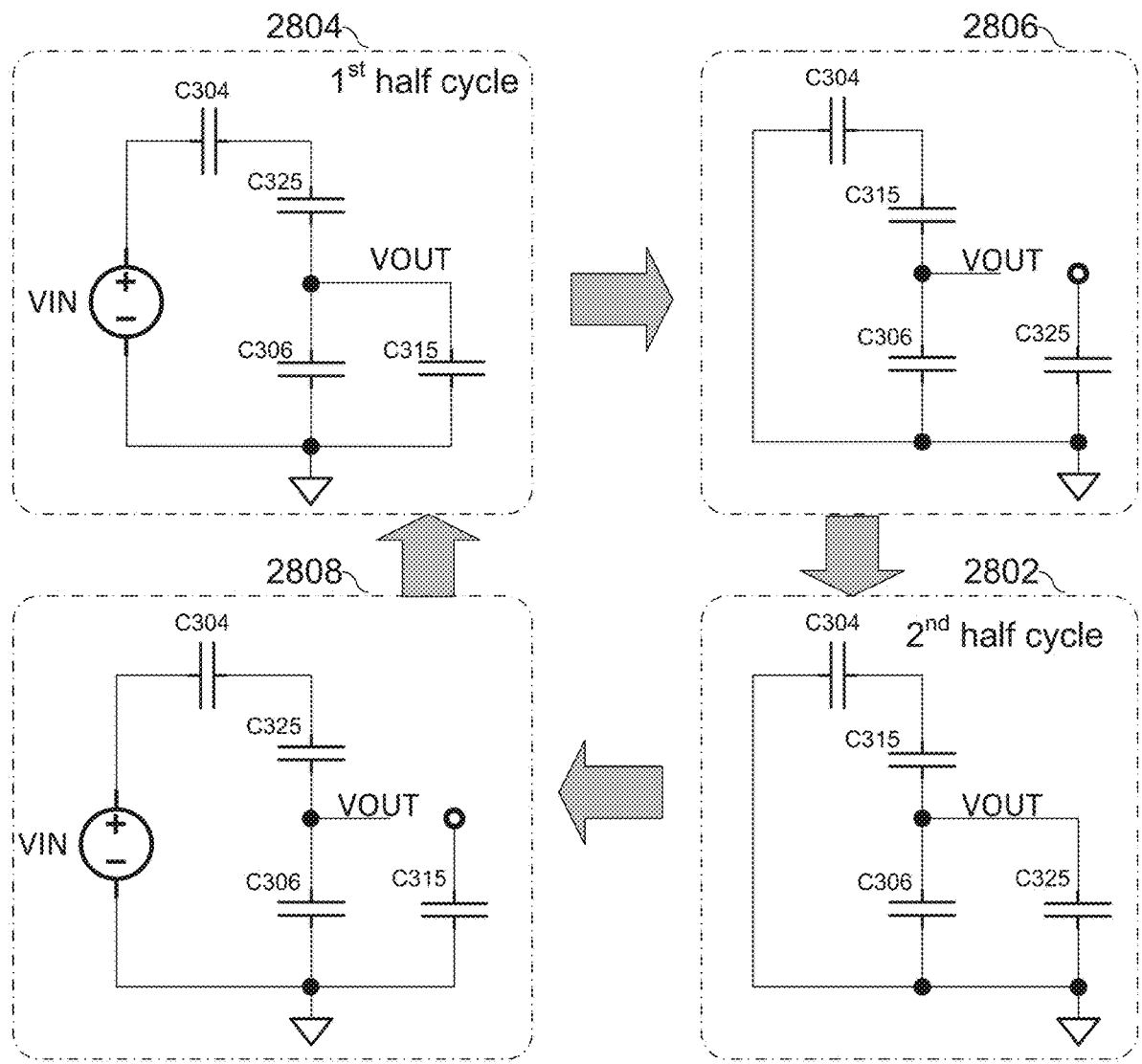
FIG. 28 illustrates four equivalent circuit diagrams for operating in two different operating modes in accordance with various embodiments of the present disclosure.

FIG. 28 illustrates four equivalent circuit diagrams for operating in two different operating modes in accordance with various embodiments of the present disclosure. In order to avoid the power loss caused by charge transferring, two transition periods have been added. A first transition period shown in the dashed rectangle 2808 is added during the transition from the second half cycle to the first half cycle. A second transition period shown in the dashed rectangle 2806 is added during the transition from the first half cycle to the second half cycle.

In the first transition period (2808), C315 is disconnected from C306. The voltage across C315 is maintained until the voltage of the charging path (VIN-VC304-VC325) is equal to the voltage on C315. Once the voltage (VIN-VC304-VC325) is equal to the voltage on C315, C315 is connected in parallel with C306 to supply power to the output capacitor C306 and the load. The delayed connection of C315 can effectively reduce or eliminate the charge transferring, thereby reducing the power loss caused by the charge transferring between the flying capacitors.

In the second transition period (2806), C325 is disconnected from C306. The voltage across C325 is maintained until the voltage of the charging path (VC304-VC315) is equal to the voltage on C325. Once the voltage (VC304-VC315) is equal to the voltage on C325, C325 is connected in parallel with C306 to supply power to the output capacitor C306 and the load. The delayed connection of C325 can effectively reduce or eliminate the charge transferring, thereby reducing the power loss caused by the charge transferring between the flying capacitors.

Figure 29:
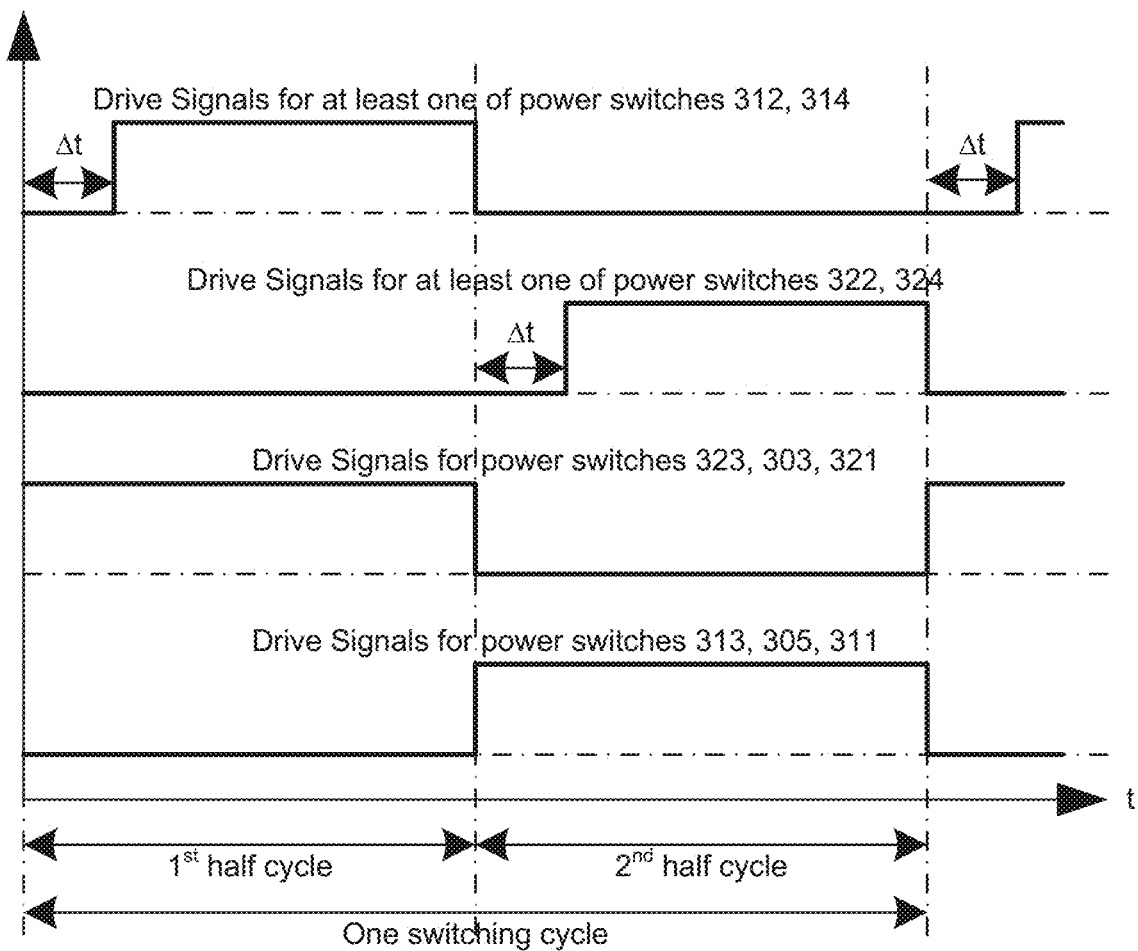
FIG. 29 illustrates the gate drive signals of the 4:1 single-phase switched capacitor converter shown in FIG. 13 in accordance with various embodiments of the present disclosure.

FIG. 29 illustrates the gate drive signals of the 4:1 single-phase switched capacitor converter shown in FIG. 13 in accordance with various embodiments of the present disclosure. As shown in FIG. 29, in a first half cycle, the switches 323, 303 and 321 are turned on, and the switches 313, 305, 311, 322 and 324 are turned off. The switches 312 and 314 are turned on after a first delay. The first delay is added according to the operating principle shown in the dashed rectangle 2808 in FIG. 28. In a second half cycle, the switches 323, 303, 321, 312 and 314 are turned off, and the switches 313, 305 and 311 are turned on. The switches 322 and 324 are turned on after a second delay. The second delay is added according to the operating principle shown in the dashed rectangle 2806 in FIG. 28.

It should be noted the control mechanism described above with respect to FIG. 29 is applied to the 4:1 single-phase switched capacitor converter, but it is understood that the control mechanism may be implemented using other types of switched capacitor converters described in the present disclosure.

FIG. 30 illustrates a flow chart of a method for controlling the switched capacitor converter shown in FIGS. 3 and 13 in accordance with various embodiments of the present disclosure. This flowchart shown in FIG. 30 is merely an example, which should not unduly limit the scope of the claims. One of ordinary skill in the art would recognize many variations, alternatives, and modifications. For example, various steps illustrated in FIG. 30 may be added, removed, replaced, rearranged, and repeated.

At step 3002, a switched capacitor converter is provided. The switched capacitor converter comprises a first leg comprising a plurality of first leg switches and a second leg comprising a plurality of second leg switches, a first flying capacitor connected to the first leg, a second flying capacitor connected to the second leg, and a third flying capacitor connected between the first leg and the second leg, and a first upper switch and a second upper switch connected to two terminals of the third flying capacitor respectively.

At step 3004, in a first half cycle, the plurality of first leg switches, the plurality of second leg switches, the first upper switch and the second upper switch are configured such that the third flying capacitor, the first flying capacitor and an output capacitor are connected in series, and the second flying capacitor and the output capacitor are connected in parallel.

At step 3006, in a second half cycle, the plurality of first leg switches, the plurality of second leg switches, the first upper switch and the second upper switch are configured such that the first flying capacitor and the output capacitor are connected in parallel, and the third flying capacitor, the second flying capacitor and the output capacitor are connected in series.

Referring back to FIG. 13, the switched capacitor converter is a single-phase switched capacitor converter. The switched capacitor converter comprises a first switch, a second switch, a third switch and a fourth switch of the first leg connected in series between ground and a first voltage node, a first switch, a second switch, a third switch and a fourth switch of the second leg connected in series between ground and a second voltage node, the first flying capacitor connected between a common node of the first switch and the second switch of the first leg, and a common node of the third switch and the fourth switch of the first leg, the second flying capacitor connected between a common node of the first switch and the second switch of the second leg, and a common node of the third switch and the fourth switch of the second leg, the third flying capacitor connected between the first voltage node and the second voltage node, the first upper switch connected between the first voltage node and ground, and the second upper switch connected between the second voltage node and the input terminal.

The method further comprises in the first half cycle, configuring the second switch and the fourth switch of the first leg, and the second upper switch to be turned on, and configuring the first switch and the third switch of the second leg to be turned on after a first delay, and in the second half cycle, configuring the second switch and the fourth switch of the second leg, and the first upper switch to be turned on, and configuring the first switch and the third switch of the first leg to be turned on after a second delay.

The first delay is determined based upon a comparison between a voltage across the second flying capacitor and a first charging voltage equal to an input voltage minus a sum of a voltage across the first flying capacitor and a voltage across the third flying capacitor, and wherein the first switch and the third switch of the second leg are both turned on once the voltage across the second flying capacitor is equal to the first charging voltage.

The second delay is determined based upon a comparison between a voltage across the first flying capacitor and a second charging voltage equal to the voltage across the third flying capacitor minus the voltage across the second flying capacitor, and wherein the first switch and the third switch of the first leg are both turned on once the voltage across the first flying capacitor is equal to the second charging voltage.

Referring back to FIG. 24, the switched capacitor converter is a single-phase switched capacitor converter similar to that shown in FIG. 13, but with an inductor 330 connected in series with the third flying capacitor 304, where the method further comprises in the first half cycle, configuring the second switch and the fourth switch of the first leg, the first switch and the third switch of the second leg, and the second upper switch to be turned on with a 50% duty cycle, and in the second half cycle, configuring the second switch and the fourth switch of the second leg, the first switch and the third switch of the first leg, and the first upper switch to be turned on with a 50% duty cycle.

Referring back to FIG. 3, the switched capacitor converter is a dual-phase switched capacitor converter. The switched capacitor converter comprises a first switch, a second switch, a third switch and a fourth switch of the first leg connected in series between ground and a first voltage node, a first switch, a second switch, a third switch and a fourth switch of the second leg connected in series between ground and a second voltage node, the first flying capacitor connected between a common node of the first switch and the second switch of the first leg, and a common node of the third switch and the fourth switch of the first leg, the second flying capacitor connected between a common node of the first switch and the second switch of the second leg, and a common node of the third switch and the fourth switch of the second leg, the third flying capacitor connected between the first voltage node and the second voltage node, the first upper switch connected between the first voltage node and ground, the second upper switch connected between the second voltage node and the input terminal, a fourth flying capacitor connected between a third voltage node and a fourth voltage node, a third upper switch connected between the third voltage node and ground, a fourth upper switch connected between the fourth voltage node and the input terminal, a fifth upper switch connected between the common node of the third switch and the fourth switch of the first leg and the fourth voltage node, and a sixth upper switch connected between the common node of the third switch and the fourth switch of the second leg and the third voltage node.

The method further comprises in the first half cycle, configuring the fifth upper switch, the third upper switch, the second switch and the fourth switch of the first leg, the first switch and the third switch of the second leg, and the second upper switch to be turned on with a 50% duty cycle, and in the second half cycle, configuring the sixth upper switch, the fourth upper switch, the second switch and the fourth switch of the second leg, the first switch and the third switch of the first leg, and the first upper switch to be turned on with a 50% duty cycle.

The method further comprises in the first half cycle, configuring the fifth upper switch, the third upper switch, the second switch and the fourth switch of the first leg, and the second upper switch to be turned on, and configuring the first switch and the third switch of the second leg to be turned on after a first delay, and in the second half cycle, configuring the sixth upper switch, the fourth upper switch, the second switch and the fourth switch of the second leg, and the first upper switch to be turned on, and configuring the first switch and the third switch of the first leg to be turned on after a second delay.

The first delay is determined based upon a comparison between a voltage across the second flying capacitor and a first charging voltage equal to an input voltage minus a sum of a voltage across the first flying capacitor and a voltage across the third flying capacitor, and wherein the first switch and the third switch of the second leg are both turned on once the voltage across the second flying capacitor is equal to the first charging voltage.

The second delay is determined based upon a comparison between a voltage across the first flying capacitor and a second charging voltage equal to an input voltage minus a sum of a voltage across the fourth flying capacitor and the voltage across the second flying capacitor, and wherein the first switch and the third switch of the first leg are both turned on once the voltage across the first flying capacitor is equal to the second charging voltage.

Referring back to FIG. 25, the switched capacitor converter is a dual-phase switched capacitor converter similar to that shown in FIG. 3, but with an inductor 2312 connected in series with the third flying capacitor 222 and an inductor 2311 connected in series with the fourth flying capacitor, where the method further comprises in the first half cycle, configuring the fifth upper switch, the third upper switch, the second switch and the fourth switch of the first leg, the first switch and the third switch of the second leg, and the second upper switch to be turned on with a 50% duty cycle, and in the second half cycle, configuring the sixth upper switch, the fourth upper switch, the second switch and the fourth switch of the second leg, the first switch and the third switch of the first leg, and the first upper switch to be turned on with a 50% duty cycle.

Referring back to FIGS. 22 and 23, the switched capacitor converter is a single-phase switched capacitor converter comprising a first switch, a second switch, a third switch and a fourth switch of the first leg connected in series between ground and the first voltage node, a first switch, a second switch, a third switch and a fourth switch of the second leg connected in series between ground and the second voltage node, the first flying capacitor connected between the common node of the first switch and the second switch of the first leg, and the common node of the third switch and the fourth switch of the first leg, the second flying capacitor connected between the common node of the first switch and the second switch of the second leg, and the common node of the third switch and the fourth switch of the second leg, the third flying capacitor connected between the first voltage node and the second voltage node, the first upper switch connected between the first voltage node and ground, the second upper switch connected between the second voltage node and a fifth voltage node, a fourth flying capacitor connected between a third voltage node and a fourth voltage node, a third upper switch connected between the third voltage node and ground, a fourth upper switch connected between the fourth voltage node and a sixth voltage node, a fifth upper switch connected between the fourth voltage node, and the common node of the third switch and the fourth switch of the first leg, a sixth upper switch connected between the third voltage node, and the common node of the third switch and the fourth switch of the second leg, a fifth flying capacitor connected between the fifth voltage node and the sixth voltage node and an eighth upper switch connected between the sixth voltage node and the input terminal.

The method further comprises in the first half cycle, configuring the second switch and the fourth switch of the first leg, and the second upper switch, the third upper switch, the fifth upper switch and the eighth upper switch to be turned on, and configuring the first switch and the third switch of the second leg to be turned on after a first delay, and in the second half cycle, configuring the second switch and the fourth switch of the second leg, and the first upper switch, the fourth upper switch, the sixth upper switch and the seventh upper switch to be turned on, and configuring the first switch and the third switch of the first leg to be turned on after a second delay.

In some embodiments, the first delay is determined based upon a comparison between a voltage across the second flying capacitor and a first charging voltage equal to an input voltage minus a sum of a voltage across the first flying capacitor, a voltage across the third flying capacitor and a voltage across the fifth flying capacitor, and wherein the first switch and the third switch of the second leg are both turned on once the voltage across the second flying capacitor is equal to the first charging voltage. The second delay is determined based upon a comparison between a voltage across the first flying capacitor and a second charging voltage equal to the voltage across the fifth flying capacitor minus a sum of a voltage across the fourth flying capacitor and the voltage across the second flying capacitor, and wherein the first switch and the third switch of the first leg are both turned on once the voltage across the first flying capacitor is equal to the second charging voltage.

Figure 31:
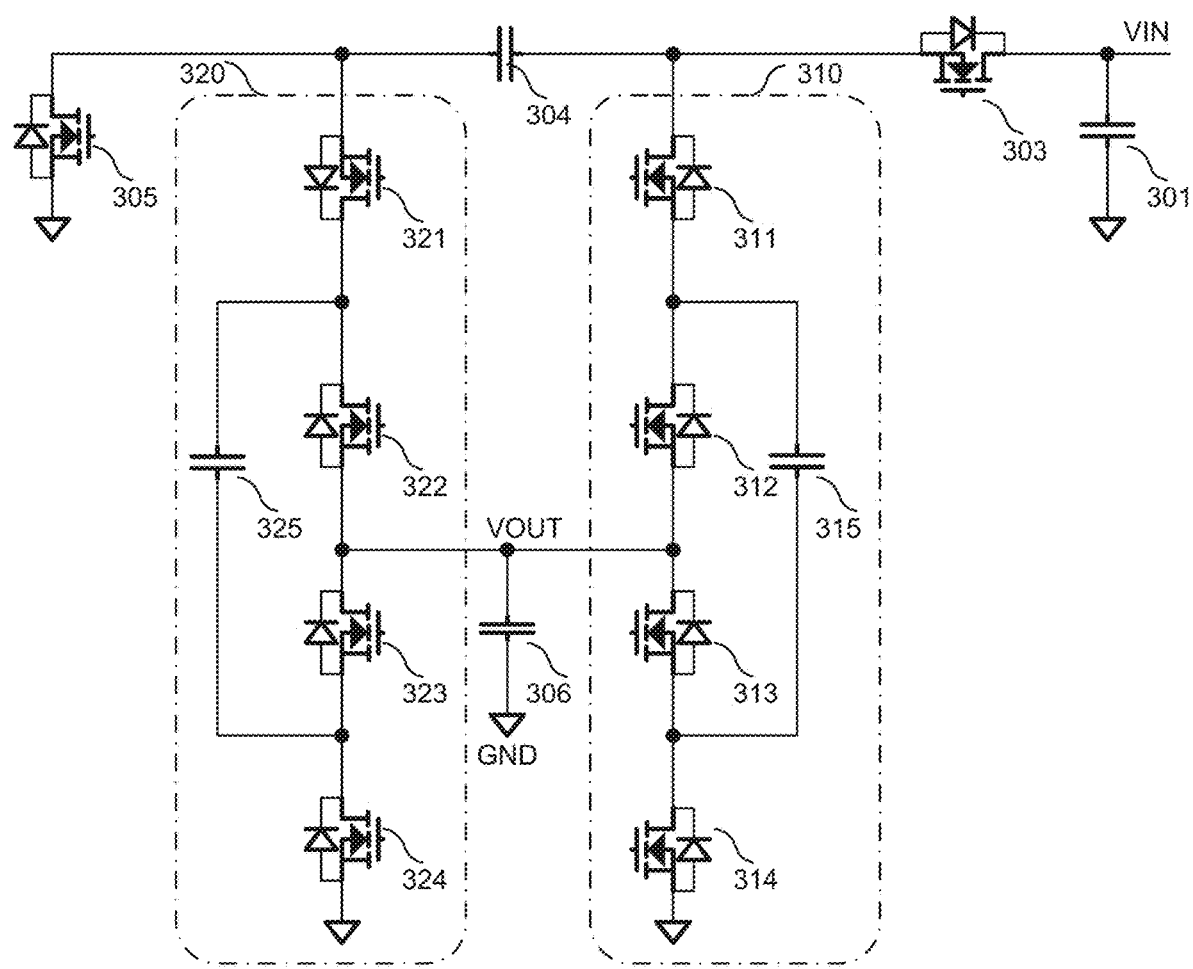
FIGS. 31-35 illustrate a process of generating a 4:1 dual-phase switched capacitor converter based on two 4:1 single-phase switched capacitor converters in accordance with various embodiments of the present disclosure.

FIGS. 31-35 illustrate a process of generating a 4:1 dual-phase switched capacitor converter based on two 4:1 single-phase switched capacitor converters in accordance with various embodiments of the present disclosure. FIG. 31 illustrates a schematic diagram of a 4:1 single-phase switched capacitor converter in accordance with various embodiments of the present disclosure. The switched capacitor converter shown in FIG. 31 is the same as that shown in FIG. 13, and hence is not discussed again to avoid repetition.

Figure 32:
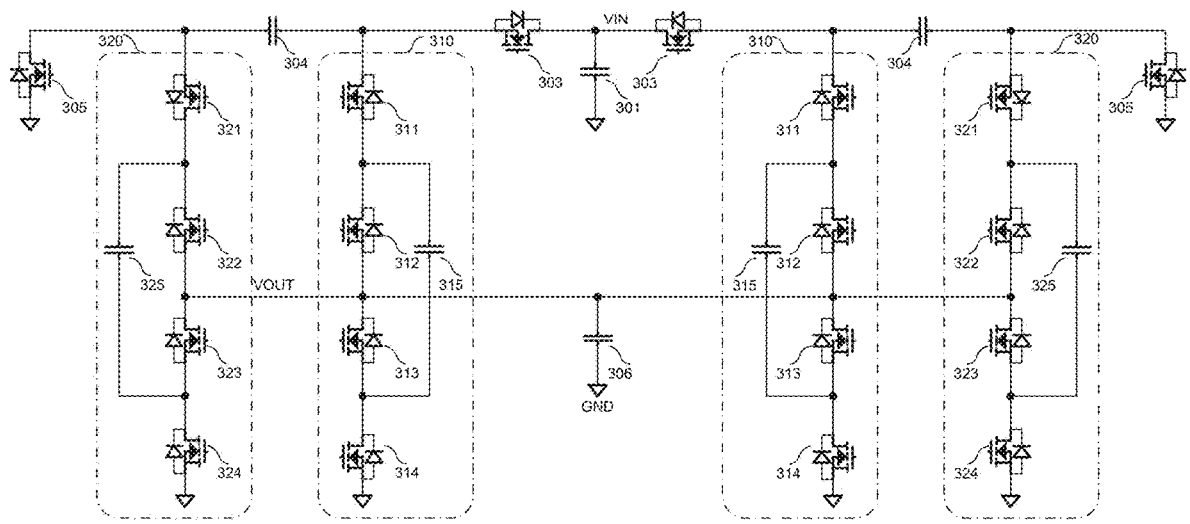
Figure 33:
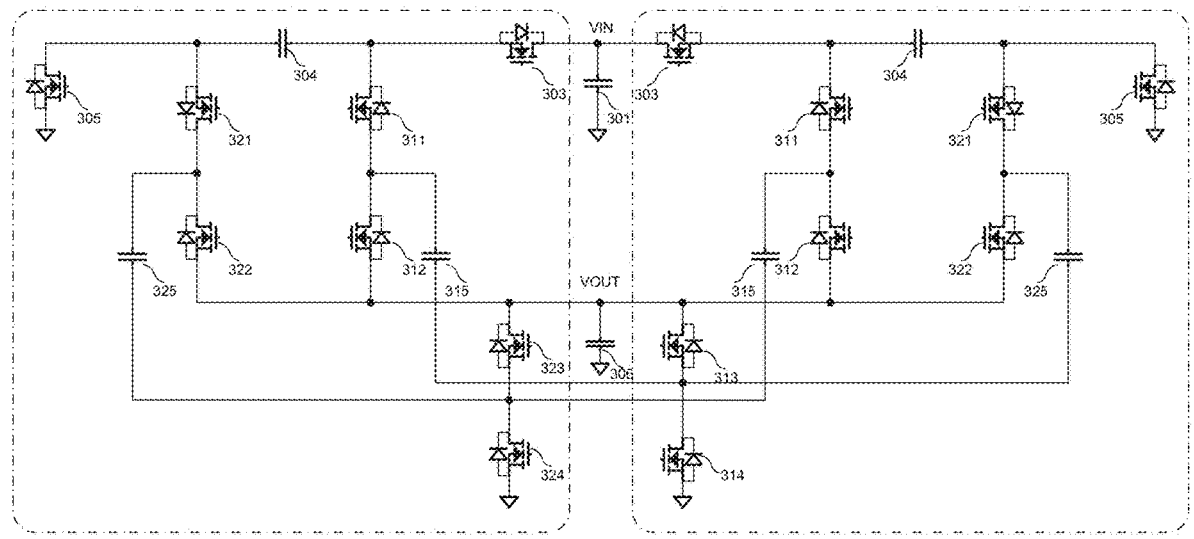

FIG. 32 illustrates a schematic diagram of a switched capacitor converter after two 4:1 single-phase switched capacitor converters are combined. These two 4:1 single-phase switched capacitor converters are arranged in a symmetrical manner as shown in FIG. 32. The control signals of the left side and the control signals of the right side are of a phase shift of 180 degrees. The bottom four switches including switches 314 and 324 on the left side, and switches 314 and 324 on the right side can be combined into two switches because the connections of these four switches are the same. FIG. 33 illustrates a schematic diagram of a switched capacitor converter after the four bottom switches of FIG. 32 have been combined into two switches.

Figure 34:
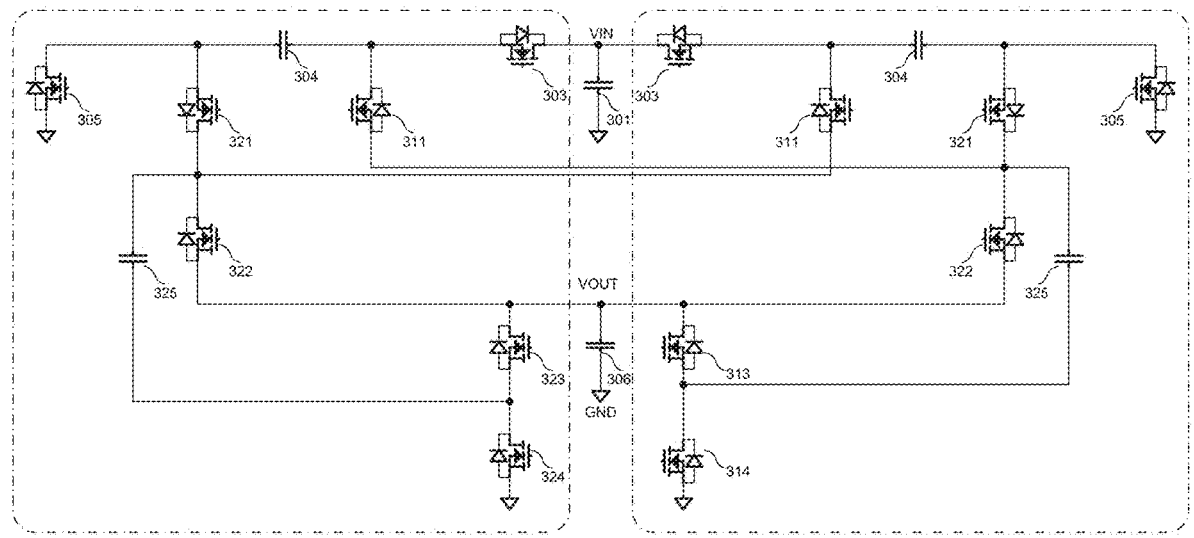
Figure 35:
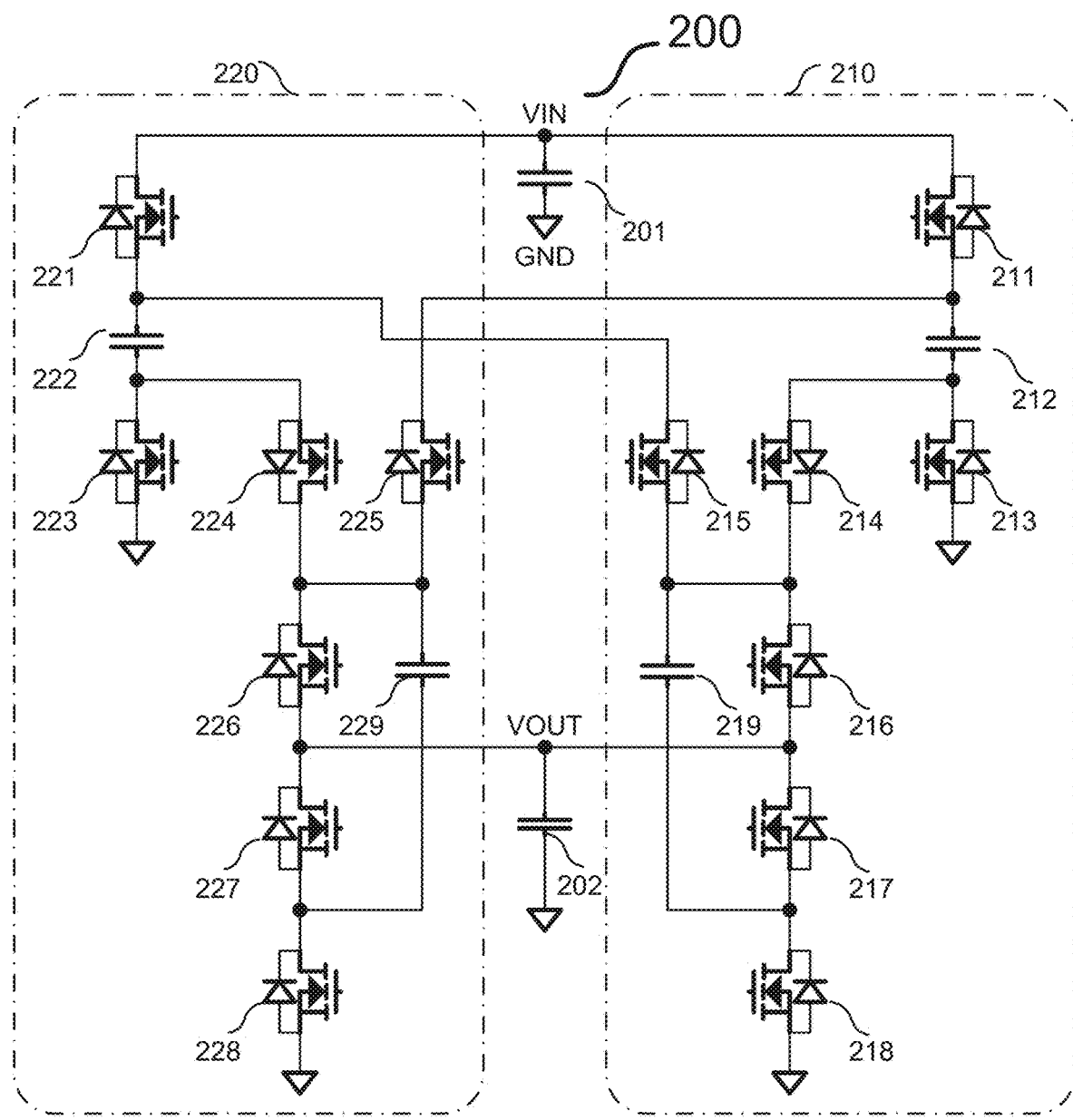

As shown in FIG. 33, the middle four switches including switches 312 and 322 on the left side, and switches 312 and 322 on the right side can be combined into two switches because the connections of these four switches are the same. After the four middle switches have been combined into two switches, the corresponding flying capacitors can be simplified. FIG. 34 illustrates a schematic diagram of a switched capacitor converter after the four middle switches shown in FIG. 33 have been combined into two switches. FIG. 35 illustrated a 4:1 dual-phase switched capacitor converter after the components of FIG. 34 have been rearranged. The switched capacitor converter shown in FIG. 35 is the same as that shown in FIG. 3.

Although embodiments of the present disclosure and its advantages have been described in detail, it should be understood that various changes, substitutions and alterations can be made herein without departing from the spirit and scope of the disclosure as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:
1. A switched capacitor converter comprising:
 a first leg comprising a plurality of first leg switches connected in series between ground and a first voltage node;
 a second leg comprising a plurality of second leg switches connected in series between ground and a second voltage node;
 a first flying capacitor connected between a first switch common node and a third switch common node of the first leg, wherein the first switch common node is a common node of a first switch and a second switch of the first leg, and the third switch common node is a common node of a third switch and a fourth switch of the first leg;
 a second flying capacitor connected between a first switch common node and a third switch common node of the second leg, wherein the first switch common node is a common node of a first switch and a second switch of the second leg, and the third switch common node is a common node of a third switch and a fourth switch of the second leg;
 a third flying capacitor connected between the first voltage node and the second voltage node;

a first upper switch connected between the first voltage node and ground;
a second upper switch coupled between the second voltage node and an input terminal; and
an output terminal coupled to a second switch common node of the first leg and a second switch common node of the second leg, and wherein the second switch common node of the first leg is a common node of the second switch and the third switch of the first leg, and the second switch common node of the second leg is a common node of the second switch and the third switch of the second leg.

2. The switched capacitor converter of claim 1, further comprising:
a fourth flying capacitor connected between a third voltage node and a fourth voltage node;
a third upper switch connected between the third voltage node and ground;
a fourth upper switch coupled between the fourth voltage node and the input terminal;
a fifth upper switch connected between an uppermost switch common node of the first leg and the fourth voltage node; and
a sixth upper switch connected between an uppermost switch common node of the second leg and the third voltage node, wherein a voltage conversion ratio of an input to an output of the switched capacitor converter is equal to 2×N:1, and wherein 2×N is equal to the number of flying capacitors of the switched capacitor converter, and wherein the switched capacitor converter is able to achieve a N:1 conversion ratio through configuring the first upper switch, the second upper switch, the third upper switch, the fourth upper switch as always-on switches and configuring the fifth upper switch and the sixth upper switch as always-off switches.

3. The switched capacitor converter of claim 2, further comprising a DC/DC regulator stage coupled between the output terminal and a load.

4. The switched capacitor converter of claim 2, further comprising an inductor-capacitor (L-C) filter coupled between the output terminal and a load.

5. The switched capacitor converter of claim 2, further comprising:
a first inductor coupled in series with the third flying capacitor; and
a second inductor coupled in series with the fourth flying capacitor.

6. The switched capacitor converter of claim 1, further comprising an inductor coupled in series with the third flying capacitor.

7. The switched capacitor converter of claim 1, further comprising:
a switch connected between the input terminal and the first voltage node, wherein the switch is configured such that the switched capacitor converter is able to achieve a first voltage conversion ratio of an input to an output of the switched capacitor converter equal to (K+1)/2:1 through configuring the switch as an always-on switch, wherein K is equal to the number of flying capacitors of the switched capacitor converter, and wherein the switched capacitor converter is able to achieve a second voltage conversion ratio of the input to the output of the switched capacitor converter equal to (K+1):1 through configuring the switch as an always-off switch.

8. The switched capacitor converter of claim 1, wherein:
the first switch, the second switch, the third switch and the fourth switch of the first leg are connected in series between ground and the first voltage node;
the first switch, the second switch, the third switch and the fourth switch of the second leg are connected in series between ground and the second voltage node;
the first flying capacitor is connected between the common node of the first switch and the second switch of the first leg, and the common node of the third switch and the fourth switch of the first leg;
the second flying capacitor is connected between the common node of the first switch and the second switch of the second leg, and the common node of the third switch and the fourth switch of the second leg;
the third flying capacitor is connected between the first voltage node and the second voltage node;
the first upper switch is connected is between the first voltage node and ground; and
the second upper switch is connected between the second voltage node and the input terminal.

9. The switched capacitor converter of claim 8, further comprising:
a fourth flying capacitor connected between a third voltage node and a fourth voltage node;
a third upper switch connected between the third voltage node and ground;
a fourth upper switch connected between the fourth voltage node and the input terminal;
a fifth upper switch connected between the common node of the third switch and the fourth switch of the first leg, and the fourth voltage node; and
a sixth upper switch connected between the common node of the third switch and the fourth switch of the second leg, and the third voltage node.

10. The switched capacitor converter of claim 1, further comprising a fourth flying capacitor and a fifth flying capacitor, wherein:
the first switch, the second switch, the third switch, the fourth switch and a fifth switch of the first leg are connected in series between ground and the first voltage node;
the first switch, the second switch, the third switch, the fourth switch and a fifth switch of the second leg are connected in series between ground and the second voltage node;
the first flying capacitor is connected between the common node of the first switch and the second switch of the first leg, and the common node of the third switch and the fourth switch of the first leg;
the second flying capacitor is connected between the common node of the first switch and the second switch of the second leg, and the common node of the third switch and the fourth switch of the second leg;
the third flying capacitor is connected between the first voltage node and the second voltage node;
the fourth flying capacitor is connected between a common node of the fourth switch and the fifth switch of the first leg, and the common node of the first switch and the second switch of the second leg;
the fifth flying capacitor is connected between a common node of the fourth switch and the fifth switch of the second leg, and the common node of the first switch and the second switch of the first leg;
the first upper switch is connected between the first voltage node and ground; and
the second upper switch is connected between the second voltage node and the input terminal.

11. The switched capacitor converter of claim 10, further comprising:
- a sixth flying capacitor connected between a third voltage node and a fourth voltage node;
- a third upper switch connected between the third voltage node and ground;
- a fourth upper switch connected between the fourth voltage node and the input terminal;
- a fifth upper switch connected between the common node of the fourth switch and the fifth switch of the first leg, and the fourth voltage node; and
- a sixth upper switch connected between the common node of the fourth switch and the fifth switch of the second leg, and the third voltage node.

12. The switched capacitor converter of claim 1, further comprising a fourth flying capacitor, a fifth flying capacitor, a sixth flying capacitor and a seventh flying capacitor, wherein:
- the first switch, the second switch, the third switch, the fourth switch, a fifth switch and a sixth switch of the first leg are connected in series between ground and the first voltage node;
- the first switch, the second switch, the third switch, the fourth switch, a fifth switch and a sixth switch of the second leg are connected in series between ground and the second voltage node;
- the first flying capacitor is connected between the common node of the first switch and the second switch of the first leg, and the common node of the third switch and the fourth switch of the first leg;
- the second flying capacitor is connected between the common node of the first switch and the second switch of the second leg, and the common node of the third switch and the fourth switch of the second leg;
- the third flying capacitor is connected between the first voltage node and the second voltage node;
- the fourth flying capacitor is connected between a common node of the fourth switch and the fifth switch of the first leg, and the common node of the first switch and the second switch of the second leg;
- the fifth flying capacitor is connected between a common node of the fourth switch and the fifth switch of the second leg, and the common node of the first switch and the second switch of the first leg;
- the sixth flying capacitor is connected between a common node of the fifth switch and the sixth switch of the first leg, and the common node of the first switch and the second switch of the first leg;
- the seventh flying capacitor is connected between a common node of the fifth switch and the sixth switch of the second leg, and the common node of the first switch and the second switch of the second leg;
- the first upper switch is connected between the first voltage node and ground; and
- the second upper switch is connected between the second voltage node and the input terminal.

13. The switched capacitor converter of claim 12, further comprising:
- an eighth flying capacitor connected between a third voltage node and a fourth voltage node;
- a third upper switch connected between the third voltage node and ground;
- a fourth upper switch connected between the fourth voltage node and the input terminal;
- a fifth upper switch connected between the common node of the fifth switch and the sixth switch of the first leg, and the fourth voltage node; and
- a sixth upper switch connected between the common node of the fifth switch and the sixth switch of the second leg, and the third voltage node.

14. The switched capacitor converter of claim 1, further comprising $(2 \times N-1)$ flying capacitors, wherein N is an integer greater than 2, and wherein:
- $(N+2)$ switches of the first leg are connected in series between ground and the first voltage node;
- $(N+2)$ switches of the second leg are connected in series between ground and the second voltage node;
- the first flying capacitor of the $(2 \times N-1)$ flying capacitors is connected between the common node of the first switch and the second switch of the first leg, and the common node of the third switch and the fourth switch of the first leg;
- the second flying capacitor of the $(2 \times N-1)$ flying capacitors is connected between the common node of the first switch and the second switch of the second leg, and the common node of the third switch and the fourth switch of the second leg;
- the third flying capacitor is connected between the first voltage node and the second voltage node;
- one terminal of a $(2 \times M)$th flying capacitor is connected to a common node of an $(M+2)$th switch and an $(M+3)$th switch of the first leg, and the other terminal of the $(2 \times M)$th flying capacitor is connected to the common node of the first switch and the second switch of either the second leg when M is an even number, or the first leg when M is an odd number;
- one terminal of a $(2 \times M+1)$th flying capacitor is connected between a common node of an $(M+2)$th switch and an $(M+3)$th switch of the second leg, and the other terminal of the $(2 \times M+1)$th flying capacitor is connected to the common node of the first switch and the second switch of either the first leg when M is an even number, or the second leg when M is an odd number, and where M is an integer between 2 and $N-1$;
- the first upper switch is connected between the first voltage node and ground; and
- the second upper switch is connected between the second voltage node and the input terminal.

15. The switched capacitor converter of claim 14, further comprising:
- a $(2 \times N)$th flying capacitor connected between a third voltage node and a fourth voltage node;
- a third upper switch connected between the third voltage node and ground;
- a fourth upper switch connected between the fourth voltage node and the input terminal;
- a fifth upper switch connected between the common node of the $(N+1)$th switch and the $(N+2)$th switch of the first leg, and the fourth voltage node; and
- a sixth upper switch connected between the common node of the $(N+1)$th switch and the $(N+2)$th switch of the second leg, and the third voltage node.

16. The switched capacitor converter of claim 1, wherein:
- the first switch, the second switch, the third switch and the fourth switch of the first leg are connected in series between ground and the first voltage node;
- the first switch, the second switch, the third switch and the fourth switch of the second leg are connected in series between ground and the second voltage node;
- the first flying capacitor is connected between the common node of the first switch and the second switch of the first leg, and the common node of the third switch and the fourth switch of the first leg;

the second flying capacitor is connected between the common node of the first switch and the second switch of the second leg, and the common node of the third switch and the fourth switch of the second leg;
the third flying capacitor is connected between the first voltage node and the second voltage node;
the first upper switch is connected is between the first voltage node and ground;
the second upper switch is connected between the second voltage node and a fifth voltage node;
a fourth flying capacitor is connected between a third voltage node and a fourth voltage node;
a third upper switch is connected is between the third voltage node and ground;
a fourth upper switch is connected between the fourth voltage node and a sixth voltage node;
a fifth upper switch is connected is between the fourth voltage node, and the common node of the third switch and the fourth switch of the first leg;
a sixth upper switch is connected between the third voltage node, and the common node of the third switch and the fourth switch of the second leg;
a fifth flying capacitor is connected between the fifth voltage node and the sixth voltage node; and
an eighth upper switch is connected is between the sixth voltage node and the input terminal.

17. The switched capacitor converter of claim 1, wherein:
the first switch, the second switch, the third switch and the fourth switch of the first leg are connected in series between ground and the first voltage node;
the first switch, the second switch, the third switch and the fourth switch of the second leg are connected in series between ground and the second voltage node;
the first flying capacitor is connected between the common node of the first switch and the second switch of the first leg, and the common node of the third switch and the fourth switch of the first leg;
the second flying capacitor is connected between the common node of the first switch and the second switch of the second leg, and the common node of the third switch and the fourth switch of the second leg;
the third flying capacitor is connected between the first voltage node and the second voltage node;
the first upper switch is connected is between the first voltage node and ground;
the second upper switch is connected between the second voltage node and a fifth voltage node;
a fourth flying capacitor is connected between a third voltage node and a fourth voltage node;
a third upper switch is connected is between the third voltage node and ground;
a fourth upper switch is connected between the fourth voltage node and a sixth voltage node;
a fifth upper switch is connected is between the fourth voltage node, and the common node of the third switch and the fourth switch of the first leg;
a sixth upper switch is connected between the third voltage node, and the common node of the third switch and the fourth switch of the second leg;
a fifth flying capacitor is connected between the fifth voltage node and a seventh voltage node;
a seventh upper switch is connected is between the fifth voltage node and ground;
an eighth upper switch is connected between the seventh voltage node and the input terminal;
a sixth flying capacitor is connected between the sixth voltage node and an eighth voltage node;
a tenth upper switch is connected is between the sixth voltage node and ground;
an eleventh upper switch is connected between the eighth voltage node and the input terminal;
a ninth upper switch is connected is between the fourth voltage node and the seventh voltage node; and
a twelfth upper switch is connected between the eighth voltage node and the second voltage node.

18. A method comprising:
providing a switched capacitor converter comprising:
a first leg comprising a plurality of first leg switches and a second leg comprising a plurality of second leg switches;
a first flying capacitor connected to the first leg, a second flying capacitor connected to the second leg, and a third flying capacitor connected between the first leg and the second leg; and
a first upper switch and a second upper switch connected to two terminals of the third flying capacitor respectively;
in a first half cycle, configuring the plurality of first leg switches, the plurality of second leg switches, the first upper switch and the second upper switch such that the third flying capacitor, the first flying capacitor and an output capacitor are connected in series, and the second flying capacitor and the output capacitor are connected in parallel; and
in a second half cycle, configuring the plurality of first leg switches, the plurality of second leg switches, the first upper switch and the second upper switch such that the first flying capacitor and the output capacitor are connected in parallel, and the third flying capacitor, the second flying capacitor and the output capacitor are connected in series.

19. The method of claim 18, wherein the switched capacitor converter is a single-phase switched capacitor converter comprising:
a first switch, a second switch, a third switch and a fourth switch of the first leg connected in series between ground and a first voltage node;
a first switch, a second switch, a third switch and a fourth switch of the second leg connected in series between ground and a second voltage node;
the first flying capacitor connected between a common node of the first switch and the second switch of the first leg, and a common node of the third switch and the fourth switch of the first leg;
the second flying capacitor connected between a common node of the first switch and the second switch of the second leg, and a common node of the third switch and the fourth switch of the second leg;
the third flying capacitor connected between the first voltage node and the second voltage node;
the first upper switch connected between the first voltage node and ground; and
the second upper switch connected between the second voltage node and an input terminal.

20. The method of claim 19, further comprising:
an inductor coupled in series with the third flying capacitor, wherein in the first half cycle, configuring the second switch and the fourth switch of the first leg, the first switch and the third switch of the second leg, and the second upper switch to be turned on with a 50% duty cycle; and
in the second half cycle, configuring the second switch and the fourth switch of the second leg, the first switch and the third switch of the first leg, and the first upper switch to be turned on with a 50% duty cycle.

21. The method of claim 19, further comprising:
in the first half cycle, configuring the second switch and the fourth switch of the first leg, and the second upper switch to be turned on, and configuring the first switch and the third switch of the second leg to be turned on after a first delay; and
in the second half cycle, configuring the second switch and the fourth switch of the second leg, and the first upper switch to be turned on, and configuring the first switch and the third switch of the first leg to be turned on after a second delay.

22. The method of claim 21, wherein:
the first delay is determined based upon a comparison between a voltage across the second flying capacitor and a first charging voltage equal to an input voltage minus a sum of a voltage across the first flying capacitor and a voltage across the third flying capacitor, and wherein the first switch and the third switch of the second leg are both turned on once the voltage across the second flying capacitor is equal to the first charging voltage; and
the second delay is determined based upon a comparison between a voltage across the first flying capacitor and a second charging voltage equal to the voltage across the third flying capacitor minus the voltage across the second flying capacitor, and wherein the first switch and the third switch of the first leg are both turned on once the voltage across the first flying capacitor is equal to the second charging voltage.

23. The method of claim 18, wherein the switched capacitor converter is a dual-phase switched capacitor converter comprising:
a first switch, a second switch, a third switch and a fourth switch of the first leg connected in series between ground and a first voltage node;
a first switch, a second switch, a third switch and a fourth switch of the second leg connected in series between ground and a second voltage node;
the first flying capacitor connected between a common node of the first switch and the second switch of the first leg, and a common node of the third switch and the fourth switch of the first leg;
the second flying capacitor connected between a common node of the first switch and the second switch of the second leg, and a common node of the third switch and the fourth switch of the second leg;
the third flying capacitor connected between the first voltage node and the second voltage node;
the first upper switch connected between the first voltage node and ground;
the second upper switch connected between the second voltage node and an input terminal;
a fourth flying capacitor connected between a third voltage node and a fourth voltage node;
a third upper switch connected between the third voltage node and ground;
a fourth upper switch connected between the fourth voltage node and the input terminal;
a fifth upper switch connected between the common node of the third switch and the fourth switch of the first leg, and the fourth voltage node; and
a sixth upper switch connected between the common node of the third switch and the fourth switch of the second leg, and the third voltage node.

24. The method of claim 23, further comprising:
a first inductor coupled in series with the third flying capacitor; and
a second inductor coupled in series with the fourth flying capacitor, wherein in the first half cycle, configuring the fifth upper switch, the third upper switch, the second switch and the fourth switch of the first leg, the first switch and the third switch of the second leg, and the second upper switch to be turned on with a 50% duty cycle; and
in the second half cycle, configuring the sixth upper switch, the fourth upper switch, the second switch and the fourth switch of the second leg, the first switch and the third switch of the first leg, and the first upper switch to be turned on with a 50% duty cycle.

25. The method of claim 23, further comprising:
in the first half cycle, configuring the fifth upper switch, the third upper switch, the second switch and the fourth switch of the first leg, and the second upper switch to be turned on, and configuring the first switch and the third switch of the second leg to be turned on after a first delay; and
in the second half cycle, configuring the sixth upper switch, the fourth upper switch, the second switch and the fourth switch of the second leg, and the first upper switch to be turned on, and configuring the first switch and the third switch of the first leg to be turned on after a second delay.

26. The method of claim 25, wherein:
the first delay is determined based upon a comparison between a voltage across the second flying capacitor and a first charging voltage equal to an input voltage minus a sum of a voltage across the first flying capacitor and a voltage across the third flying capacitor, and wherein the first switch and the third switch of the second leg are both turned on once the voltage across the second flying capacitor is equal to the first charging voltage; and
the second delay is determined based upon a comparison between a voltage across the first flying capacitor and a second charging voltage equal to an input voltage minus a sum of a voltage across the fourth flying capacitor and the voltage across the second flying capacitor, and wherein the first switch and the third switch of the first leg are both turned on once the voltage across the first flying capacitor is equal to the second charging voltage.

27. The method of claim 18, wherein the switched capacitor converter is a single-phase switched capacitor converter comprising:
a first switch, a second switch, a third switch and a fourth switch of the first leg connected in series between ground and a first voltage node;
a first switch, a second switch, a third switch and a fourth switch of the second leg connected in series between ground and a second voltage node;
the first flying capacitor connected between a common node of the first switch and the second switch of the first leg, and a common node of the third switch and the fourth switch of the first leg;
the second flying capacitor connected between a common node of the first switch and the second switch of the second leg, and a common node of the third switch and the fourth switch of the second leg;
the third flying capacitor connected between the first voltage node and the second voltage node;
the first upper switch connected between the first voltage node and ground;

the second upper switch connected between the second voltage node and a fifth voltage node;

a fourth flying capacitor connected between a third voltage node and a fourth voltage node;

a third upper switch connected between the third voltage node and ground;

a fourth upper switch connected between the fourth voltage node and a sixth voltage node;

a fifth upper switch connected between the fourth voltage node, and a common node of the third switch and the fourth switch of the first leg;

a sixth upper switch connected between the third voltage node, and a common node of the third switch and the fourth switch of the second leg;

a fifth flying capacitor connected between the fifth voltage node and the sixth voltage node;

a seventh upper switch connected between the first voltage node and ground; and an eighth upper switch connected between the sixth voltage node and an input terminal.

28. The method of claim 27, further comprising:

in the first half cycle, configuring the second switch and the fourth switch of the first leg, and the second upper switch, the third upper switch, the fifth upper switch and the eighth upper switch to be turned on, and configuring the first switch and the third switch of the second leg to be turned on after a first delay; and in the second half cycle, configuring the second switch and the fourth switch of the second leg, and the first upper switch, the fourth upper switch, the sixth upper switch and the seventh upper switch to be turned on, and configuring the first switch and the third switch of the first leg to be turned on after a second delay.

29. The method of claim 28, wherein:

the first delay is determined based upon a comparison between a voltage across the second flying capacitor and a first charging voltage equal to an input voltage minus a sum of a voltage across the first flying capacitor, a voltage across the third flying capacitor and a voltage across the fifth flying capacitor, and wherein the first switch and the third switch of the second leg are both turned on once the voltage across the second flying capacitor is equal to the first charging voltage; and the second delay is determined based upon a comparison between a voltage across the first flying capacitor and a second charging voltage equal to the voltage across the fifth flying capacitor minus a sum of a voltage across the fourth flying capacitor and the voltage across the second flying capacitor, and wherein the first switch and the third switch of the first leg are both turned on once the voltage across the first flying capacitor is equal to the second charging voltage.

* * * * *